(12) United States Patent
Emura et al.

(10) Patent No.: US 9,789,928 B2
(45) Date of Patent: Oct. 17, 2017

(54) BICYCLE TRANSMISSION APPARATUS

(71) Applicant: SHIMANO INC., Sakai (JP)

(72) Inventors: Atsuhiro Emura, Sakai (JP); Toshinari Oishi, Sakai (JP); Yusuke Nishimoto, Sakai (JP); Sota Yamaguchi, Sakai (JP); Kohei Obuchi, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/013,955

(22) Filed: Feb. 2, 2016

(65) Prior Publication Data

US 2016/0257373 A1    Sep. 8, 2016

Related U.S. Application Data

(63) Continuation-in-part of application No. 14/640,246, filed on Mar. 6, 2015, now abandoned.

(51) Int. Cl.

| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 6/50* | (2010.01) |
| *B62M 9/12* | (2006.01) |
| *B62M 9/14* | (2006.01) |
| *F16H 57/05* | (2006.01) |

(52) U.S. Cl.
CPC ............ *B62M 6/50* (2013.01); *B62M 9/12* (2013.01); *B62M 9/14* (2013.01); *F16H 57/05* (2013.01)

(58) Field of Classification Search
CPC ........ B62M 9/04; B62M 11/145; B62M 9/12; B62M 9/14; B62M 11/06
USPC ............................................. 474/78, 80, 81
See application file for complete search history.

(56) References Cited

U.S. PATENT DOCUMENTS

| | | | | |
|---|---|---|---|---|
| 625,835 A | * | 5/1899 | Davis ...................... | F16H 3/363 |
| | | | | 280/281.1 |
| 3,972,244 A | * | 8/1976 | Bieser ...................... | B62M 9/04 |
| | | | | 474/17 |
| 4,119,326 A | * | 10/1978 | Porter ....................... | B62M 9/06 |
| | | | | 280/236 |

(Continued)

FOREIGN PATENT DOCUMENTS

| | | |
|---|---|---|
| JP | 4535958 B2 | 2/2007 |
| WO | WO 2011/061048 | 5/2011 |

*Primary Examiner* — Henry Liu
(74) *Attorney, Agent, or Firm* — Mori & Ward, LLP

(57) ABSTRACT

A bicycle transmission apparatus comprises a base member, a first transmission member, a second transmission member, and a first coupling member. The first transmission member is rotatable relative to the base member about a first rotational axis and is movable relative to the base member in an axial direction parallel to the first rotational axis. The second transmission member is rotatable relative to the base member about a second rotational axis and is stationary relative to the base member in the axial direction. The first coupling member is configured to couple the first transmission member to the second transmission member to transmit rotation of the first transmission member to the second transmission member at a variable speed stage which is variable in accordance with at least one positional relationship among the first transmission member, the second transmission member, and the first coupling member in the axial direction.

49 Claims, 31 Drawing Sheets

(56) References Cited

U.S. PATENT DOCUMENTS

| | | | | |
|---|---|---|---|---|
| 4,741,546 A * | 5/1988 | Reswick | F16H 55/54 | 280/236 |
| 5,404,768 A * | 4/1995 | Hwang | B62M 11/06 | 74/369 |
| 5,611,556 A * | 3/1997 | Davidow | B62M 9/04 | 280/236 |
| 5,730,670 A * | 3/1998 | Ferrarin | B62K 15/006 | 474/79 |
| 5,979,924 A * | 11/1999 | D'Aluisio | B62K 25/286 | 280/259 |
| 6,029,990 A * | 2/2000 | Busby | B62K 25/286 | 280/261 |
| 6,079,726 A * | 6/2000 | Busby | B62K 25/286 | 280/261 |
| 6,155,585 A * | 12/2000 | Busby | B62K 25/286 | 280/261 |
| 7,258,637 B2 * | 8/2007 | Thomasberg | B62M 9/14 | 474/160 |
| 7,294,076 B2 * | 11/2007 | Matsumoto | B62K 25/28 | 474/160 |
| 7,326,137 B2 * | 2/2008 | van der Linde | B62M 11/06 | 474/80 |
| 7,361,109 B2 * | 4/2008 | Kilshaw | B62M 9/04 | 280/261 |
| 7,497,793 B2 * | 3/2009 | Hee | B62M 1/36 | 280/236 |
| 7,503,862 B2 * | 3/2009 | Kaga | B62M 9/04 | 474/78 |
| 7,520,831 B2 * | 4/2009 | Kaga | B62M 9/04 | 474/144 |
| 7,597,638 B2 * | 10/2009 | Cooke | B62M 9/04 | 474/78 |
| 7,611,430 B2 * | 11/2009 | Matsumoto | B62M 9/00 | 474/80 |
| 7,686,716 B2 * | 3/2010 | Matsumoto | B62M 9/10 | 474/80 |
| 7,736,253 B2 * | 6/2010 | Matsumoto | B62M 9/14 | 474/69 |
| 7,744,498 B2 * | 6/2010 | Matsumoto | B62M 9/121 | 474/160 |
| 7,762,571 B2 * | 7/2010 | Dodman | B62K 19/34 | 280/274 |
| 7,988,574 B2 * | 8/2011 | Matsumoto | B62M 9/131 | 474/127 |
| 8,066,596 B1 * | 11/2011 | Kilshaw | B62M 9/04 | 474/79 |
| 8,475,306 B2 * | 7/2013 | Vrielink | B62M 9/12 | 474/78 |
| 8,556,757 B2 * | 10/2013 | Kilshaw | B62M 9/04 | 474/79 |
| 8,944,945 B2 * | 2/2015 | Kilshaw | B62J 13/00 | 474/78 |
| 9,623,931 B2 * | 4/2017 | Emura | B62M 9/132 | |
| 2004/0014543 A1 * | 1/2004 | Van Der Linde | B62M 11/06 | 474/160 |
| 2004/0067804 A1 * | 4/2004 | Dratewski | B62M 11/06 | 474/78 |
| 2004/0130120 A1 * | 7/2004 | Matsumoto | B62J 13/04 | 280/260 |
| 2004/0192480 A1 * | 9/2004 | Matsumoto | B62M 11/06 | 474/78 |
| 2004/0214670 A1 * | 10/2004 | Matsumoto | B62K 25/28 | 474/78 |
| 2005/0173890 A1 * | 8/2005 | Matsumoto | B62M 9/126 | 280/261 |
| 2005/0176536 A1 * | 8/2005 | Matsumoto | B62M 9/131 | 474/78 |
| 2005/0215367 A1 * | 9/2005 | Thomasberg | B62M 9/14 | 474/78 |
| 2006/0046881 A1 * | 3/2006 | Matsumoto | B62M 9/14 | 474/81 |
| 2006/0058131 A1 * | 3/2006 | Cooke | B62M 9/04 | 474/78 |
| 2006/0122016 A1 * | 6/2006 | Hee | B62M 1/36 | 474/80 |
| 2006/0240919 A1 * | 10/2006 | Matsumoto | B62M 11/145 | 474/78 |
| 2006/0270499 A1 * | 11/2006 | Kilshaw | B62M 9/04 | 474/78 |
| 2008/0261735 A1 * | 10/2008 | Cappellini | B62M 9/04 | 474/78 |
| 2011/0256971 A1 * | 10/2011 | Kilshaw | B62J 13/00 | 474/134 |
| 2012/0071284 A1 * | 3/2012 | Kilshaw | B62M 9/12 | 474/81 |
| 2014/0265219 A1 * | 9/2014 | Scolari | B62M 9/12 | 280/261 |

\* cited by examiner

| | | SECOND TRANSMISSION MEMBER | | | | | | |
|---|---|---|---|---|---|---|---|---|
| | | CW27 | CW26 | CW25 | CW24 | CW23 | CW22 | CW21 |
| | | 41 | 37 | 33 | 29 | 25 | 21 | 19 |
| FIRST TRANSMISSION MEMBER | CW11 19 | 0.46 | 0.51 | 0.58 | 0.66 | 0.76 | 0.90 | 1.00 |
| | CW12 21 | 0.51 | 0.57 | 0.64 | 0.72 | 0.84 | 1.00 | 1.11 |
| | CW13 25 | 0.61 | 0.68 | 0.76 | 0.86 | 1.00 | 1.19 | 1.32 |
| | CW14 29 | 0.71 | 0.78 | 0.88 | 1.00 | 1.16 | 1.38 | 1.53 |
| | CW15 33 | 0.80 | 0.89 | 1.00 | 1.14 | 1.32 | 1.57 | 1.74 |
| | CW16 37 | 0.90 | 1.00 | 1.12 | 1.28 | 1.48 | 1.76 | 1.95 |
| | CW17 41 | 1.00 | 1.11 | 1.24 | 1.41 | 1.64 | 1.95 | 2.16 |

| SPEED STAGE | FIRST TRANSMISSION MEMBER | GUIDE MEMBER | FIRST COGWHEEL | SECOND COGWHEEL |
|---|---|---|---|---|
| 1 | P1 | P11 | CW11 | CW27 |
| 2 | P2 | P11 | CW12 | CW27 |
| 3 | P1 | P12 | CW12 | CW26 |
| 4 | P2 | P12 | CW13 | CW26 |
| 5 | P1 | P13 | CW13 | CW25 |
| 6 | P2 | P13 | CW14 | CW25 |
| 7 | P1 | P14 | CW14 | CW24 |
| 8 | P2 | P14 | CW15 | CW24 |
| 9 | P1 | P15 | CW15 | CW23 |
| 10 | P2 | P15 | CW16 | CW23 |
| 11 | P1 | P16 | CW16 | CW22 |
| 12 | P2 | P16 | CW17 | CW22 |
| 13 | P1 | P17 | CW17 | CW21 |

FIG. 20

BICYCLE TRANSMISSION APPARATUS

CROSS-REFERENCE TO RELATED APPLICATIONS

The present application is a continuation-in-part application of the U.S. patent application Ser. No. 14/640,246 filed Mar. 6, 2015. The contents of this application are incorporated herein by reference in their entirety.

BACKGROUND OF THE INVENTION

Field of the Invention
The present invention relates to a bicycle transmission apparatus.
Discussion of the Background
Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a transmission apparatus.

SUMMARY OF THE INVENTION

In accordance with a first aspect of the present invention, a bicycle transmission apparatus comprises a base member, a first transmission member, a second transmission member, and a first coupling member. The first transmission member is rotatable relative to the base member about a first rotational axis and movable relative to the base member in an axial direction parallel to the first rotational axis. The second transmission member is rotatable relative to the base member about a second rotational axis and stationary relative to the base member in the axial direction. The first coupling member is configured to couple the first transmission member to the second transmission member to transmit rotation of the first transmission member to the second transmission member at a variable speed stage. The variable speed stage is variable in accordance with at least one positional relationship among the first transmission member, the second transmission member, and the first coupling member in the axial direction.

In accordance with a second aspect of the present invention, the bicycle transmission apparatus according to the first aspect is configured so that the axial direction includes a first axial direction and a second axial direction opposite to the first axial direction. The first transmission member is movable relative to the base member and the first coupling member in the first axial direction without changing an axial relative position between the first coupling member and the second transmission member during one of upshifting and downshifting. The first transmission member is movable together with the first coupling member relative to the base member in the second axial direction so as to change the axial relative position between the first coupling member and the second transmission member during the one of upshifting and downshifting.

In accordance with a third aspect of the present invention, the bicycle transmission apparatus according to the second aspect further comprises a positioning device configured to position the first transmission member relative to the base member in the axial direction at each of axial positions.

In accordance with a fourth aspect of the present invention, the bicycle transmission apparatus according to the third aspect is configured so that the positioning device is configured to position the first transmission member relative to the base member in the axial direction at each of a first axial position and a second axial position. The first transmission member is movable relative to the base member in the first axial direction from the first axial position to the second axial position. The first transmission member is movable relative to the base member in the second axial direction from the second axial position to the first axial position.

In accordance with a fifth aspect of the present invention, the bicycle transmission apparatus according to the fourth aspect further comprises a switching device configured to switch a position of the first transmission member relative to the base member in the axial direction between the first axial position and the second axial position.

In accordance with a sixth aspect of the present invention, the bicycle transmission apparatus according to the third aspect further comprises a first shaft defining the first rotational axis, and a bearing structure configured to rotatably couple the first transmission member to the first shaft about the first rotational axis. The first transmission member has a first opening. The first shaft extends through the first opening. The bearing structure is provided in the first opening.

In accordance with a seventh aspect of the present invention, the bicycle transmission apparatus according to the second aspect is configured so that the variable speed stage includes speed stages different from each other. The first transmission member includes first cogwheels arranged in the axial direction. Each of the first cogwheels is engageable with the first coupling member. The first cogwheels respectively define the speed stages together with the second cogwheels.

In accordance with an eighth aspect of the present invention, the bicycle transmission apparatus according to the seventh aspect is configured so that the second transmission member includes second cogwheels arranged in the axial direction. Each of the second cogwheels is engageable with the first coupling member. The second cogwheels respectively define the speed stages together with the first cogwheels.

In accordance with a ninth aspect of the present invention, the bicycle transmission apparatus according to the eighth aspect is configured so that a total number of the first cogwheels is equal to a total number of the second cogwheels.

In accordance with a tenth aspect of the present invention, the bicycle transmission apparatus according to the ninth aspect is configured so that each of the first cogwheels includes first teeth arranged in a circumferential direction of the first transmission member. Each of the second cogwheels includes second teeth arranged in a circumferential direction of the second transmission member. The first cogwheels respectively have first pitch circles each defined by the first teeth. The second cogwheels respectively have second pitch circles each defined by the second teeth. First diameters of the first pitch circles respectively are equal to second diameters of the second pitch circles.

In accordance with an eleventh aspect of the present invention, the bicycle transmission apparatus according to the seventh aspect is configured so that the first cogwheels include a first largest cogwheel and a first smallest cogwheel. The first smallest cogwheel has an outer diameter smaller than an outer diameter of the first largest cogwheel. The first smallest cogwheel is spaced apart from the first largest cogwheel in the first axial direction.

In accordance with a twelfth aspect of the present invention, the bicycle transmission apparatus according to the first aspect further comprises a guide member. The guide device is configured to guide the first coupling member to change at least one of a first relative position between the first coupling member and the first transmission member, and a second relative position between the first coupling member and the second transmission member.

In accordance with a thirteenth aspect of the present invention, the bicycle transmission apparatus according to the twelfth aspect is configured so that the guide device includes a guide member contactable with the first coupling member, and a guide unit configured to guide the guide member in a first guide direction to change at least one of the first relative position and the second relative position.

In accordance with a fourteenth aspect of the present invention, the bicycle transmission apparatus according to the thirteenth aspect is configured so that the guide device includes a tensioner contactable with the first coupling member. The guide unit is configured to guide the tensioner in a second guide direction to adjust tension of the first coupling member. The second guide direction is different from the first guide direction and the axial direction.

In accordance with a fifteenth aspect of the present invention, the bicycle transmission apparatus according to the fourteenth aspect is configured so that the guide device includes a guide actuator configured to move the guide member in the first guide direction.

In accordance with a sixteenth aspect of the present invention, the bicycle transmission apparatus according to the fifteenth aspect further comprises a sensing device and a transmission controller. The sensing device is configured to sense a pedaling state of a bicycle. The transmission controller is configured to control the guide actuator to change a timing at which the guide member moves relative to the base member based on the pedaling state sensed by the sensing device.

In accordance with a seventeenth aspect of the present invention, the bicycle transmission apparatus according to the sixteenth aspect further comprises a switching device configured to switch a position of the first transmission member relative to the base member in the axial direction between the first axial position and the second axial position. The transmission controller is configured to control the switching device to change a timing at which the first transmission member moves relative to the base member based on the pedaling state sensed by the sensing device.

In accordance with an eighteenth aspect of the present invention, the bicycle transmission apparatus according to the first aspect is configured so that the base member includes an internal space in which the first transmission member and the second transmission member are provided. The base member is configured to store lubricant in the internal space.

In accordance with a nineteenth aspect of the present invention, the bicycle transmission apparatus according to the eighteenth aspect is configured so that the base member includes a supply port through which the lubricant is to be supplied to the internal space.

In accordance with a twentieth aspect of the present invention, the bicycle transmission apparatus according to the first aspect is configured so that the base member is configured to be attached to the bicycle frame as a separate member from the bicycle frame. The base member is configured to be clamped by the bicycle frame.

In accordance with a twenty-first aspect of the present invention, the bicycle transmission apparatus according to the twentieth aspect further comprises an input shaft mounted to the base member to receive an input torque and rotatable relative to the base member about an input rotational axis in response to the input torque. The base member includes a base member body in which the first transmission member and the second transmission member are provided, and an input shaft support including a support opening in which the input shaft is rotatable relative to the base member about the input rotational axis. The input shaft support extends from the base member body along the input rotational axis. The input shaft support is configured to be clamped by the bicycle frame.

In accordance with a twenty-second aspect of the present invention, the bicycle transmission apparatus according to the first aspect is configured so that the base member is configured to be mounted to a first frame of the bicycle frame and is pivotable relative to a second frame of the bicycle frame about the second rotational axis. The second frame is pivotably coupled to the first frame about the second rotational axis.

In accordance with a twenty-third aspect of the present invention, the bicycle transmission apparatus according to the twenty-second aspect further comprises an output shaft rotatable relative to the base member about the second rotational axis and coupled to the second transmission member to transmit rotation of the second transmission member to a bicycle wheel rotatable relative to the second frame. The output shaft is configured to extend through a pivot opening of the bicycle frame along the second rotational axis.

In accordance with a twenty-fourth aspect of the present invention, the bicycle transmission apparatus according to the twenty-third aspect further comprises an inner bearing unit configured to be provided in the pivot opening of the bicycle frame and configured to rotatably couple the output shaft to the bicycle frame about the second rotational axis via an outer bearing unit provided radially outward of the inner bearing unit. The outer bearing unit is configured to pivotably couple the second frame to the first frame about the second rotational axis.

In accordance with a twenty-fifth aspect of the present invention, the bicycle transmission apparatus according to the first aspect further comprises an assist device configured to assist pedaling.

In accordance with a twenty-sixth aspect of the present invention, the bicycle transmission apparatus according to the twenty-fifth aspect is configured so that the assist device is configured to generate an assist torque inputted to the second transmission member to assist pedaling.

In accordance with a twenty-seventh aspect of the present invention, the bicycle transmission apparatus according to the twenty-fifth aspect is configured so that the assist device is provided on a front side of the base member in an attachment state where the bicycle transmission apparatus is attached to the bicycle frame.

In accordance with a twenty-eighth aspect of the present invention, the bicycle transmission apparatus according to the twenty-seventh aspect further comprises an electrical power source configured to supply electrical power to the assist device and provided under the base member in the attachment state of the bicycle transmission apparatus.

In accordance with a twenty-ninth aspect of the present invention, the bicycle transmission apparatus according to the twenty-fifth aspect further comprises a sensing device and an assist controller. The sensing device is configured to sense a pedaling state of a bicycle. The assist controller is configured to control the assist device to input the assist torque to the second transmission member based on the pedaling state sensed by the sensing device.

In accordance with a thirtieth aspect of the present invention, the bicycle transmission apparatus according to the first aspect further comprises an input shaft and an input coupling member. The input shaft is mounted to the base member to receive an input torque and rotatable relative to the base member about an input rotational axis in response to the input torque. The input coupling member is configured to couple the input shaft to the first transmission member to transmit rotation of the input shaft to the first transmission member. The first transmission member is configured to be coupled to the input shaft via the input coupling member to rotate with the input shaft relative to the base member.

In accordance with a thirty-first aspect of the present invention, the bicycle transmission apparatus according to the thirtieth aspect is configured so that the input shaft is configured to be coupled to a crank arm of a bicycle crank as a crank axle of the bicycle crank. The first transmission member includes a first shifting facilitation part configured to facilitate shifting the first coupling member relative to the first transmission member in the axial direction. The first shifting facilitation part is disposed in a first shifting area of the first transmission member when the bicycle crank is disposed at or adjacent to a dead center.

In accordance with a thirty-second aspect of the present invention, the bicycle transmission apparatus according to the first aspect is configured so that the first coupling member comprises a bicycle chain configured to engage with the first transmission member and the second transmission member.

In accordance with a thirty-third aspect of the present invention, the bicycle transmission apparatus according to the thirty-second aspect is configured so that the bicycle chain has a chain pitch equal to or smaller than 12 mm.

In accordance with a thirty-fourth aspect of the present invention, the bicycle transmission apparatus according to the fourteenth aspect is configured so that the guide member and the tensioner are arranged in the second guide direction.

In accordance with a thirty-fifth aspect of the present invention, the bicycle transmission apparatus according to the first aspect further comprises an input shaft mounted to the base member to receive an input torque and rotatable relative to the base member about an input rotational axis in response to the input torque. The first rotational axis and the second rotational axis are parallel to the input rotational axis. An angle defined between a first line perpendicular to the input rotational axis and the first rotational axis and a second line perpendicular to the input rotational axis and the second rotational axis is an obtuse angle when viewed from the axial direction.

In accordance with a thirty-sixth aspect of the present invention, the bicycle transmission apparatus according to the first aspect further comprises an input shaft mounted to the base member to receive an input torque and rotatable relative to the base member about an input rotational axis in response to the input torque. The first rotational axis and the second rotational axis are parallel to the input rotational axis. An angle is defined between a first line perpendicular to the input rotational axis and the first rotational axis and a second line perpendicular to the input rotational axis and the second rotational axis is an acute angle when viewed from the axial direction.

In accordance with a thirty-seventh aspect of the present invention, the bicycle transmission apparatus according to the second aspect is configured so that the first transmission member is movable relative to the base member and the first coupling member in the first axial direction so as to change an axial relative position between the first coupling member and the first transmission member during the one of upshifting and downshifting. The first transmission member is movable together with the first coupling member relative to the base member in the second axial direction without changing the axial relative position between the first coupling member and the first transmission member during the one of upshifting and downshifting.

In accordance with a thirty-eighth aspect of the present invention, the bicycle transmission apparatus according to the thirty-seventh aspect further comprises a guide device configured to guide the first coupling member to change at least one of a first relative position between the first coupling member and the first transmission member, and a second relative position between the first coupling member and the second transmission member. The guide device includes a guide member contactable with the first coupling member. The first transmission member is movable relative to the base member, the first coupling member, and the guide member in the first axial direction so as to change the axial relative position between the first coupling member and the first transmission member during the one of upshifting and downshifting. The first transmission member is movable together with the first coupling member and the guide member relative to the base member in the second axial direction so as to change the axial relative position between the first coupling member and the second transmission member during the one of upshifting and downshifting.

In accordance with a thirty-ninth aspect of the present invention, the bicycle transmission apparatus according to the thirty-eighth aspect is configured so that the first coupling member moves relative to the first transmission member without contacting the guide member when the first transmission member moves relative to the base member in the second axial direction.

In accordance with a fortieth aspect of the present invention, the bicycle transmission apparatus according to the second aspect is configured so that the first transmission member is movable relative to the base member and the first coupling member in the second axial direction without changing an axial relative position between the first coupling member and the second transmission member during another of upshifting and downshifting. The first transmission member is movable together with the first coupling member relative to the base member in the first axial direction so as to change the axial relative position between the first coupling member and the second transmission member during said another of upshifting and downshifting.

In accordance with a forty-first aspect of the present invention, the bicycle transmission apparatus according to the fortieth aspect is configured so that the first transmission member is movable relative to the base member and the first coupling member in the second axial direction so as to change an axial relative position between the first coupling member and the first transmission member during said another of upshifting and downshifting. The first transmission member is movable together with the first coupling member relative to the base member in the first axial direction without changing the axial relative position between the first coupling member and the first transmission member during said another of upshifting and downshifting.

In accordance with a forty-second aspect of the present invention, the bicycle transmission apparatus according to the forty-first aspect further comprises a guide device configured to guide the first coupling member to change at least one of a first relative position between the first coupling member and the first transmission member, and a second relative position between the first coupling member and the second transmission member. The guide device includes a guide member contactable with the first coupling member. The first transmission member is movable relative to the base member, the first coupling member, and the guide member in the second axial direction so as to change the axial relative position between the first coupling member and the first transmission member during said another of upshifting and downshifting. The first transmission member is movable together with the first coupling member and the guide member relative to the base member in the first axial direction so as to change the axial relative position between the first coupling member and the second transmission member during said another of upshifting and downshifting.

In accordance with a forty-third aspect of the present invention, the bicycle transmission apparatus according to the forty-second aspect is configured so that the first coupling member moves relative to the first transmission member without contacting the guide member when the first transmission member moves relative to the base member in the second axial direction.

In accordance with a forty-fourth aspect of the present invention, the bicycle transmission apparatus according to the first aspect is configured so that the first transmission member and the second transmission member partially overlap with each other when viewed from the axial direction.

In accordance with a forty-fifth aspect of the present invention, the bicycle transmission apparatus according to the forty-fourth aspect is configured so that the axial direction includes a first axial direction and a second axial direction opposite to the first axial direction. The first transmission member includes first cogwheels arranged in the axial direction. The first cogwheels have different outer diameters and include a first largest cogwheel having a largest outer diameter among the first cogwheels. The first largest cogwheel is provided at an end of the first cogwheels in the first axial direction. The second transmission member includes second cogwheels arranged in the axial direction. The second cogwheels have different outer diameters and include a second largest cogwheel having a largest outer diameter among the second cogwheels. The second largest cogwheel is provided at an end of the second cogwheels in the second axial direction. The first axial direction is a direction in which the first largest cogwheel moves toward the second largest cogwheel. The second axial direction is a direction in which the first largest cogwheel moves away from the second largest cogwheel.

In accordance with a forty-sixth aspect of the present invention, the bicycle transmission apparatus according to the forty-fifth aspect is configured so that a total number of the first cogwheels is equal to a total number of the second cogwheels. The first transmission member is movable relative to the base member in the axial direction between a first axial position at which the first cogwheels are respectively aligned with the second cogwheels, and a second axial position at which the first cogwheels other than the first largest cogwheel are aligned with the second cogwheels other than the second largest cogwheel.

In accordance with a forty-seventh aspect of the present invention, the bicycle transmission apparatus according to the forty-fifth aspect is configured so that a total number of the first cogwheels is equal to a total number of the second cogwheels. The first cogwheels include a first smallest cogwheel having a smallest outer diameter among the first cogwheels. The first smallest cogwheel is provided at an end of the first cogwheels in the second axial direction. The second cogwheels include a second smallest cogwheel having a smallest outer diameter among the second cogwheels. The second smallest cogwheel is provided at an end of the second cogwheels in the first axial direction. The first transmission member is movable relative to the base member in the axial direction between a first axial position at which the first cogwheels are respectively aligned with the second cogwheels, and a second axial position at which the first cogwheels other than the first smallest cogwheel are aligned with the second cogwheels other than the second smallest cogwheel.

In accordance with a forty-eighth aspect of the present invention, the bicycle transmission apparatus according to the first aspect is configured so that a minimum distance is defined between the first rotational axis and the second rotational axis. The first transmission member is movable relative to the base member in the axial direction by a travel distance. A value obtained by dividing the minimum distance by the travel distance is in a range of 10 to 40.

In accordance with a forty-ninth aspect of the present invention, the bicycle transmission apparatus according to the forty-eighth aspect is configured so that the value obtained by dividing the minimum distance by the travel distance is in a range of 18.3 to 25.4.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 shows an example of gear ratios defined by the first transmission member and the second transmission member of the bicycle transmission apparatus illustrated in FIG. 1;

FIG. 20 shows an example of combinations of a speed stage, a position of the first transmission member, and a position of a guide member in the bicycle transmission apparatus illustrated in FIG. 1;

DESCRIPTION OF THE EMBODIMENTS

Figure 1:
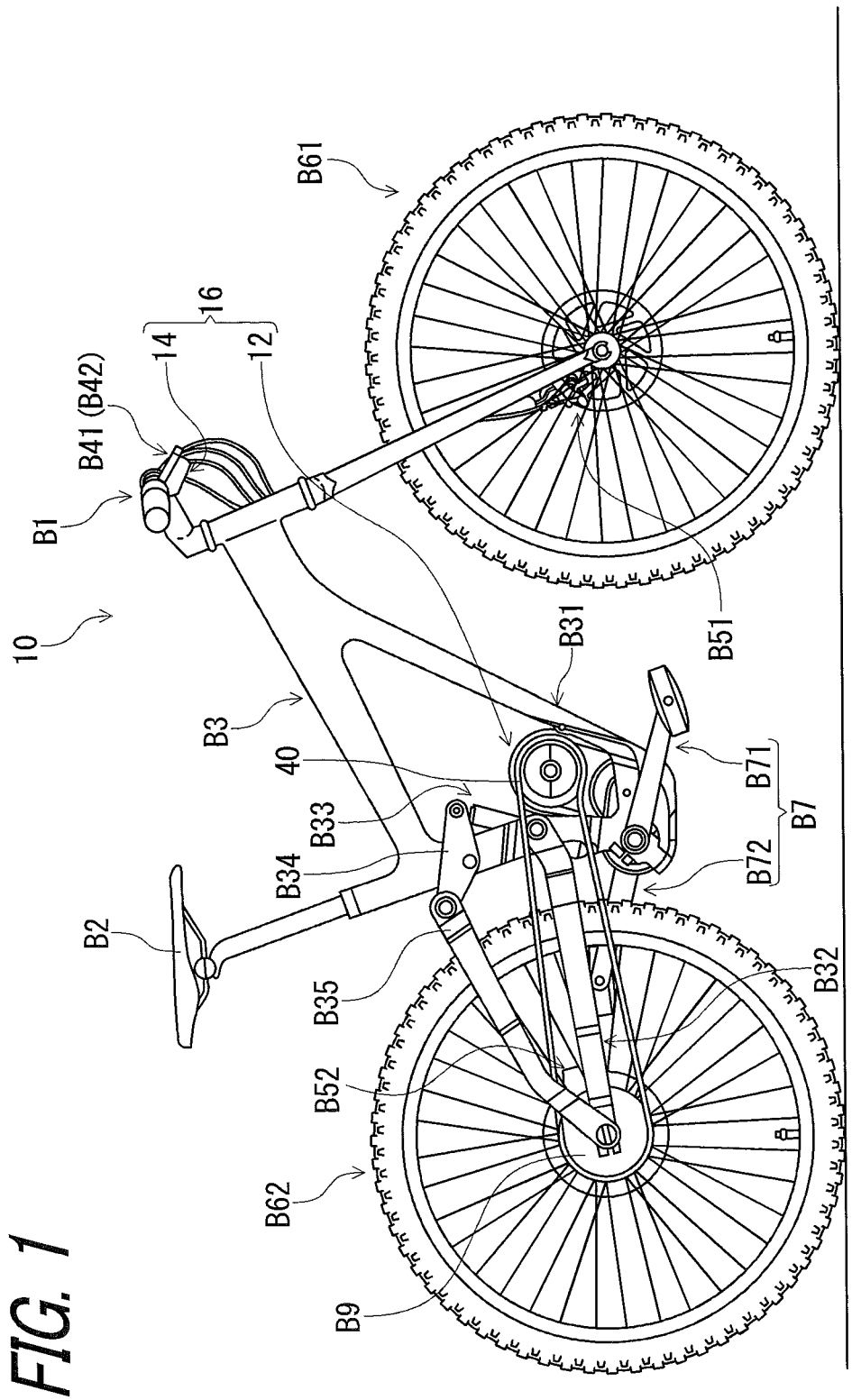
FIG. 1 is a side elevational view of a bicycle provided with a bicycle transmission apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle transmission apparatus 12 in accordance with a first embodiment. While the bicycle 10 is illustrated as a mountain bike, the bicycle transmission apparatus 12 can be applied to road bikes or any type of bicycle.

As seen in FIG. 1, the bicycle 10 includes a handlebar B1, a saddle B2, a bicycle frame B3, a front brake operating device B41, a rear brake operating device B42, a front braking device B51, a rear braking device B52, a front wheel B61, a rear wheel B62, and a bicycle crank B7. The front brake operating device B41 is operatively coupled to the front braking device B51 via an operation cable. The rear brake operating device B42 is operatively coupled to the rear braking device B52 via an operation cable. The bicycle crank B7 includes crank arms B71 and B72 each coupled to the bicycle transmission apparatus 12 to input a pedaling force into the bicycle transmission apparatus 12.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B2 of the bicycle 10 with facing the handlebar B1. Accordingly, these terms, as utilized to describe the bicycle transmission apparatus 12, should be interpreted relative to the bicycle 10 equipped with the bicycle transmission apparatus 12 as used in an upright riding position on a horizontal surface.

The bicycle 10 includes a shifter 14 via which the bicycle transmission apparatus 12 is operated by the user (e.g., the rider) for changing a speed stage of the bicycle transmission apparatus 12. The shifter 14 is mounted to the handlebar B1 and is adjacent to the front brake operating device B41, for example. The shifter 14 can be integrated in at least one of the front brake operating device B41 and the rear brake operating device B42 if needed and/or desired.

The bicycle transmission apparatus 12 and the shifter 14 constitute a bicycle transmission system 16. The shifter 14 is operatively coupled to the bicycle transmission apparatus 12. In the illustrated embodiment, the shifter 14 is electrically connected to the bicycle transmission apparatus 12 via an electrical control cable. While the bicycle transmission apparatus 12 is electrically actuated in response to a shift operation of the shifter 14 in the illustrated embodiment, the shifter 14 can be mechanically coupled to the bicycle transmission apparatus 12 if needed and/or desired. Furthermore, the bicycle transmission apparatus 12 and the shifter 14 can use a wireless technology if needed and/or desired.

As seen in FIG. 1, the bicycle transmission apparatus 12 is mounted to the bicycle frame B3. The bicycle transmission apparatus 12 is configured to transmit the pedaling force to the rear wheel B62 at a variable speed stage. The variable speed stage includes speed stages different from each other. While the bicycle transmission apparatus 12 has thirteen speed stages in the illustrated embodiment, the bicycle transmission apparatus 12 can have at least two speed stages. Furthermore, the bicycle transmission apparatus 12 can have a continuously variable speed stage if needed and/or desired.

Figure 2:
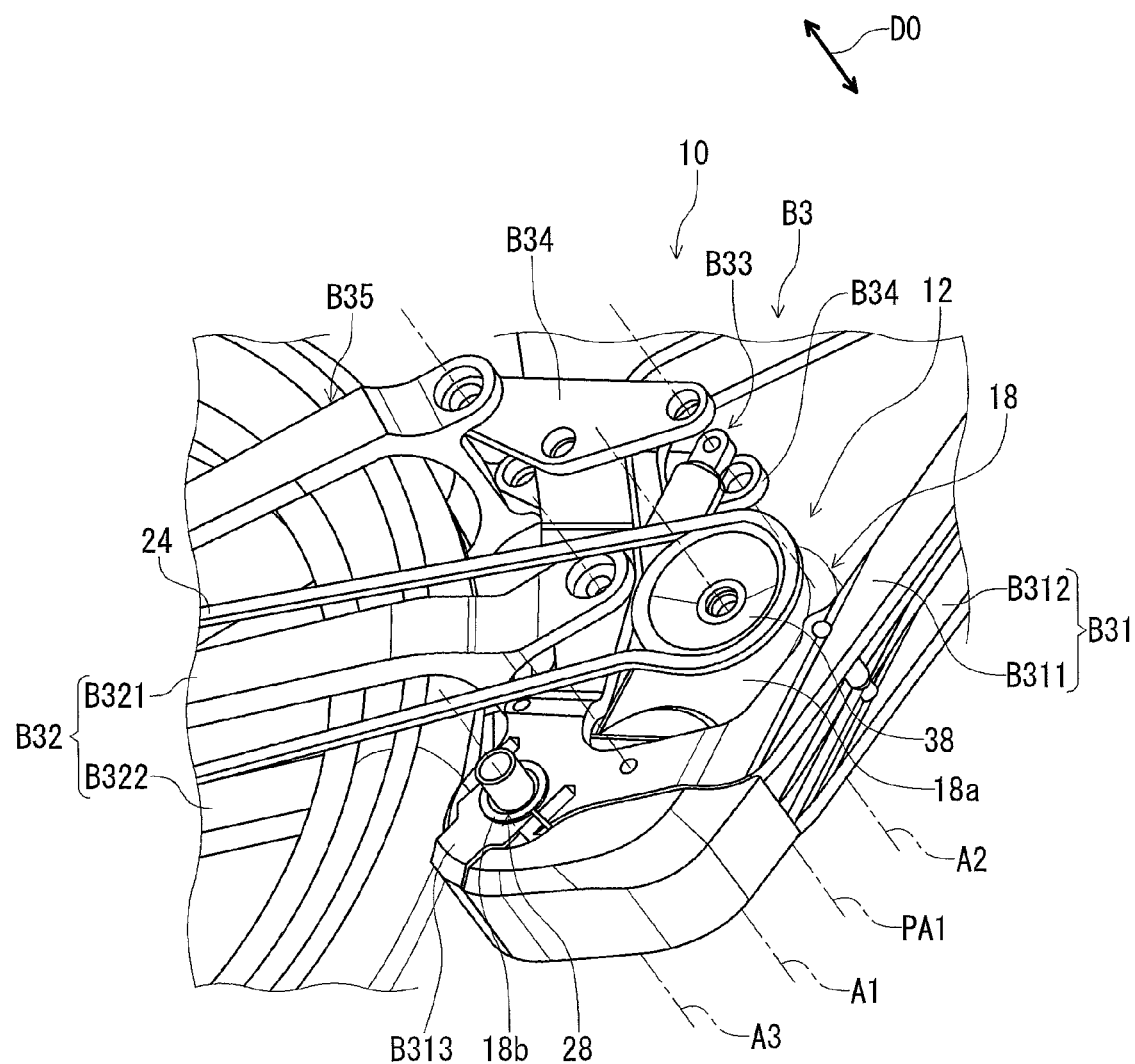
FIG. 2 is a perspective view of the bicycle transmission apparatus mounted to a bicycle frame of the bicycle illustrated in FIG. 1.
Figure 3:
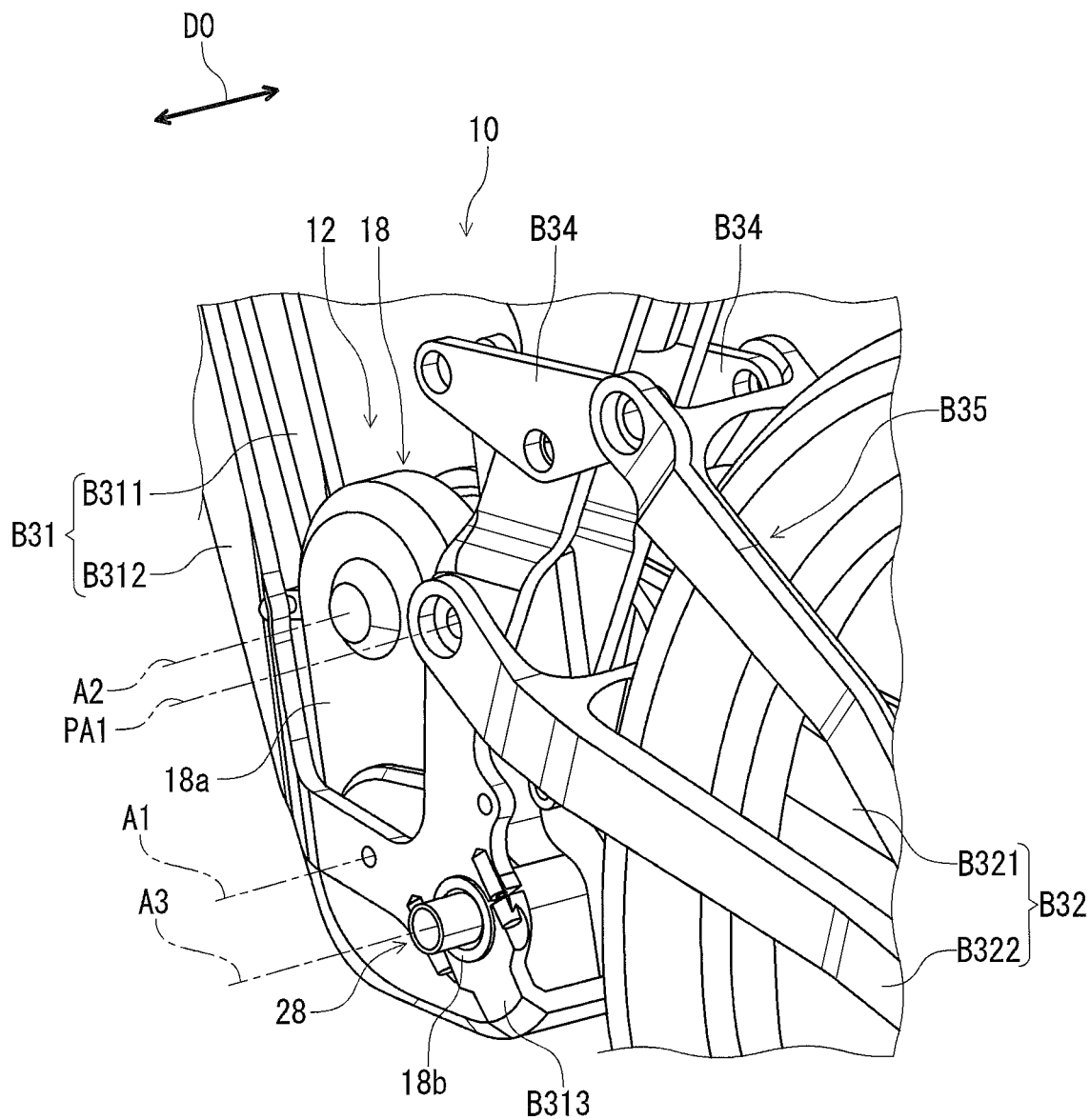
FIG. 3 is a perspective view of the bicycle transmission apparatus mounted to the bicycle frame of the bicycle illustrated in FIG. 1.

As seen in FIGS. 2 and 3, the bicycle transmission apparatus 12 comprises a base member 18. The base member 18 is mounted to the bicycle frame B3 and serves as a housing of the bicycle transmission apparatus 12. In the illustrated embodiment, the base member 18 is configured to be attached to the bicycle frame B3 as a separate member from the bicycle frame B3. However, at least part of the base member 18 can be integrally provided with the bicycle frame B3 as a single unitary member if needed and/or desired.

In the illustrated embodiment, the bicycle frame B3 includes a first frame B31 and a second frame B32. The base member 18 is mounted to the first frame B31 as a separate member from the first frame B31. The second frame B32 is pivotably coupled to the first frame B31 about a pivot axis PA1. The first frame B31 includes first sub frames B311 and B312 spaced apart from each other in a transverse direction D0 of the bicycle 10. The pivot axis PA1 is parallel to the transverse direction D0. The base member 18 is provided between the first sub frames B311 and B312.

The second frame B32 includes second sub frames B321 and B322 spaced apart from each other in the transverse direction D0. The second sub frame B321 is coupled to the second sub frame B322 as forming a one-piece member. The second sub frame B321 is pivotably coupled to the first sub frame B311 about the pivot axis PA1. The second sub frame B322 is pivotably coupled to the first sub frame B312 about the pivot axis PAL

As seen in FIG. 1, the second frame B32 is coupled to a hub shaft of a hub assembly of the rear wheel B62. The bicycle frame B3 further includes a suspension device B33, a first link B34, and a second link B35. The first link B34 is pivotably coupled to the first frame B31. The second link B35 is rotatably coupled to the rear wheel B62 and one end of the first link B34. The second link B35 is rigidly coupled to the second sub frames B321 and B322. The second link B35 and the second sub frames B321 and B322 may be integrally provided as a single unitary member. The suspension device B33 is pivotably coupled to the first frame B31 and the other end of the first link B34 for absorbing shock applied to the bicycle frame B3.

Figure 4:
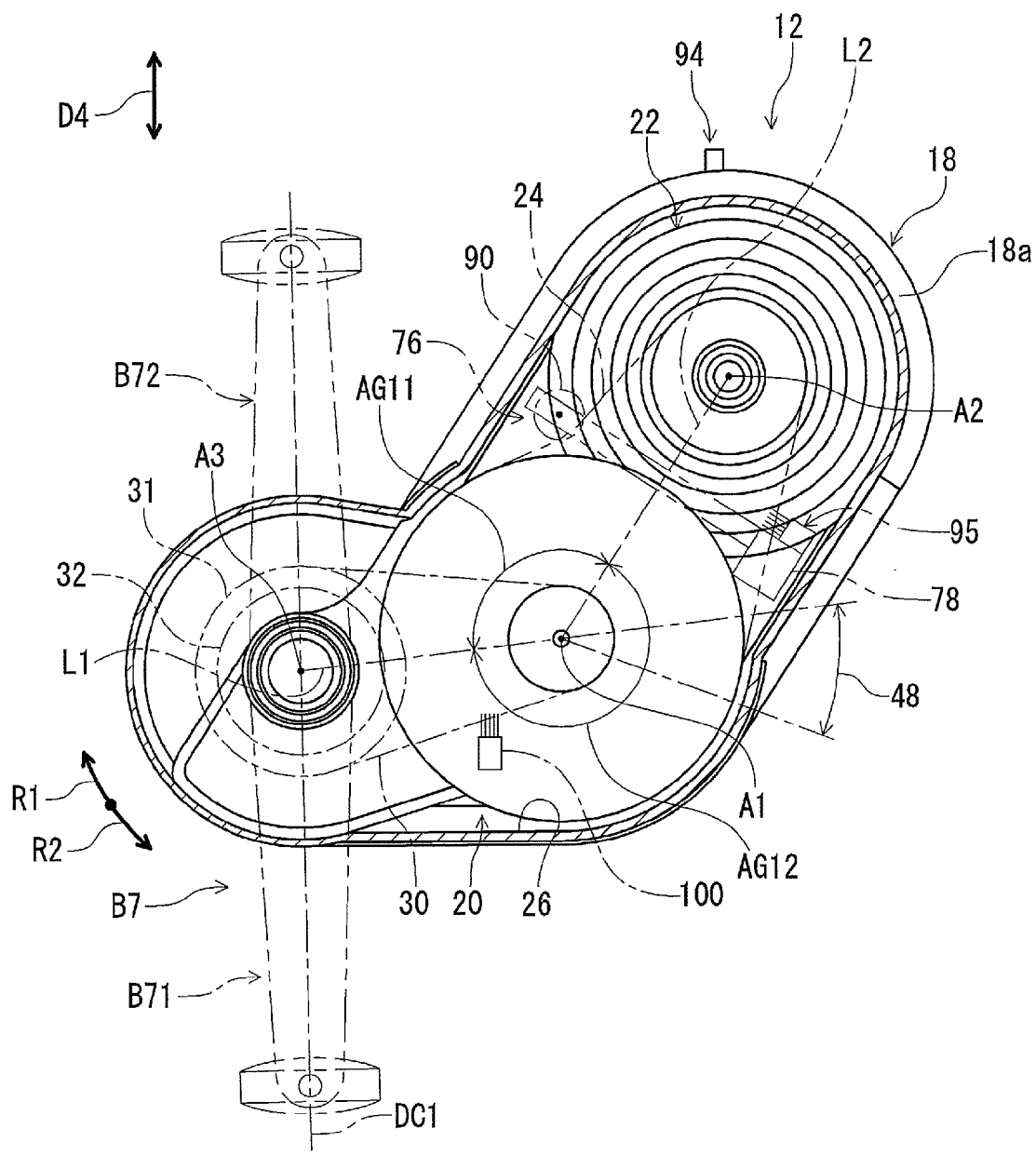
FIG. 4 is a cross-sectional view of the bicycle transmission apparatus illustrated in FIG. 1.

As seen in FIG. 4, the bicycle transmission apparatus 12 comprises a first transmission member 20, a second transmission member 22, and a first coupling member 24. The base member 18 includes an internal space 26 in which the first transmission member 20 and the second transmission member 22 are provided. The first transmission member 20 is provided in the internal space 26 of the base member 18. The second transmission member 22 is provided in the internal space 26 of the base member 18.

As seen in FIG. 4, the first transmission member 20 is rotatable relative to the base member 18 about a first rotational axis A1. The second transmission member 22 is rotatable relative to the base member 18 about a second rotational axis A2.

As seen in FIG. 4, the first coupling member 24 is configured to couple the first transmission member 20 to the second transmission member 22 to transmit rotation of the first transmission member 20 to the second transmission member 22 at a variable speed stage. The first coupling member 24 has an annular shape to surround the first rotational axis A1 and the second rotational axis A2 when viewed from an axial direction D1 (FIG. 5) parallel to the first rotational axis A1. In the illustrated embodiment, the first coupling member 24 comprises a bicycle chain configured to engage with the first transmission member 20 and the second transmission member 22. The first coupling member 24 has a chain pitch equal to or smaller than 12 mm, for example. The chain pitch is more preferably equal to or smaller than 10 mm. The chain pitch is further more preferably equal to or smaller than 8.4 mm. The first coupling member 24 can comprise a coupling member such as a coupling belt. The first transmission member 20 and the second transmission member 22 partially overlap with each other when viewed from the axial direction D1.

Figure 5:
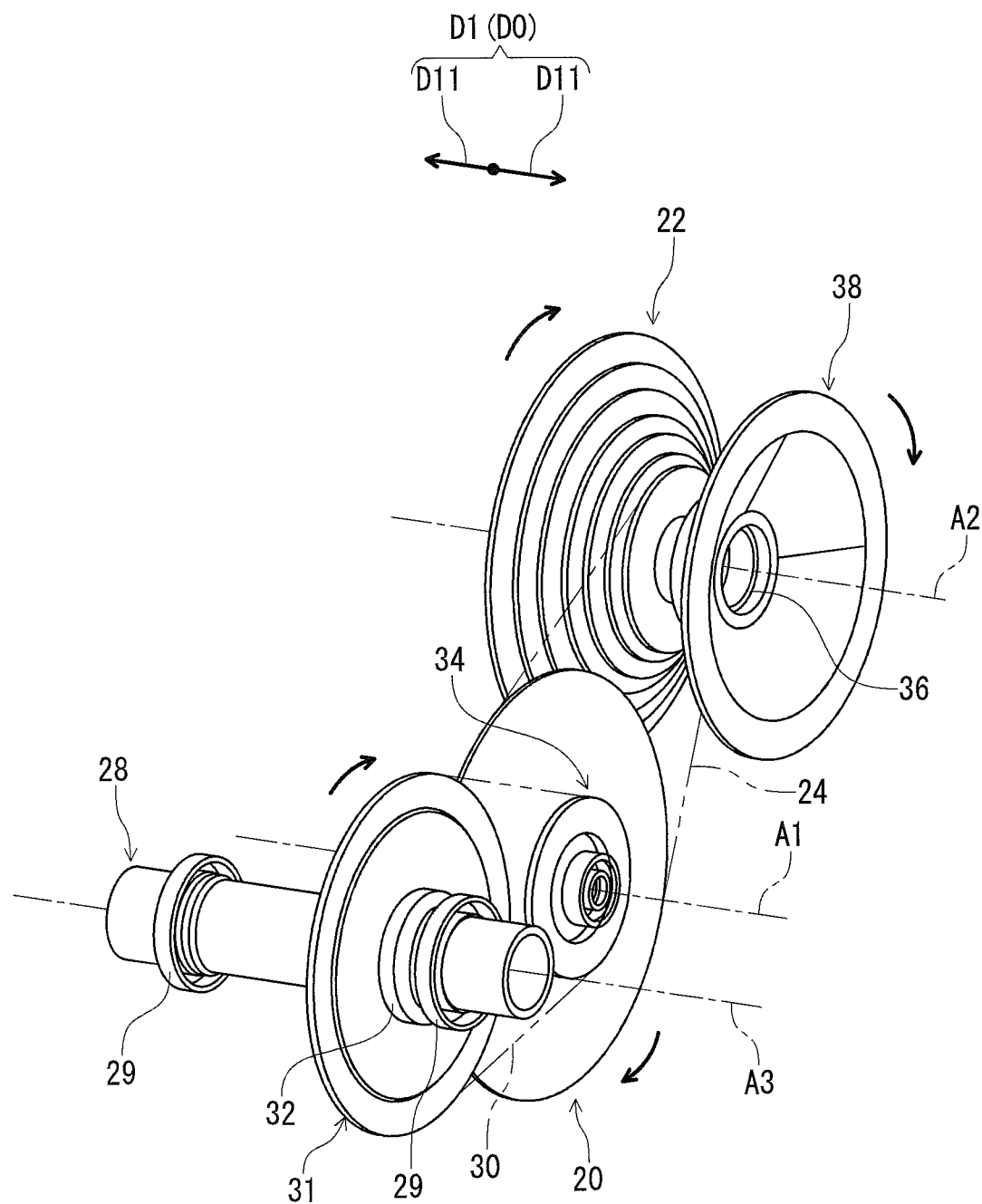
FIG. 5 is a perspective view of the bicycle transmission apparatus illustrated in FIG. 1 without a base member.

As seen in FIG. 5, the second rotational axis A2 is parallel to the first rotational axis A1 in the illustrated embodiment. However, the second rotational axis A2 can be non-parallel to the first rotational axis A1 if needed and/or desired. The first rotational axis A1 and the second rotational axis A2 are parallel to the transverse direction D0 of the bicycle 10.

Figure 6:
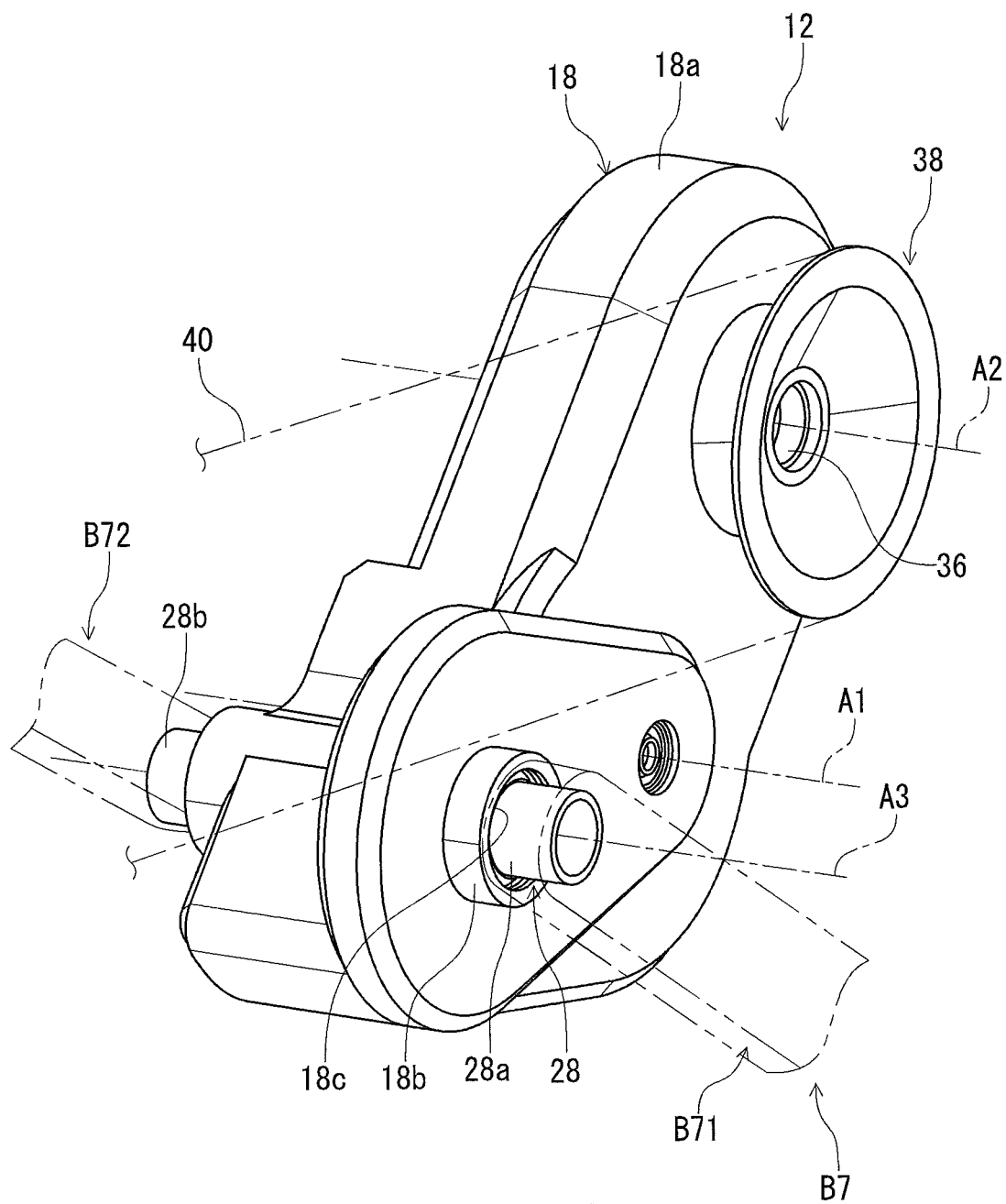
FIG. 6 is a perspective view of the bicycle transmission apparatus illustrated in FIG. 1.

As seen in FIGS. 5 and 6, the bicycle transmission apparatus 12 further comprises an input shaft 28. The input shaft 28 is mounted to the base member 18 (FIG. 6) to receive an input torque. The input shaft 28 is rotatable relative to the base member 18 (FIG. 6) about an input rotational axis A3 in response to the input torque. The bicycle transmission apparatus 12 further comprises input bearing assemblies 29. The input shaft 28 is rotatably mounted to the base member 18 (FIG. 6) via the input bearing assemblies 29 (FIG. 5).

Figure 7:
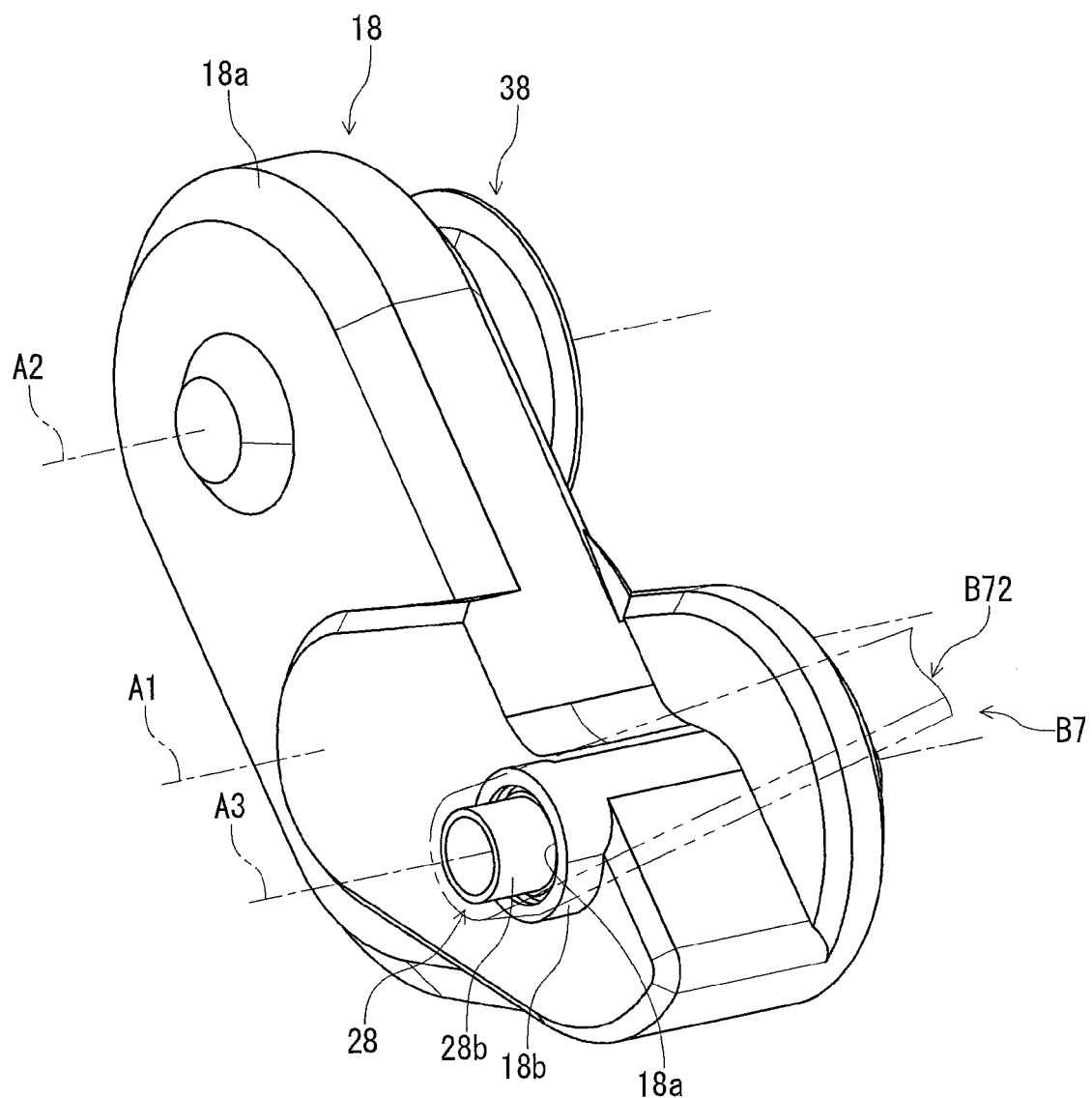
FIG. 7 is a perspective view of the bicycle transmission apparatus illustrated in FIG. 1.

As seen in FIGS. 6 and 7, the input shaft 28 is configured to be coupled to a crank arm of the bicycle crank B7 as a crank axle of the bicycle crank B7. In the illustrated embodiment, the input shaft 28 is configured to be coupled to the crank arms B71 and B72 of the bicycle crank B7 as the crank axle of the bicycle crank B7. The input shaft 28 includes a first axle end 28a and a second axle end 28b opposite to the first axle end 28a. The first axle end 28a is provided outside the base member 18. The second axle end 28b is provided outside the base member 18. The crank arm B71 is coupled to the first axle end 28a. The crank arm B72 is coupled to the second axle end 28b.

As seen in FIGS. 6 and 7, the base member 18 includes a base member body 18a and an input shaft support 18b. In the illustrated embodiment, the base member 18 includes two input shaft supports 18b. As seen in FIG. 4, the first transmission member 20 and the second transmission member 22 are provided in the base member body 18a. As seen in FIGS. 6 and 7, the input shaft support 18b includes a support opening 18c in which the input shaft 28 is rotatable relative to the base member 18 about the input rotational axis A3. The input shaft support 18b extends from the base member body 18a along the input rotational axis A3.

As seen in FIGS. 2 and 3, the base member 18 is configured to be clamped by the bicycle frame B3. In the illustrated embodiment, the input shaft support 18b is configured to be clamped by the bicycle frame B3. The bicycle frame B3 includes a clamp member B313. The clamp member B313 is secured to the first frame B31 via clamp bolts (not shown) to sandwich the input shaft support 18b between the first frame B31 and the clamp member B313. Namely, the bicycle frame B3 does not include a bottom bracket shell which rotatably supports the input shaft 28, and the input shaft support 18b of the base member 18 serves as the bottom bracket shell. The base member 18 is secured to the bicycle frame B3 via fasteners (not shown) so as to prevent the base member 18 from rotating relative to the bicycle frame B3 about the input rotational axis A3. The base member 18 can just be in contact with the bicycle frame B3 without such fasteners so as to prevent the base member 18 from rotating relative to the bicycle frame B3 about the input rotational axis A3.

As seen in FIG. 5, the bicycle transmission apparatus 12 further comprises an input coupling member 30. The input coupling member 30 is configured to couple the input shaft 28 to the first transmission member 20 to transmit rotation of the input shaft 28 to the first transmission member 20. The first transmission member 20 is configured to be coupled to the input shaft 28 via the input coupling member 30 to rotate with the input shaft 28 relative to the base member 18.

As seen in FIG. 4, the input coupling member 30 has an annular shape to surround the input rotational axis A3 and the first rotational axis A1 when viewed from the axial direction D1. The input coupling member 30 is provided in the internal space 26 of the base member 18. In the illustrated embodiment, the input coupling member 30 comprises a bicycle chain configured to couple the input shaft 28 to the first transmission member 20. The input coupling member 30 has a chain pitch equal to or smaller than 12 mm, for example. The input coupling member 30 can comprise a coupling member such as a coupling belt.

As seen in FIG. 5, the bicycle transmission apparatus 12 further comprises an input cogwheel 31. The input cogwheel 31 is configured to be coupled to the input shaft 28 to rotate together with the input shaft 28 relative to the base member 18 about the input rotational axis A3.

As seen in FIG. 4, the bicycle transmission apparatus 12 further comprises a one-way clutch 32. The one-way clutch 32 is configured to transmit a first rotation R1 of the input shaft 28 to the first transmission member 20 and is configured to prevent a second rotation R2 of the input shaft 28 from being transmitted from the input shaft 28 to the first transmission member 20. The second rotation R2 is opposite to the first rotation R1 about the input rotational axis A3.

Figure 8:
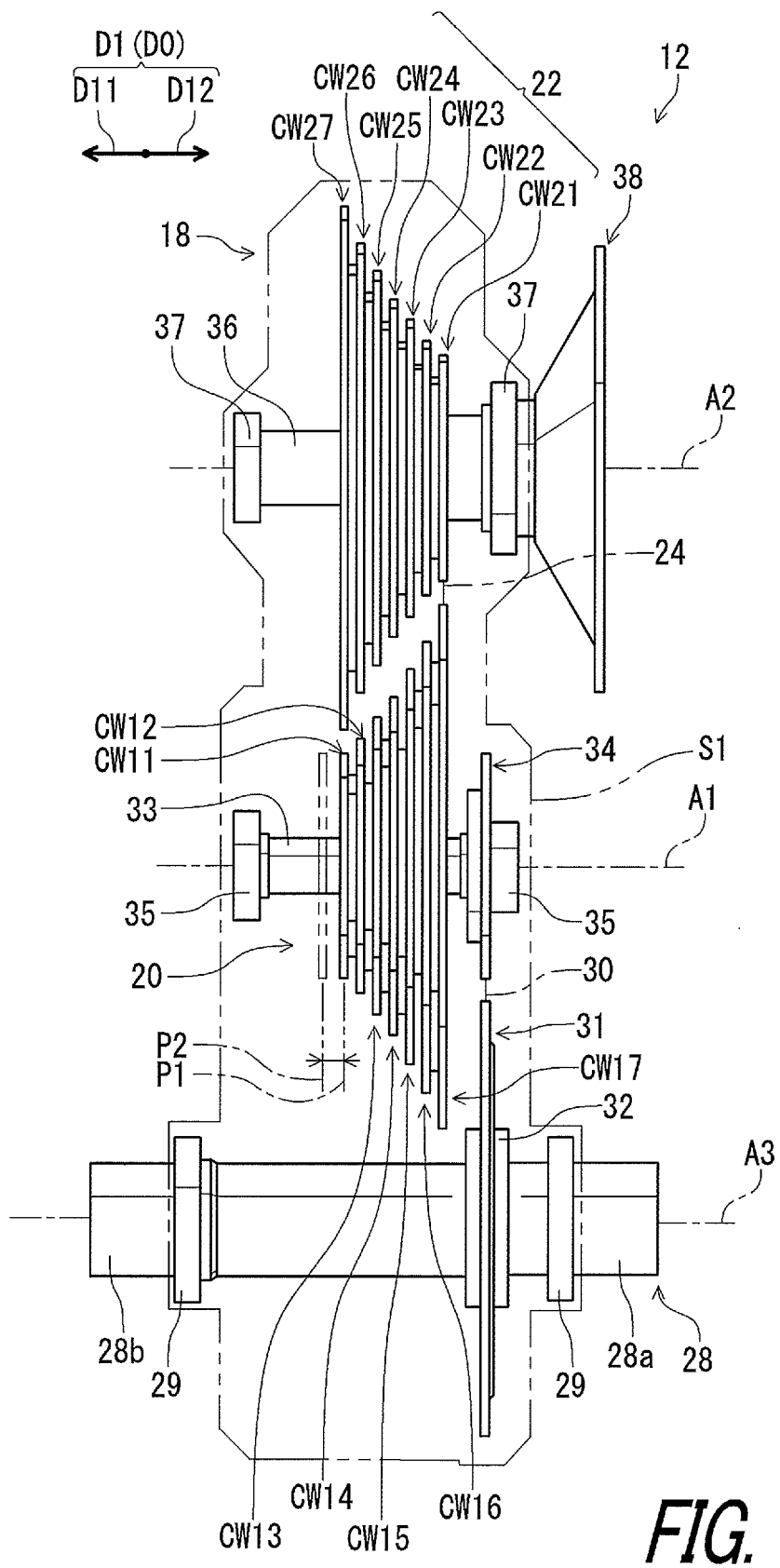
FIG. 8 is a plan view of the bicycle transmission apparatus illustrated in FIG. 1 without the base member when viewed diagonally backward.

As seen in FIG. 8, the one-way clutch 32 is configured to couple the input cogwheel 31 to the input shaft 28 and is provided between the input shaft 28 and the input cogwheel 31. As seen in FIG. 4, the one-way clutch 32 is configured to transmit the first rotation R1 of the input shaft 28 to the input cogwheel 31 and is configured to prevent the second rotation R2 of the input shaft 28 from being transmitted from the input shaft 28 to the input cogwheel 31. The one-way clutch 32 can be omitted from the bicycle transmission apparatus 12 if needed and/or desired.

As seen in FIG. 8, the bicycle transmission apparatus 12 further comprises a first shaft 33 and an intermediate cogwheel 34. The first shaft 33 defines the first rotational axis A1. The first transmission member 20 is rotatable relative to the first shaft 33 about the first rotational axis A1. The intermediate cogwheel 34 is rotatable relative to the first shaft 33 about the first rotational axis A1. The intermediate cogwheel 34 is coupled to the first transmission member 20 to rotate together with the first transmission member 20 relative to the base member 18 about the first rotational axis A1. The bicycle transmission apparatus further comprises first bearing assemblies 35. The first shaft 33 is rotatably mounted to the base member 18 about the first rotational axis A1 via the first bearing assemblies 35.

As seen in FIG. 5, the intermediate cogwheel 34 is coupled to the input cogwheel 31 via the input coupling member 30. The input coupling member 30 is configured to couple the input cogwheel 31 to the intermediate cogwheel 34 to transmit rotation of the input shaft 28 to the first transmission member 20. The input cogwheel 31 comprises a sprocket including teeth. The intermediate cogwheel 34 comprises a sprocket including teeth. The input shaft 28 is configured to be coupled to the first transmission member 20 via the input cogwheel 31, the input coupling member 30, and the intermediate cogwheel 34 to rotate with the input shaft 28 relative to the base member 18.

For example, a value obtained by dividing a rotational speed of the first transmission member 20 by a rotational speed of the input shaft 28 is equal to 2 or 4. Especially, when the one-way clutch 32 is omitted from the bicycle transmission apparatus 12, the value is preferably equal to 2 or 4. In the illustrated embodiment, the value obtained by dividing the rotational speed of the first transmission member 20 by the rotational speed of the input shaft 28 is equal to 2. However, the value obtained by dividing the rotational speed of the first transmission member 20 by the rotational speed of the input shaft 28 can be equal to 4 or other values. If the one-way clutch 32 is omitted from the bicycle transmission apparatus 12, the value is selected to 2 or 4, a phase between the crank arm B71 and first cogwheels CW11 to CW17 is adjusted so that, when the crank arm B71 is in the upper or lower dead center area, the first shifting facilitation part 46 of the first cogwheels CW11 to CW17 is in a sifting area of the guide member 78. Thus, the transmission apparatus 12 shifts the first coupling member 24 when the torque of the first cogwheels CW11 to CW17 becomes the lowest.

As seen in FIG. 8, the bicycle transmission apparatus 12 further comprises an output shaft 36. The output shaft 36 is rotatable relative to the base member 18 about the second rotational axis A2. The second transmission member 22 is coupled to the output shaft 36 to rotate together with the output shaft 36 relative to the base member 18 about the second rotational axis A2. The bicycle transmission apparatus 12 further comprises output bearing assemblies 37. The output shaft 36 is rotatably mounted to the base member 18 via the output bearing assemblies 37.

As seen in FIG. 8, the bicycle transmission apparatus 12 further comprises an output cogwheel 38. The output cogwheel 38 is configured to be coupled to the output shaft 36 to rotate together with the output shaft 36 relative to the base member 18 about the second rotational axis A2. Namely, the second transmission member 22, the output shaft 36, and the output cogwheel 38 are rotatable integrally with each other relative to the base member 18 about the second rotational axis A2. The output cogwheel 38 comprises a sprocket including teeth. The pedaling force is transmitted from the input shaft 28 to the output cogwheel 38 via the input cogwheel 31, the input coupling member 30, the intermediate cogwheel 34, the first transmission member 20, the first coupling member 24, the second transmission member 22, and the output shaft 36.

In the illustrated embodiment, the input cogwheel 31 is provided on a first side S1 relative to the first transmission member 20 in the axial direction D1. The intermediate cogwheel 34 is provided on the first side S1 relative to the first transmission member 20 in the axial direction D1. The output cogwheel 38 is provided on the first side S1 relative to the first transmission member 20 in the axial direction D1.

As seen in FIG. 6, the output cogwheel 38 is provided outside the base member 18. As seen in FIGS. 1 and 6, an output coupling member 40 such as a bicycle chain engages with the output cogwheel 38 and a rear sprocket B9 (FIG. 1) of the bicycle 10. As seen in FIG. 1, the rear sprocket B9 is coupled to the rear wheel B62 via a freewheel (not shown) to rotatable integrally with the rear wheel B62 in a rotational driving direction. Rotation of the output cogwheel 38 is transmitted to the rear wheel B62 via the output coupling member 40 and the rear sprocket B9.

As seen in FIG. 5, the first rotational axis A1 is different from the input rotational axis A3. The second rotational axis A2 is different from each of the input rotational axis A3 and the first rotational axis A1. The input rotational axis A3 and the second rotational axis A2 are spaced apart from each other. The first rotational axis A1 and the second rotational axis A2 are parallel to the input rotational axis A3. However, the first rotational axis A1 can coincide with the input rotational axis A3 if needed and/or desired. In such an embodiment, the input shaft 28 is coaxial with the first transmission member 20 and is coupled to the first transmission member 20 to rotate together with the first transmission member 20 relative to the base member 18 about the first rotational axis A1.

As seen in FIG. 4, a first angle AG11 is defined about the first rotational axis A1 between a first line segment L1 connecting the input rotational axis A3 and the first rotational axis A1 and a second line segment L2 connecting the first rotational axis A1 and the second rotational axis A2 when viewed from the axial direction D1. A second angle AG12 is defined about the first rotational axis A1 between the first line segment L1 and the second line segment L2 when viewed from the axial direction D1. The second angle AG12 is defined on an opposite side of the first angle AG11 relative to the first rotational axis A1 when viewed from the axial direction D1. The first angle AG11 is smaller than the second angle AG12 and is an obtuse angle. The first angle AG11 is smaller than 180 degrees and larger than 90 degrees. However, the first angle AG11 can be an acute angle if needed and/or desired.

As seen in FIG. 8, the first transmission member 20 is movable relative to the base member 18 in the axial direction D1 parallel to the first rotational axis A1. The second transmission member 22 is stationary relative to the base member 18 in the axial direction D1. In the illustrated embodiment, the first transmission member 20 is movable relative to the base member 18 and the second transmission member 22 between a first axial position P1 and a second axial position P2 in the axial direction D1.

The variable speed stage of the bicycle transmission apparatus 12 is variable in accordance with at least one positional relationship among the first transmission member 20, the second transmission member 22, and the first coupling member 24 in the axial direction D1. The axial direction D1 includes a first axial direction D11 and a second axial direction D12 opposite to the first axial direction D11.

The first transmission member 20 includes the first cogwheels CW11 to CW17 arranged in the axial direction D1. Each of the first cogwheels CW11 to CW17 is engageable with the first coupling member 24. The second transmission member 22 includes second cogwheels CW21 to CW27 arranged in the axial direction D1. Each of the second cogwheels CW21 to CW27 is engageable with the first coupling member 24. The first cogwheels CW11 to CW17 respectively define the speed stages together with the second cogwheels CW21 to CW27. The second cogwheels CW21 to CW27 respectively define the speed stages together with the first cogwheels CW11 to CW17.

As seen in FIG. 8, a total number of the first cogwheels CW11 to CW17 is equal to a total number of the second cogwheels CW21 to CW27. In the illustrated embodiment, the first transmission member 20 includes seven first cogwheels CW11 to CW17 arranged in the axial direction D1. The second transmission member 22 includes seven second cogwheels CW21 to CW27 arranged in the axial direction D1. A total number of the first cogwheels can be different from a total number of the second cogwheels if needed and/or desired.

In the illustrated embodiment, the first cogwheels CW11 to CW17 are spaced apart from each other in the axial direction D1 at a regular interval. The second cogwheels CW21 to CW27 are spaced apart from each other in the axial direction D1 at a regular interval equal to the regular interval of the first cogwheels CW11 to CW17.

The first cogwheel CW11 is disposed at an axial position substantially equal to an axial position of the second cogwheel CW27 in a first state where the first transmission member 20 is positioned at the first axial position P1. The first cogwheel CW12 is disposed at an axial position substantially equal to the axial position of the second cogwheel CW27 in a second state where the first transmission member 20 is positioned at the second axial position P2. The first cogwheels CW11 to CW17 are respectively disposed at axial positions equal to axial positions of the second cogwheels CW27 to CW21 in the first state of the first transmission member 20. The first cogwheels CW12 to CW17 are respectively disposed at axial positions equal to axial positions of the second cogwheels CW27 to CW22 in the second state of the first transmission member 20.

Figure 9:
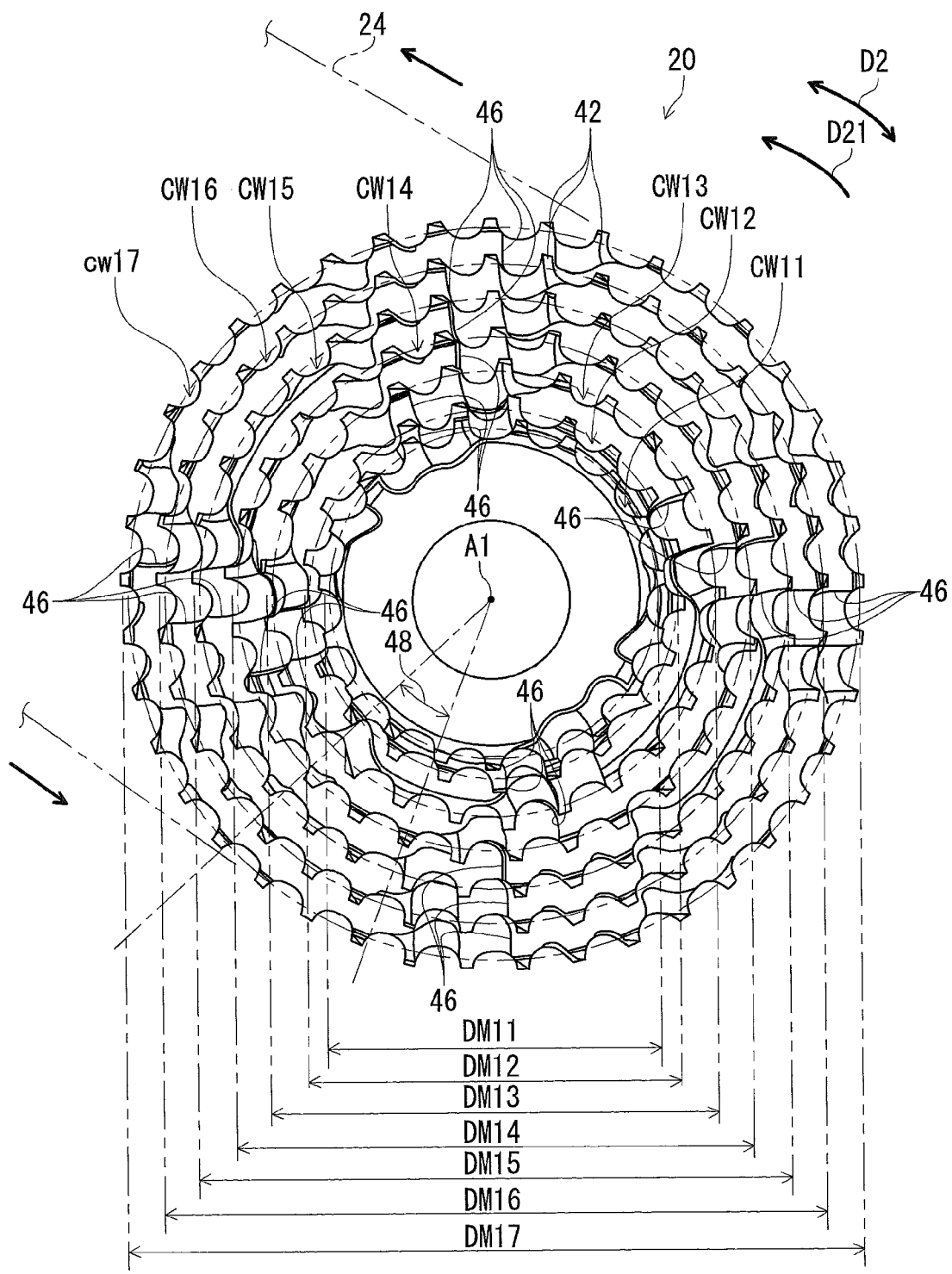
FIG. 9 is a side elevational view of a first transmission member of the bicycle transmission apparatus illustrated in FIG. 1.

As seen in FIG. 9, the first cogwheels CW11 to CW17 has different outer diameters and include a first largest cogwheel CW17 and a first smallest cogwheel CW11. The first smallest cogwheel CW11 has an outer diameter smaller than an outer diameter of the first largest cogwheel CW17. The first largest cogwheel CW17 has a largest outer diameter among the first cogwheels CW11 to CW17. The first smallest cogwheel CW11 has a smallest outer diameter among the first cogwheels CW11 to CW17. As seen in FIG. 8, the first smallest cogwheel CW11 is spaced apart from the first largest cogwheel CW17 in the first axial direction D11.

Figure 10:
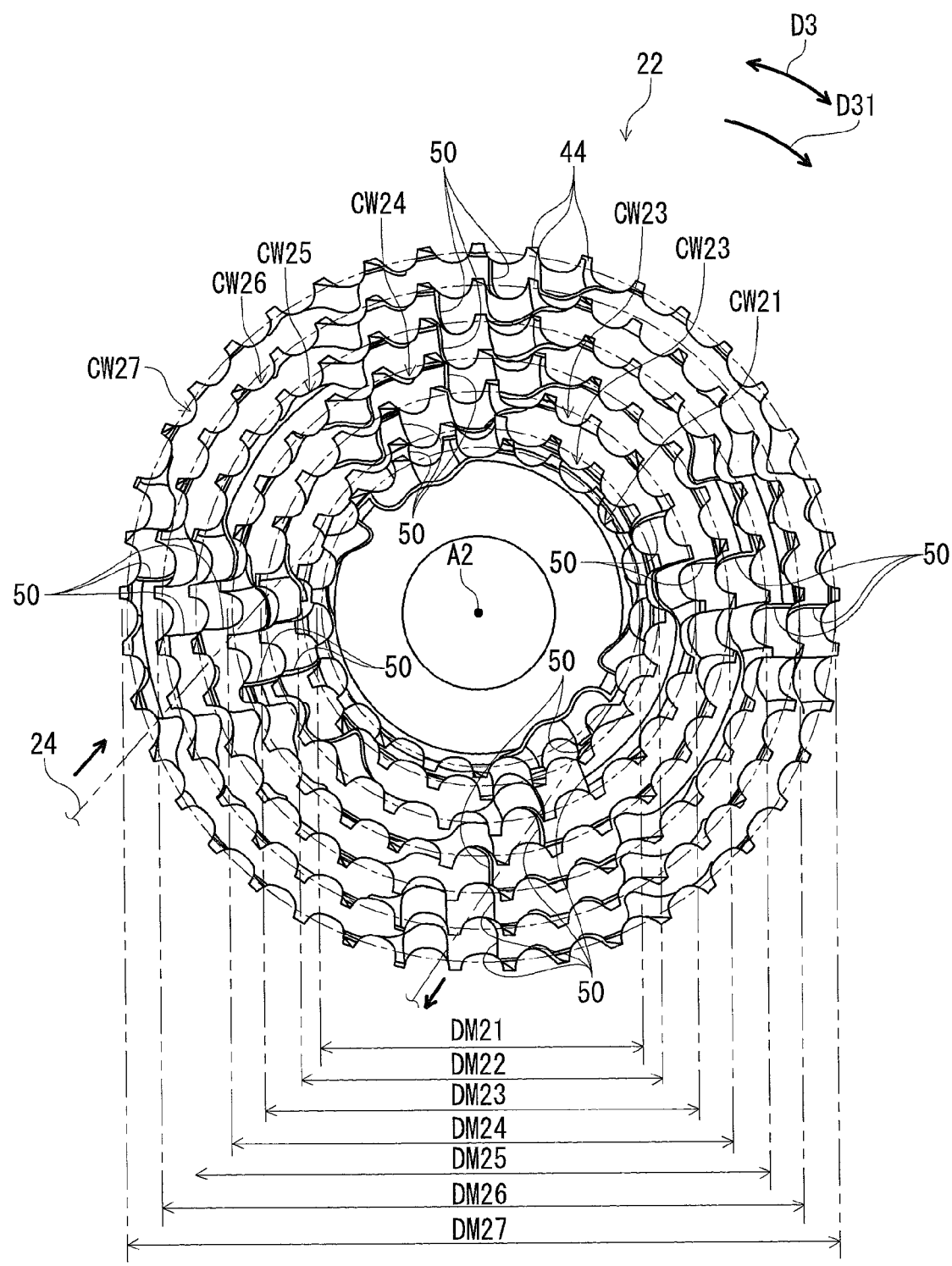
FIG. 10 is a side elevational view of a second transmission member of the bicycle transmission apparatus illustrated in FIG. 1.

As seen in FIG. 10, the second cogwheels CW21 to CW27 has different outer diameters and include a second largest cogwheel CW27 and a second smallest cogwheel CW21. The second smallest cogwheel CW21 has an outer diameter smaller than an outer diameter of the second largest cogwheel CW27. The second largest cogwheel CW27 has a largest outer diameter among the second cogwheels CW21 to CW27. The second smallest cogwheel CW21 has a smallest outer diameter among the second cogwheels CW21 to CW27. As seen in FIG. 8, the second smallest cogwheel CW21 is spaced apart from the second largest cogwheel CW27 in the second axial direction D12. In this embodiment, a total number of the first cogwheels CW11 to CW17 is equal to a total number of the second cogwheels CW21 to CW27. However, the total number of the first cogwheels CW11 to CW17 can be different from the total number of the second cogwheels CW21 to CW27.

As seen in FIG. 9, each of the first cogwheels CW11 to CW17 includes first teeth 42 arranged in a circumferential direction D2 of the first transmission member 20. The first cogwheels CW11 to CW17 respectively have first pitch circles each defined by the first teeth 42. The first transmission member 20 rotates about the first rotational axis A1 in a driving rotational direction D21 during pedaling.

As seen in FIG. 10, each of the second cogwheels CW21 to CW27 includes second teeth 44 arranged in a circumferential direction D3 of the second transmission member 22. The second cogwheels CW21 to CW27 respectively have second pitch circles each defined by the second teeth 44. The second transmission member 22 rotates about the second rotational axis A2 in a driving rotational direction D31 during pedaling.

As seen in FIGS. 9 and 10, first diameters DM11 to DM17 of the first pitch circles respectively are equal to second diameters DM21 to DM27 of the second pitch circles. Namely, the second cogwheels CW21 to CW27 respectively have substantially the same constructions as constructions of the first cogwheels CW11 to CW17. However, the second cogwheels CW21 to CW27 can respectively have different constructions from the constructions of the first cogwheels CW11 to CW17 if needed and/or desired.

As seen in FIG. 9, the first transmission member 20 includes a first shifting facilitation part configured to facilitate shifting the first coupling member 24 relative to the first transmission member 20 in the axial direction D1. In the illustrated embodiment, at least one of the first cogwheels CW11 to CW17 of the first transmission member 20 includes a first shifting facilitation part 46 configured to facilitate shifting the first coupling member 24 relative to the first transmission member 20 in the axial direction D1. Each of the first cogwheels CW12 to CW17 includes the first shifting facilitation parts 46. The first shifting facilitation parts 46 are recessed in the axial direction D1 to guide the first coupling member 24 from a currently engaged cogwheel to an adjacent larger cogwheel in the first cogwheels CW11 to CW17 when changing a speed stage.

The first shifting facilitation part 46 is disposed in a first shifting area 48 of the first transmission member 20 when the bicycle crank B7 is disposed at or adjacent to a dead center DC1 (FIG. 4). As seen in FIG. 4, in a state where the bicycle crank B7 is disposed at the dead center DC1, the crank arms B71 and B72 extend in a vertical direction D4.

As seen in FIG. 10, the second transmission member 22 includes a second shifting facilitation part configured to facilitate shifting the first coupling member 24 relative to the second transmission member 22 in the axial direction D1. In the illustrated embodiment, at least one of the second cogwheels CW21 to CW27 of the second transmission member 22 includes a second shifting facilitation part 50 configured to facilitate shifting the first coupling member 24 relative to the second transmission member 22 in the axial direction D1. Each of the second cogwheels CW22 to CW27 includes the second shifting facilitation parts 50. The second shifting facilitation parts 50 are recessed in the axial direction D1 to guide the first coupling member 24 from a currently engaged cogwheel to an adjacent larger cogwheel in the second cogwheels CW22 to CW27 when changing a speed stage.

Figure 11:
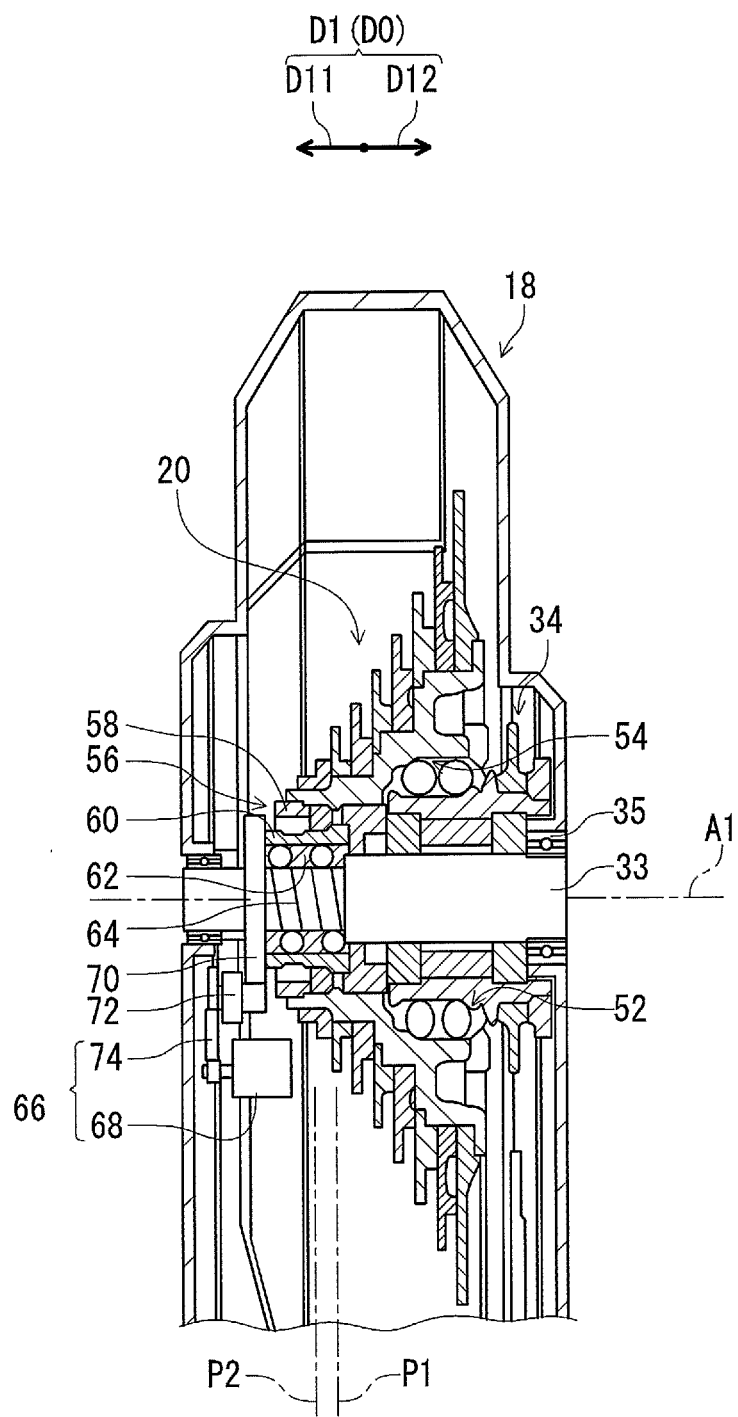
FIG. 11 is a cross-sectional view of the bicycle transmission apparatus illustrated in FIG. 1.

As seen in FIG. 11, the bicycle transmission apparatus 12 further comprises a bearing structure 52. The bearing structure 52 is configured to rotatably couple the first transmission member 20 to the first shaft 33 about the first rotational axis A1. The first transmission member 20 has a first opening 54. The first shaft 33 extends through the first opening 54. The bearing structure 52 is provided in the first opening 54.

The first shaft 33 is rotatable relative to the base member 18. The first shaft 33 is restricted from moving relative to the base member 18 in the axial direction D1. The bearing structure 52 is configured to movably couple the first transmission member 20 to the first shaft 33 in the axial direction D1. Namely, the first transmission member 20 is rotatable relative to the base member 18 and the first shaft 33 and is movable relative to the base member 18 and the first shaft 33 in the axial direction D1. Unlike the first transmission member 20, the intermediate cogwheel 34 is stationary relative to the base member 18 in the axial direction D1.

As seen in FIG. 11, the bicycle transmission apparatus 12 further comprises a positioning device 56 configured to position the first transmission member 20 relative to the base member 18 in the axial direction D1 at each of axial positions. The positioning device 56 is configured to position the first transmission member 20 relative to the base member 18 in the axial direction D1 at each of the first axial position P1 and the second axial position P2. The first transmission member 20 is movable relative to the base member 18 in the first axial direction D11 from the first axial position P1 to the second axial position P2. The first transmission member 20 is movable relative to the base member 18 in the second axial direction D12 from the second axial position P2 to the first axial position P1.

In the illustrated embodiment, the positioning device 56 includes a holder 58, rolling elements 60, and a retainer 62. The holder 58 is rotatable relative to the first transmission member 20 and the first shaft 33 about the first rotational axis A1. The holder 58 is movable integrally with the first transmission member 20 relative to the base member 18 and the first shaft 33 in the axial direction D1. The holder 58 has a tubular shape. The rolling elements 60 and the retainer 62 are provided in the holder 58. The retainer 62 is configured to rotatably hold the rolling elements 60 and is attached to the holder 58 to move integrally with the holder 58 in the axial direction D1.

The first shaft 33 includes a guide groove 64 configured to guide the rolling elements 60 in the axial direction D1. The guide groove 64 is provided on an outer peripheral surface of the first shaft 33 in a spiral manner. The rolling elements 60 are provided in the guide groove 64 and are arranged around the first shaft 33 along the guide groove 64. The holder 58, the rolling elements 60, the retainer 62, and the guide groove 64 constitute a ball screw configured to convert rotation of the first shaft 33 into linear motion of the first transmission member 20. Rotation of the first shaft 33 relative to the base member 18 moves the holder 58, the rolling elements 60, and the retainer 62 relative to the first shaft 33 and the base member 18 in the axial direction D1. This moves the first transmission member 20 relative to the base member 18 in the axial direction D1.

The bicycle transmission apparatus 12 further comprises a switching device 66 configured to switch a position of the first transmission member 20 relative to the base member 18 in the axial direction D1 between the first axial position P1 and the second axial position P2.

In the illustrated embodiment, the switching device 66 includes a switching actuator 68, a driven gear 70, a reduction structure 72, and a reverse-input prevention element 74. The switching actuator 68, the driven gear 70, the reduction structure 72, and the reverse-input prevention element 74 are provided in the base member 18 and are mounted to the base member 18. The reduction structure 72 includes some gears to decelerate an input rotation from the actuator 69 and to output decelerated rotation to the driven gear 70. The switching actuator 68 is configured to generate an actuating force to move the first transmission member 20 relative to the base member 18 in the axial direction D1. While the switching actuator 68 is a stepper motor in the illustrated embodiment, the switching actuator 68 can be a direct-current (DC) motor or other type of actuators if needed and/or desired. The driven gear 70 is coupled to the first shaft 33 to rotate integrally with the first shaft 33 about the first rotational axis A1. An output gear of the reduction structure 72 meshes with the driven gear 70 to transmit rotation to the driven gear 70 relative to the base member 18 about the first rotational axis A1 at a specific gear ratio. The reduction structure 72 is a reduction gear, for example.

The reverse-input prevention element 74 is configured to transmit the actuating force from the switching actuator 68 to the reduction structure 72. Specifically, the reverse-input prevention element 74 is configured to transmit rotation from the switching actuator 68 to the reduction structure 72 in both rotational directions. On the other hand, the reverse-input prevention element 74 is further configured to prevent rotation of the reduction structure 72 from being transmitted from the reduction structure 72 to the switching actuator 68. The reverse-input prevention element 74 can be omitted from the switching device 66 if needed and/or desired.

Other structures can be applied to the switching device 66. For example, it is possible to directly move the first transmission member 20 relative to the base member 18 using structures such as gears or cams if needed and/or desired.

Figure 12:
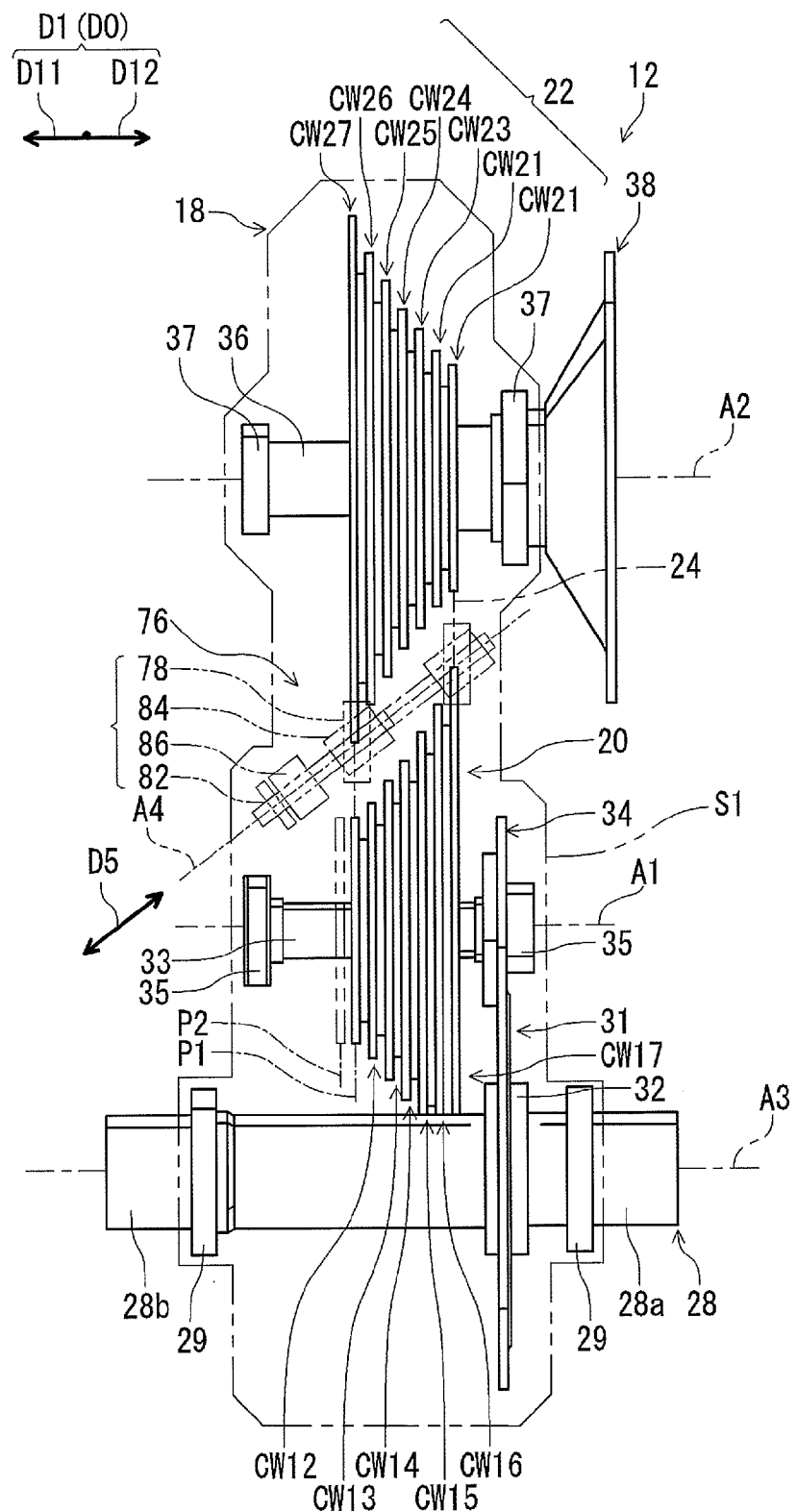
FIG. 12 is another plan view of the bicycle transmission apparatus illustrated in FIG. 1 without the base member when viewed diagonally backward.
Figure 13:
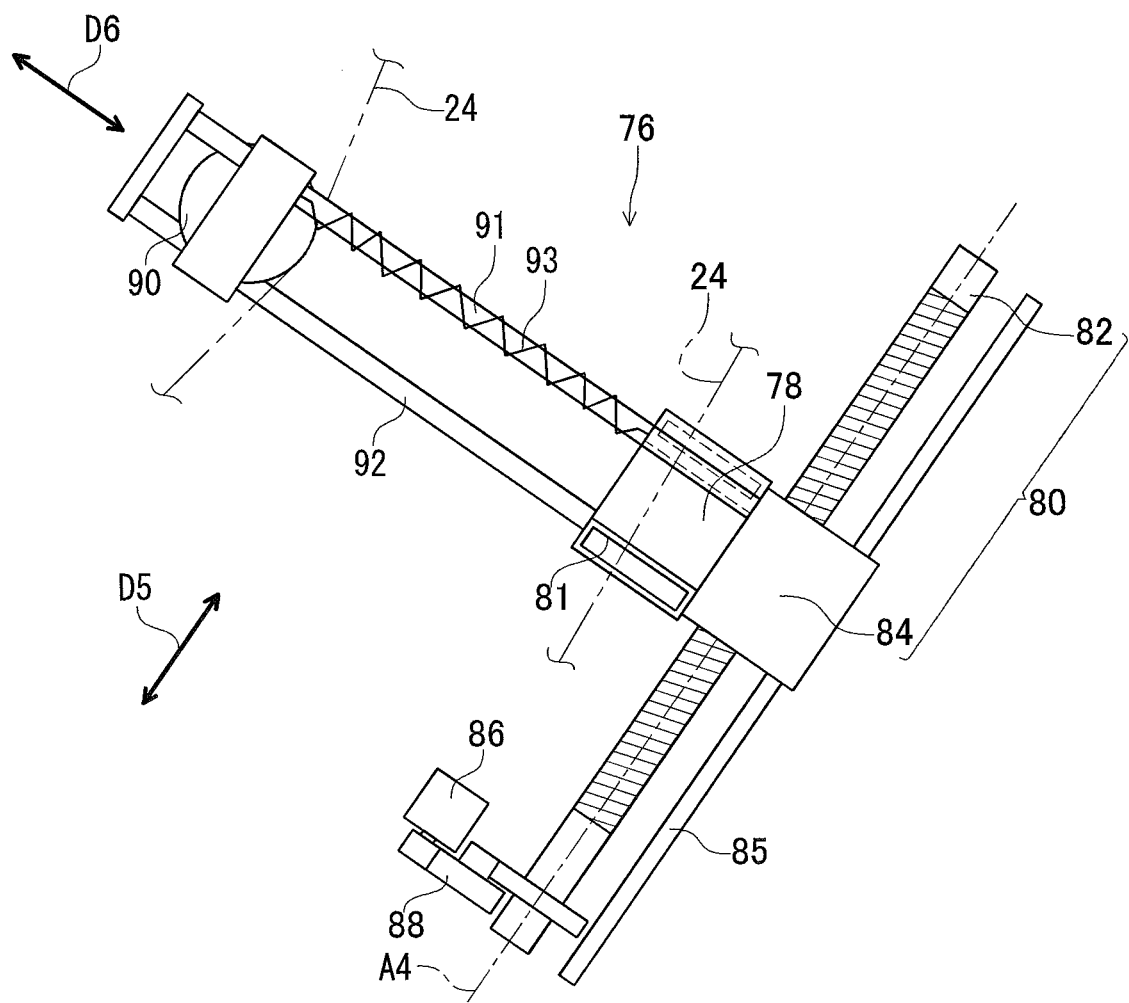
FIG. 13 is an elevational view of a guide device of the bicycle transmission apparatus illustrated in FIG. 1.

As seen in FIGS. 12 and 13, the bicycle transmission apparatus 12 further comprises a guide device 76. The guide device 76 is configured to guide the first coupling member 24 to change at least one of a first relative position between the first coupling member 24 and the first transmission member 20, and a second relative position between the first coupling member 24 and the second transmission member 22. In this embodiment, the guide device 76 is configured to guide the first coupling member 24 to change the first relative position between the first coupling member 24 and the first transmission member 20. The guide device 76 avoids interference between the guide device 76 and the first coupling member 24 when the second relative position changes. However, the guide device 76 can be configured to guide the first coupling member 24 to change the second relative position between the first coupling member 24 and the second transmission member 22 instead of or in addition to changing the first relative position.

The guide device 76 includes a guide member 78 and a guide unit 80. The guide member 78 is contactable with the first coupling member 24. The guide unit 80 is configured to guide the guide member 78 in a first guide direction D5 to change at least one of the first relative position and the second relative position. The guide unit 80 is provided in the base member 18 and are mounted to the base member 18. In the illustrated embodiment, the first guide direction D5 is not parallel to the axial direction D1. However, the first guide direction D5 can be parallel to the axial direction D1 if needed and/or desired.

As seen in FIG. 13, the guide member 78 includes a guide opening 81 through which the first coupling member 24 extends. The guide member 78 is slidable with the first coupling member 24 to move (shift) the first coupling member 24 in the first guide direction D5. The guide member 78 is provided in a pulling area defined between the first transmission member 20 and the second transmission member 22. In the pulling area, the first coupling member 24 is pulled by the first transmission member 20 to transmit the pedaling force from the first transmission member 20 to the second transmission member 22.

As seen in FIGS. 12 and 13, the guide unit 80 includes a guide shaft 82 and a coupling structure 84. The guide shaft 82 is rotatable relative to the base member 18 about a guide rotational axis A4 parallel to the first guide direction D5. The guide shaft 82 is rotatably mounted to the base member 18 via bearing units (not shown). The coupling structure 84 is configured to rotatably couple the guide shaft 82 to the guide member 78. The guide shaft 82 and the coupling structure 84 constitute a ball screw configured to convert rotation of the guide shaft 82 into a linear motion of the guide member 78.

As seen in FIG. 13, the guide unit 80 further includes a sub shaft 85 extending along the guide shaft 82 in the first guide direction D5. The sub shaft 85 extends through a hole (not shown) of the coupling structure 84 to prevent the coupling structure 84 from rotating relative to the base member 18 about the guide rotational axis A4.

As seen in FIG. 13, the guide device 76 includes a guide actuator 86 configured to move the guide member 78 in the first guide direction D5. The guide actuator 86 is configured to generate an actuating force to rotate the guide shaft 82 relative to the base member 18 about the guide rotational axis A4. The guide device 76 includes an intermediate gear 88 configured to transmit rotation of the guide actuator 86 to the guide shaft 82 at a specific gear ratio. The intermediate gear 88 is a reduction gear, for example.

While the guide device 76 includes the guide actuator 86 configured to move the guide member 78 in response to the input shift signal in the illustrated embodiment, the guide member 78 can be operated via a mechanical control cable such as a Bowden cable.

As seen in FIGS. 4 and 13, the guide device 76 includes a tensioner 90 contactable with the first coupling member 24. In the illustrated embodiment, the tensioner 90 comprises a tension pulley configured to engage with the first coupling member 24. The guide unit 80 is configured to guide the tensioner 90 in a second guide direction D6 to adjust tension of the first coupling member 24. The second guide direction D6 is different from the first guide direction D5 and the axial direction D1. The guide member 78 and the tensioner 90 are arranged in the second guide direction D6. The second guide direction D6 is preferably perpendicular to the first guide direction D5 and the axial direction D1.

The guide device 76 includes a first guide pole 91, a second guide pole 92, and a biasing element 93. The first guide pole 91 and the second guide pole 92 extend in the second guide direction D6 to guide the tensioner 90 in the second guide direction D6. The biasing element 93 is configured to bias the tensioner 90 along the first guide pole 91 and the second guide pole 92 in the second guide direction D6. The biasing element 93 is configured to pull the tensioner 90 toward the guide member 78 in the second guide direction D6. While the biasing element 93 is a tension spring in the illustrated embodiment, the biasing element 93 can be members other than the tension spring. The tensioner 90 is a pulley, for example.

As seen in FIG. 13, the tensioner 90 moves integrally with the guide member 78 relative to the base member 18 (FIG. 4) in the first guide direction D5. The tensioner 90 is configured to guide the first coupling member 24 together with the guide member 78. The tensioner 90 is provided in a releasing area defined between the first transmission member 20 and the second transmission member 22. In the releasing area, the first coupling member 24 is released from the first transmission member 20 to the second transmission member 22.

As seen in FIG. 4, the base member 18 is configured to store lubricant in the internal space 26. The base member 18 includes a supply port 94 through which the lubricant is to be supplied to the internal space 26. Furthermore, the bicycle transmission apparatus 12 comprises a lubricant supply device 95 configured to apply lubricant to the first coupling member 24. The lubricant supply device 95 is attached to the guide member 78 to move integrally with the guide member 78.

Figure 14:
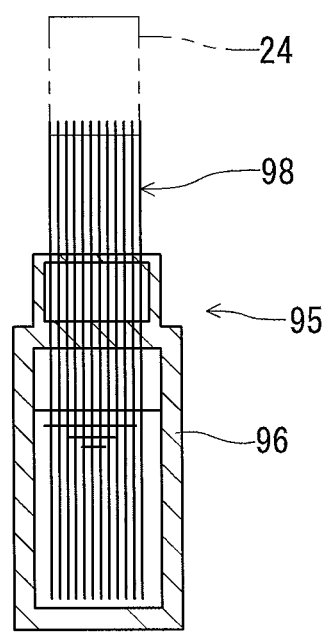
FIG. 14 is a cross-sectional view of a lubricant supply device of the bicycle transmission apparatus illustrated in FIG. 1.

As seen in FIG. 14, the lubricant supply device 95 includes a lubricant case 96 and a brush 98. The lubricant case 96 is configured to store the lubricant. The brush 98 is mounted to the lubricant case 96 to be in contact with the lubricant stored in the lubricant case 96. The brush 98 is disposed to be in contact with the first coupling member 24. The lubricant is applied to the first coupling member 24 via the brush 98.

As seen in FIG. 4, the bicycle transmission apparatus 12 comprises an additional lubricant supply device 100 configured to supply lubricant the input coupling member 30. The additional lubricant supply device 100 is attached to the base member 18. Since the additional lubricant supply device 100 has the same construction as the construction of the lubricant supply device 95 illustrated in FIG. 14, it will not be described and/or illustrated in detail here for the sake of brevity.

Figure 15:
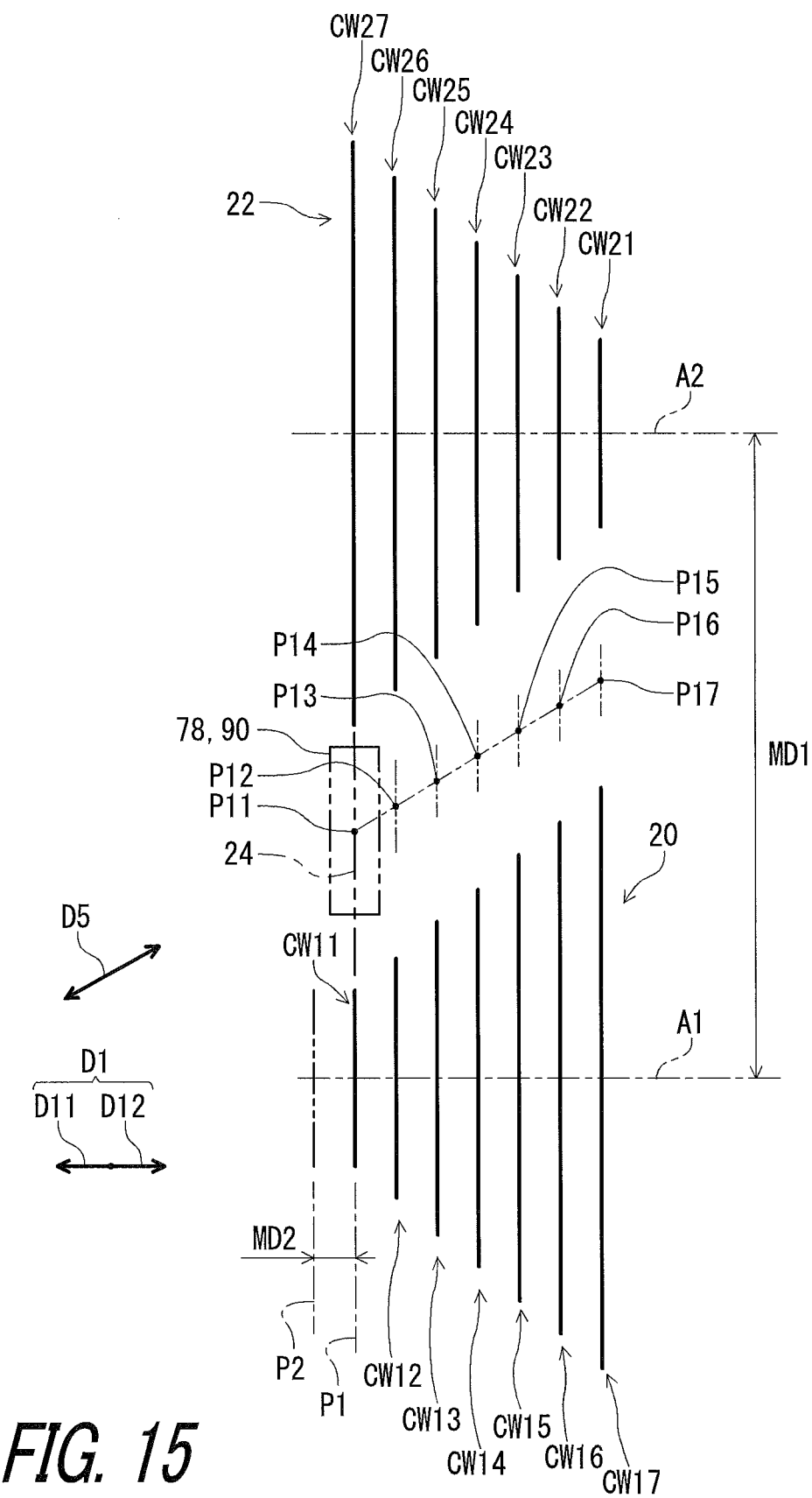
FIG. 15 is a schematic diagram showing an arrangement of the first transmission member, the second transmission member, and the guide device of the bicycle transmission apparatus illustrated in FIG. 1.

As seen in FIG. 15, the guide device 76 is configured to move and position the guide member 78 between first to seventh guide positions P11 to P17 in the first guide direction D5. The first to seventh guide positions P11 to P17 respectively correspond to the second cogwheels CW27 to CW21.

The first largest cogwheel CW17 is provided at an end of the first cogwheels CW11 to CW17 in the first axial direction D11. The second largest cogwheel is provided at an end of the second cogwheels in the second axial direction D12. The first smallest cogwheel CW11 is provided at an end of the first cogwheels CW11 to CW17 in the second axial direction D12. The second smallest cogwheel CW21 is provided at an end of the second cogwheels CW21 to CW27 in the first axial direction D11. The first axial direction D11 is a direction in which the first largest cogwheel CW17 moves toward the second largest cogwheel CW27. The second axial direction D12 is a direction in which the first largest cogwheel CW17 moves away from the second largest cogwheel CW27.

Figure 16:
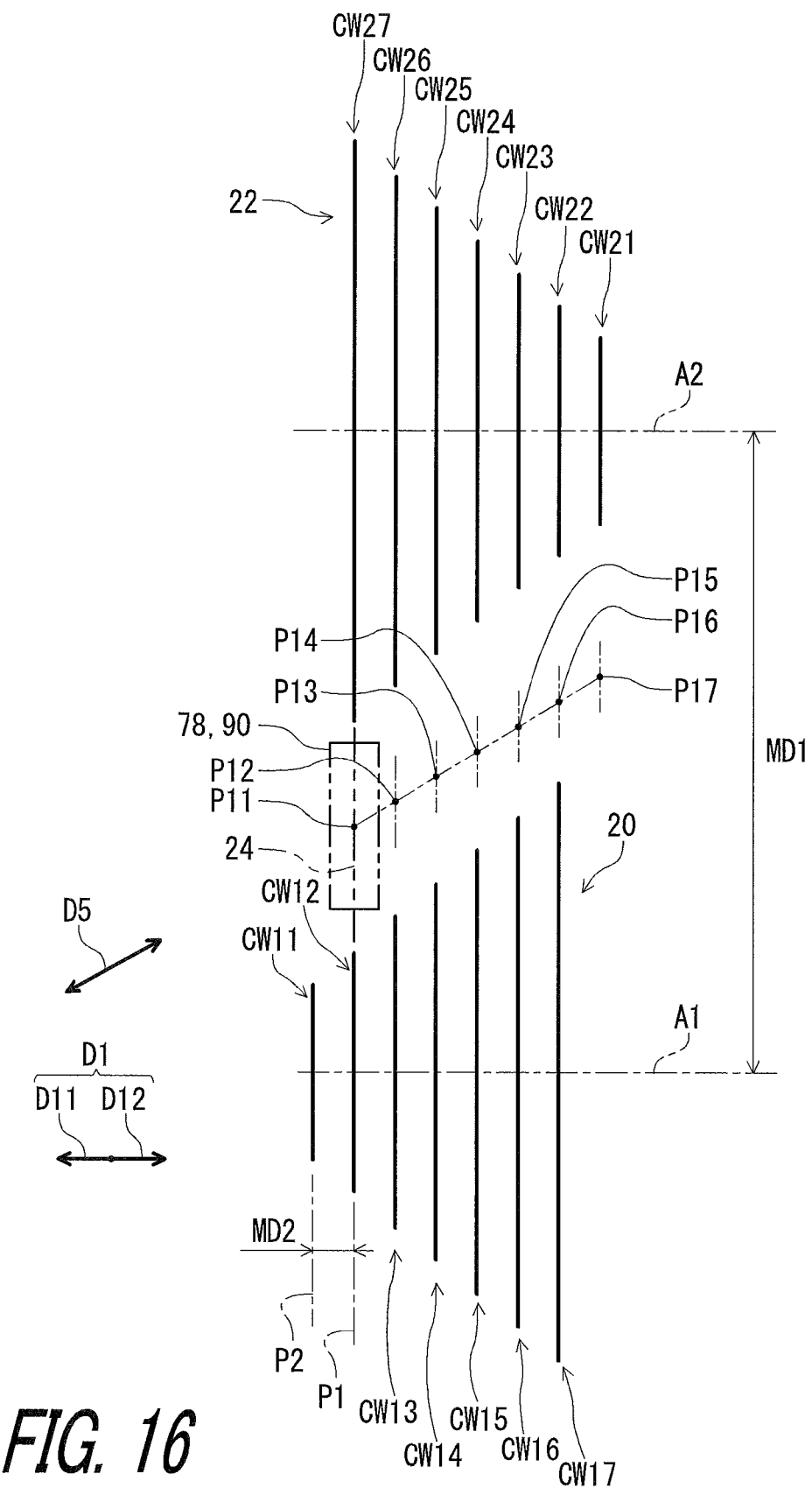
FIG. 16 is a schematic diagram showing an arrangement of the first transmission member, the second transmission member, and the guide device of the bicycle transmission apparatus illustrated in FIG. 1.

As seen in FIG. 15, the first transmission member 20 is movable relative to the base member 18 in the axial direction D1 between the first axial position P1 and the second axial position P2. The first cogwheels CW11 to CW17 are respectively aligned with the second cogwheels CW21 to CW27 at the first axial position P1. As seen in FIG. 16, the first cogwheels CW11 to CW17 other than the first smallest cogwheel CW11 are aligned with the second cogwheels CW21 to CW27 other than the second smallest cogwheel CW21 at the second axial position P2.

As seen in FIGS. 15 and 16, the first transmission member 20 is movable relative to the base member 18 and the first coupling member 24 in the first axial direction D11 without changing an axial relative position between the first coupling member 24 and the second transmission member 22 during one of upshifting and downshifting. The first transmission member 20 is movable relative to the base member 18 and the first coupling member 24 in the first axial direction D11 so as to change an axial relative position between the first coupling member 24 and the first transmission member 20 during the one of upshifting and downshifting.

In the illustrated embodiment, the first transmission member 20 is movable relative to the base member 18 and the first coupling member 24 in the first axial direction D11 without changing an axial relative position between the first coupling member 24 and the second transmission member 22 during upshifting (from FIG. 15 to FIG. 16). The first transmission member 20 is movable relative to the base member 18 and the first coupling member 24 in the first axial direction D11 so as to change an axial relative position between the first coupling member 24 and the first transmission member 20 during upshifting (from FIG. 15 to FIG. 16).

Figure 17:
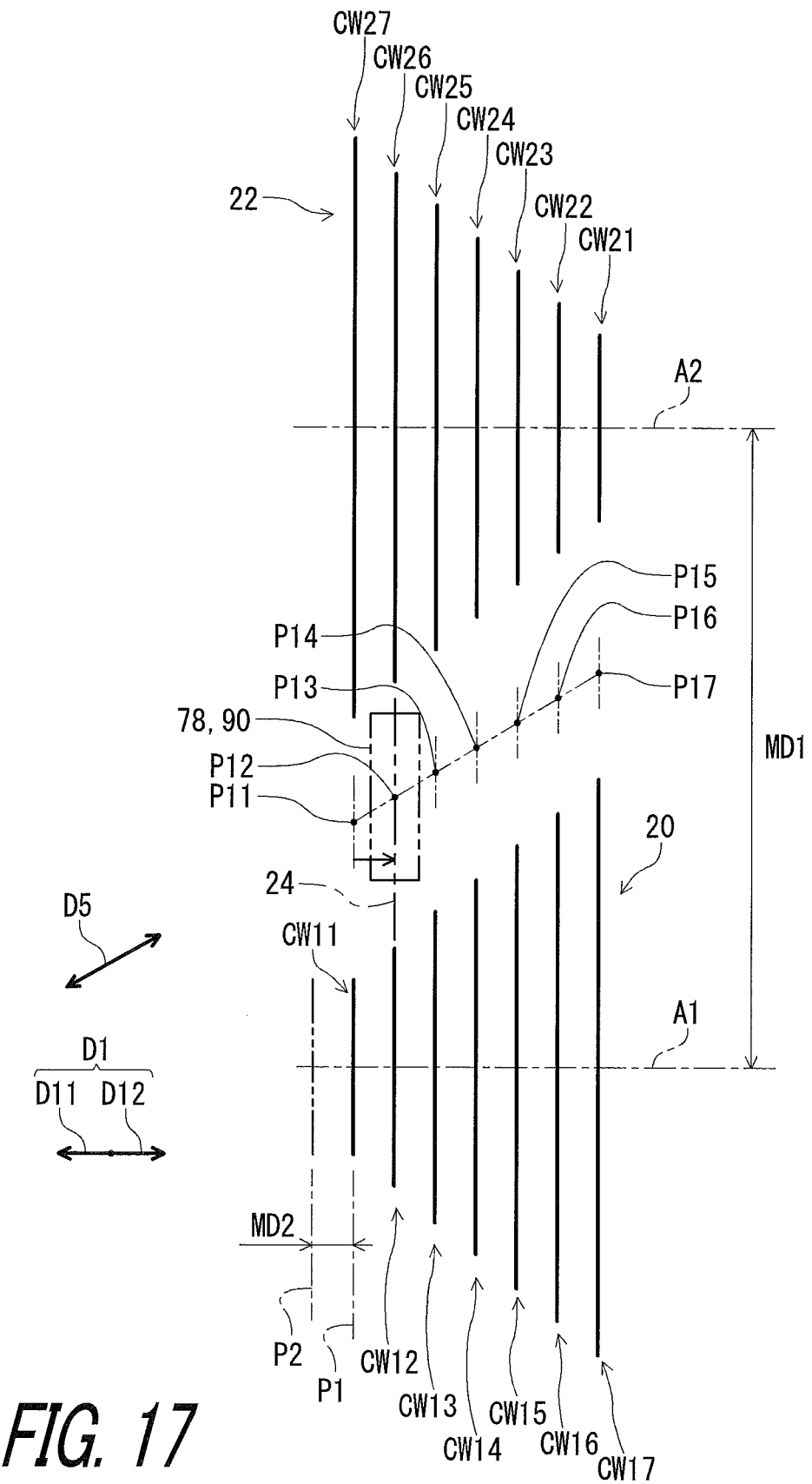
FIG. 17 is a schematic diagram showing an arrangement of the first transmission member, the second transmission member, and the guide device of the bicycle transmission apparatus illustrated in FIG. 1.

As seen in FIGS. 16 and 17, the first transmission member 20 is movable together with the first coupling member 24 relative to the base member 18 in the second axial direction D12 so as to change the axial relative position between the first coupling member 24 and the second transmission member 22 during the one of upshifting and downshifting. The first transmission member 20 is movable together with the first coupling member 24 relative to the base member 18 in the second axial direction D12 without changing the axial relative position between the first coupling member 24 and the first transmission member 20 during the one of upshifting and downshifting.

In the illustrated embodiment, the first transmission member 20 is movable together with the first coupling member 24 relative to the base member 18 in the second axial direction D12 so as to change the axial relative position between the first coupling member 24 and the second transmission member 22 during upshifting (from FIG. 16 to FIG. 17). The first transmission member 20 is movable together with the first coupling member 24 relative to the base member 18 in the second axial direction D12 without changing the axial relative position between the first coupling member 24 and the first transmission member 20 during upshifting (from FIG. 16 to FIG. 17).

Furthermore, as seen in FIGS. 16 and 17, the first transmission member 20 is movable together with the first coupling member 24 relative to the base member 18 in the first axial direction D11 so as to change the axial relative position between the first coupling member 24 and the second transmission member 22 during said another of upshifting and downshifting. The first transmission member 20 is movable together with the first coupling member 24 relative to the base member 18 in the first axial direction D11 without changing the axial relative position between the first coupling member 24 and the first transmission member 20 during said another of upshifting and downshifting.

In this embodiment, the first transmission member 20 is movable together with the first coupling member 24 relative to the base member 18 in the first axial direction D11 so as to change the axial relative position between the first coupling member 24 and the second transmission member 22 during downshifting (from FIG. 17 to FIG. 16). The first transmission member 20 is movable together with the first coupling member 24 relative to the base member 18 in the first axial direction D11 without changing the axial relative position between the first coupling member 24 and the first transmission member 20 during downshifting (from FIG. 17 to FIG. 16).

Furthermore, as seen in FIGS. 15 and 16, the first transmission member 20 is movable relative to the base member 18 and the first coupling member 24 in the second axial direction D12 without changing the axial relative position between the first coupling member 24 and the second transmission member 22 during another of upshifting and downshifting. The first transmission member 20 is movable relative to the base member 18 and the first coupling member 24 in the second axial direction D12 so as to change the axial relative position between the first coupling member 24 and the first transmission member 20 during said another of upshifting and downshifting.

In this embodiment, the first transmission member 20 is movable relative to the base member 18 and the first coupling member 24 in the second axial direction D12 without changing the axial relative position between the first coupling member 24 and the second transmission member 22 during downshifting (from FIG. 16 to FIG. 15). The first transmission member 20 is movable relative to the base member 18 and the first coupling member 24 in the second axial direction D12 so as to change the axial relative position between the first coupling member 24 and the first transmission member 20 during downshifting (from FIG. 16 to FIG. 15).

As seen in FIGS. 15 and 16, the first transmission member 20 is movable relative to the base member 18, the first coupling member 24, and the guide member 78 in the first axial direction D11 so as to change the axial relative position between the first coupling member 24 and the first transmission member 20 during the one of upshifting and downshifting. In this embodiment, the first transmission member 20 is movable relative to the base member 18, the first coupling member 24, and the guide member 78 in the first axial direction D11 so as to change the axial relative position between the first coupling member 24 and the first transmission member 20 during upshifting (from FIG. 15 to FIG. 16). The guide member 78 is positioned at the first guide position P11 to keep an axial position of the first coupling member 24 relative to the second transmission member 22 in the axial direction. The guide member 78 contacts the first coupling member 24 when the first transmission member 20 moves relative to the base member 18, the first coupling member 24, and the guide member 78 in the first axial direction D11.

As seen in FIGS. 16 and 17, the first transmission member 20 is movable together with the first coupling member 24 and the guide member 78 relative to the base member 18 in the second axial direction D12 so as to change the axial relative position between the first coupling member 24 and the second transmission member 22 during the one of upshifting and downshifting. In this embodiment, the first transmission member 20 is movable together with the first coupling member 24 and the guide member 78 relative to the base member 18 in the second axial direction D12 so as to change the axial relative position between the first coupling member 24 and the second transmission member 22 during upshifting (from FIG. 16 to FIG. 17). At this time, the first coupling member 24 moves relative to the first transmission member 20 with contacting the guide member 78 when the first transmission member 20 moves relative to the base member 18 in the second axial direction D12.

As seen in FIGS. 16 and 17, the first transmission member 20 is movable together with the first coupling member 24 and the guide member 78 relative to the base member 18 in the first axial direction D11 so as to change the axial relative position between the first coupling member 24 and the second transmission member 22 during said another of upshifting and downshifting. In this embodiment, the first transmission member 20 is movable together with the first coupling member 24 and the guide member 78 relative to the base member 18 in the first axial direction D11 so as to change the axial relative position between the first coupling member 24 and the second transmission member 22 during downshifting (from FIG. 17 to FIG. 16). At this time, the first coupling member 24 moves relative to the first transmission member 20 with contacting the guide member 78 when the first transmission member 20 moves relative to the base member 18 in the second axial direction D12.

As seen in FIGS. 15 and 16, the first transmission member 20 is movable relative to the base member 18, the first coupling member 24, and the guide member 78 in the second axial direction D12 so as to change the axial relative position between the first coupling member 24 and the first transmission member 20 during said another of upshifting and downshifting. In this embodiment, the first transmission member 20 is movable relative to the base member 18, the first coupling member 24, and the guide member 78 in the second axial direction D12 so as to change the axial relative position between the first coupling member 24 and the first transmission member 20 during downshifting (from FIG. 16 to FIG. 15). The guide member 78 is positioned at the first guide position P11 to keep the axial position of the first coupling member 24 relative to the second transmission member 22 in the axial direction. The guide member 78 contacts the first coupling member 24 when the first transmission member 20 moves relative to the base member 18, the first coupling member 24, and the guide member 78 in the second axial direction D12.

The above operation of the first transmission member 20, the first coupling member 24, and the guide member 78 is applied to a case where the guide member 78 is positioned at each of the third to seventh guide positions P13 to P17. For example, the guide member 78 can be positioned at the third guide position P13 in FIG. 17 in a case where the guide member 78 is positioned at the second guide position P12 in FIGS. 15 and 16.

In this embodiment, the guide member 78 contacts the first coupling member 24 when the first transmission member 20 moves relative to the base member 18, the first coupling member 24, and the guide member 78 in the first axial direction D11. The guide member 78 contacts the first coupling member 24 when the first transmission member 20 moves relative to the base member 18, the first coupling member 24, and the guide member 78 in the second axial direction D12. The first coupling member 24 moves relative to the first transmission member 20 with contacting the guide member 78 when the first transmission member 20 moves relative to the base member 18 in the first axial direction D11. The first coupling member 24 moves relative to the first transmission member 20 with contacting the guide member 78 when the first transmission member 20 moves relative to the base member 18 in the second axial direction D12.

However, the guide member 78 can be configured to move together with the transmission member 20 without contacting the first coupling member 24 when the first transmission member 20 moves relative to the base member 18, the first coupling member 24, and the guide member 78 in the first axial direction D11. The guide member 78 can be configured to move together with the transmission member 20 without contacting the first coupling member 24 when the first transmission member 20 moves relative to the base member 18, the first coupling member 24, and the guide member 78 in the second axial direction D12. Furthermore, the first coupling member 24 can be configured to move relative to the first transmission member 20 without contacting the guide member 78 when the first transmission member 20 moves relative to the base member 18 in the first axial direction D11. The first coupling member 24 can be configured to move relative to the first transmission member 20 without contacting the guide member 78 when the first transmission member 20 moves relative to the base member 18 in the second axial direction D12. The guide member 78 can be omitted from the guide device 76 in a case where the guide member 78 does not contact the first coupling member 24.

As seen in FIG. 15, a minimum distance MD1 is defined between the first rotational axis A1 and the second rotational axis A2. The first transmission member 20 is movable relative to the base member 18 in the axial direction D1 by a travel distance MD2. The travel distance MD2 is defined between the first axial position P1 and the second axial position P2. A value obtained by dividing the minimum distance MD1 by the travel distance MD2 is in a range of 10 to 40. Preferably, the value obtained by dividing the minimum distance MD1 by the travel distance MD2 is in a range of 18.3 to 25.4.

Figure 18:
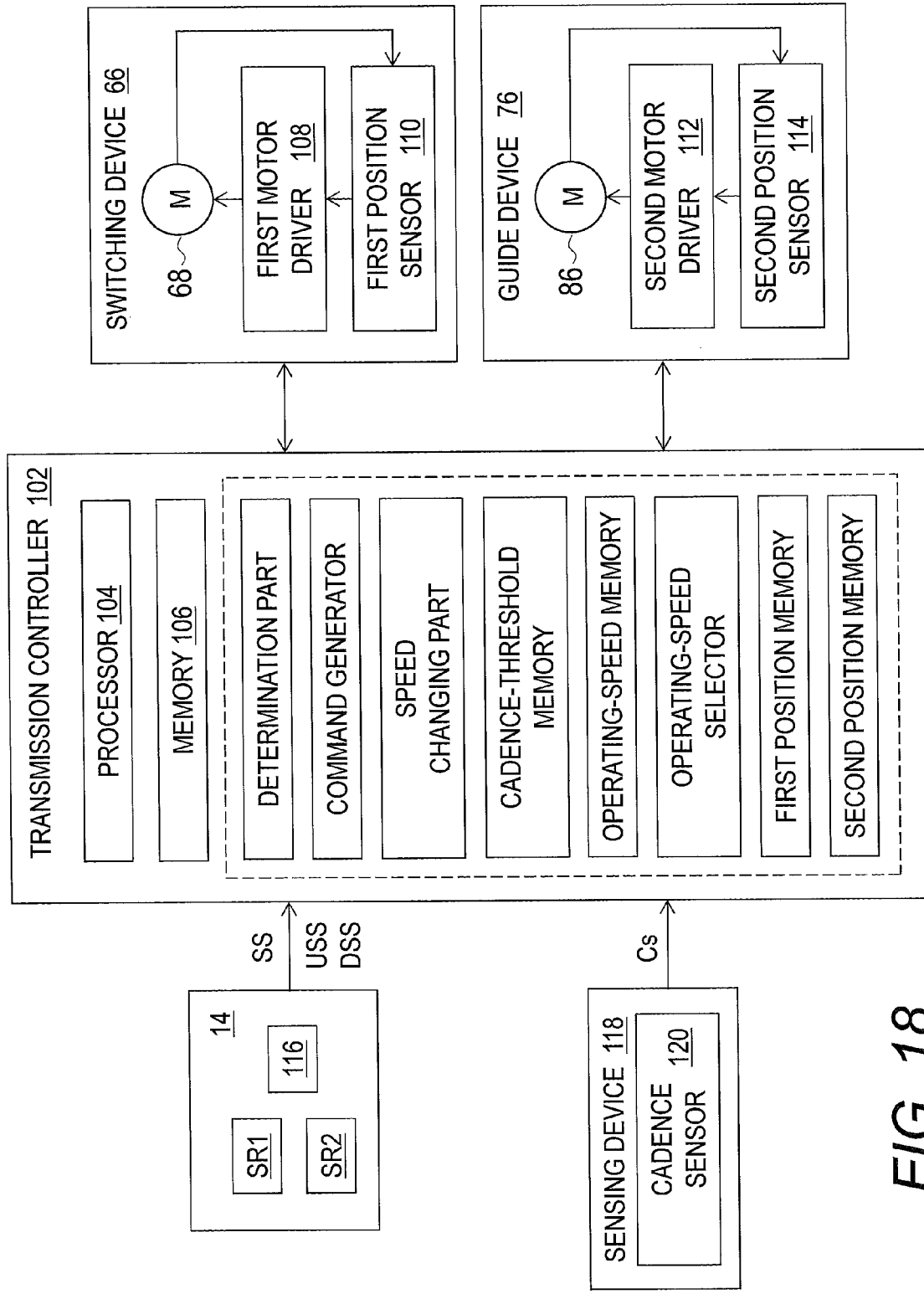
FIG. 18 is a block diagram of the bicycle transmission apparatus illustrated in FIG. 1.

As seen in FIG. 18, the bicycle transmission apparatus 12 further comprises a transmission controller 102. The transmission controller 102 is configured to control the switching device 66 and the guide device 76. Specifically, the transmission controller 102 is configured to control the switching actuator 68 and the guide actuator 86. In the illustrated embodiment, the transmission controller 102 is constituted as a microcomputer and includes a processor 104 and a memory 106. The processor 104 includes a central processing unit (CPU). The memory 106 includes a read only memory (ROM) and a random access memory (RAM). For example, a program stored in the memory 106 is read into the processor 104, and thereby several functions of the transmission controller 102 are performed. The transmission controller 102, the switching device 66 and the guide device 76 are powered by a battery (e.g. a rechargeable battery) which is mounted on the bicycle frame 13 or the base member 18.

While the functions of the transmission controller 102 are performed by software, the functions of the transmission controller 102 can be performed by hardware or by a combination of the software and the hardware if needed and/or desired.

The transmission controller 102 is configured to store a transmission route RT1 (FIG. 19) in the memory 106. FIG. 19 shows a total number of the first teeth 42 in each of the first cogwheels CW11 to CW17, a total number of the second teeth 44 in each of the second cogwheels CW21 to CW27, and gear ratios defined the first cogwheels CW11 to CW17 and the second cogwheels CW21 to CW27. The transmission route RT1 is defined by thirteen gear ratios among the gear ratios defined by the first cogwheels CW11 to CW17 and the second cogwheels CW21 to CW27. Namely, the transmission controller 102 includes a transmission route memory configured to store the transmission route RT1 defined by at least two of the gear ratios defined by the first cogwheels CW11 to CW17 and the second cogwheels CW21 to CW27.

To control the switching device 66 and the guide device 76 based on the transmission route RT1 of FIG. 19, as seen in FIGS. 18 and 20, the transmission controller 102 is configured to store shift information SF1 defined based on the transmission route RT1 in the memory 106. As seen in FIG. 20, for example, the shift information SF1 includes combinations of the axial positions of the first transmission member 20 and the positions of the guide member 78 for the speed stages of the bicycle transmission apparatus 12. The transmission controller 102 is further configured to store a current speed stage of the bicycle transmission apparatus 12 in the memory 106.

As seen in FIG. 18, the switching device 66 includes a first motor driver 108 and a first position sensor 110. The first motor driver 108 is configured to control the switching actuator 68 based on commands and/or signals from the transmission controller 102. The first position sensor 110 is configured to sense the axial position of the first transmission member 20. In the illustrated embodiment, the first position sensor 110 is configured to sense one of a rotational position of the switching actuator 68, a rotational position of the reduction structure 72, and a rotational position of the first shaft 33 to obtain the axial position of the first transmission member 20. While the first position sensor 110 is a potentiometer in the illustrated embodiment, the first position sensor 110 can be other sensors such as a rotary encoder if needed and/or desired. The transmission controller 102 is configured to store a current axial position of the first transmission member 20 among the first axial position P1 and the second axial position P2 in the memory 106. Namely, the transmission controller 102 includes a first position memory configured to store the current axial position of the first transmission member 20.

The guide device 76 includes a second motor driver 112 and a second position sensor 114. The second motor driver 112 is configured to control the guide actuator 86 based on commands and/or signals from the transmission controller 102. The second position sensor 114 is configured to sense the position of the guide member 78. In the illustrated embodiment, the second position sensor 114 is configured to sense a rotational position of the guide actuator 86, a rotational position of the intermediate gear 88, and a rotational position of the guide shaft 82 to obtain the position of the guide member 78. While the second position sensor 114 is a potentiometer in the illustrated embodiment, the second position sensor 114 can be other sensors such as a rotary encoder. The transmission controller 102 is configured to store a current position of the guide member 78 in the memory 106. Namely, the transmission controller 102 includes a second position memory configured to store the current position of the guide member 78.

The shifter 14 includes a first operating member SR1 and a second operating member SR2. The first operating member SR1 is configured to be operated by a user for upshifting. The second operating member SR2 is configured to be operated by the user for downshifting. The shifter 14 includes a signal controller 116 configured to generate a shifting signal SS based on input operations of the first operating member SR1 and the second operating member SR2. The signal controller 116 is configured to generate an upshifting signal USS based on an input operation of the first operating member SR1. The signal controller 116 is configured to generate a downshifting signal DSS based on an input operation of the second operating member SR2. The upshifting signal USS and the downshifting signal DSS are inputted from the shifter 14 to the transmission controller 102. The transmission controller 102 controls the switching actuator 68 and the guide actuator 86 based on the shifting signal SS and the transmission route RT1 (e.g., the shift information SF1) stored in the memory 106.

For example, when the upshifting signal USS is inputted from the shifter 14 to the transmission controller 102 in a state where the speed stage is in a low gear (FIG. 15), the transmission controller 102 controls the switching actuator 68 to move the first transmission member 20 from the first axial position P1 to the second axial position P2 in the first axial direction D11 (FIGS. 16 and 20). At this time, as seen in FIGS. 16 and 20, the transmission controller 102 controls the guide actuator 86 to keep the guide member 78 at the first guide position P11. Thus, the first transmission member 20 is shifted relative to the second transmission member 22 and the first coupling member 24 in the first axial direction D11. Accordingly, as seen in FIGS. 16, 19, and 20, the first coupling member 24 is shifted from the first cogwheel CW11 to the first cogwheel CW12, changing the speed stage of the bicycle transmission apparatus 12 from low gear to second gear.

When the upshifting signal USS is inputted from the shifter 14 to the transmission controller 102 in a state where the speed stage is in second gear (FIG. 16), the transmission controller 102 controls the switching actuator 68 to move the first transmission member 20 from the second axial position P2 to the first axial position P1 in the second axial direction D12 (FIGS. 17 and 20). At this time, as seen in FIGS. 17 and 20, the transmission controller 102 controls the guide actuator 86 to move the guide member 78 from the first guide position P11 to the second guide position P12. In the illustrated embodiment, the first transmission member 20 and the guide member 78 are substantially simultaneously moved. Thus, the first transmission member 20 and the first coupling member 24 are shifted relative to the second transmission member 22 in the second axial direction D12. Accordingly, as seen in FIGS. 17, 19, and 20, the first coupling member 24 is shifted from the second cogwheel CW27 to the second cogwheel CW26, changing the speed stage of the bicycle transmission apparatus 12 from second gear to third gear.

When the downshifting signal DSS is inputted from the shifter 14 to the transmission controller 102 in a state where the speed stage is in third gear (FIG. 17), the transmission controller 102 controls the switching actuator 68 to move the first transmission member 20 from the first axial position P1 to the second axial position P2 in the first axial direction D11 (FIGS. 16 and 20). At this time, as seen in FIGS. 16 and 20, the transmission controller 102 controls the guide actuator 86 to move the guide member 78 from the second guide position P12 to the first guide position P11. Thus, the first transmission member 20 and the first coupling member 24 are shifted relative to the second transmission member 22 in the first axial direction D11. Accordingly, as seen in FIGS. 16, 19, and 20, the first coupling member 24 is shifted from the second cogwheel CW26 to the second cogwheel CW27, changing the speed stage of the bicycle transmission apparatus 12 from third gear to second gear.

When the downshifting signal DSS is inputted from the shifter 14 to the transmission controller 102 in a state where the speed stage is in second gear (FIG. 16), the transmission controller 102 controls the switching actuator 68 to move the first transmission member 20 from the second axial position P2 to the first axial position P1 in the second axial direction D12 (FIGS. 15 and 20). At this time, as seen in FIGS. 15 and 20, the transmission controller 102 controls the guide actuator 86 to keep the guide member 78 at the first guide position P11. Thus, the first transmission member 20 is shifted relative to the second transmission member 22 and the first coupling member 24 in the second axial direction D12. Accordingly, as seen in FIGS. 15, 19, and 20, the first coupling member 24 is shifted from the first cogwheel CW12 to the first cogwheel CW11, changing the speed stage of the bicycle transmission apparatus 12 from second gear to low gear.

As described above, since the transmission controller 102 controls the switching device 66 and the guide device 76 between low gear and thirteenth gear based on the transmission route RT1 shown in FIG. 19 (e.g., the shift information SF1 shown in FIG. 20), they will not be described and/or illustrated in detail here for the sake of brevity. If the transmission controller 102 and the shifter 14 are communicated by wireless technology, the transmission controller 102 and the shifter 14 respectively have wireless communication devices, and the shifter 14 has another battery.

Figure 21:
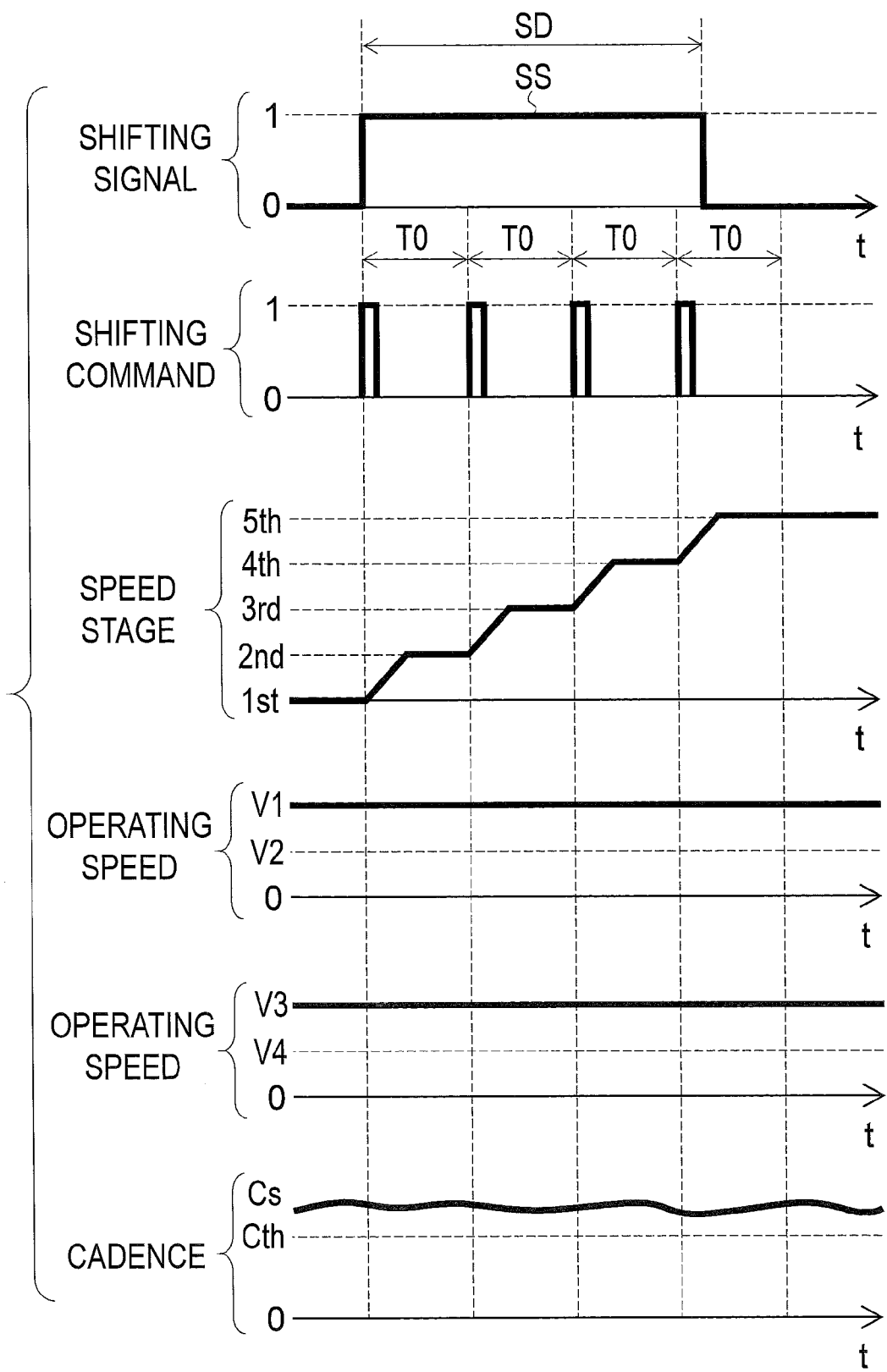
FIG. 21 is a timing chart showing an operation of the bicycle transmission apparatus illustrated in FIG. 1.

Furthermore, the transmission controller 102 is configured to change an operating speed of each of the switching device 66 and the guide device 76 based on input information. Specifically, as seen in FIG. 21, the transmission controller 102 is configured to determine at a determination interval T0 whether the shifting signal SS is continuous. The transmission controller 102 is configured to output shifting commands to the switching device 66 and the guide device 76 at the determination interval T0 if the transmission controller 102 determines at the determination interval T0 that the shifting signal SS is continuous. Namely, the transmission controller 102 includes a determination part configured to determine at the determination interval T0 whether the shifting signal SS is continuous. Furthermore, the transmission controller 102 includes a command generator configured to output a shifting command to each of the switching device 66 and the guide device 76 at the determination interval T0 if the transmission controller 102 determines at the determination interval T0 that the shifting signal SS is continuous.

As seen in FIG. 21, the switching device 66 and the guide device 76 are configured to change a current speed stage by one stage based on the shifting commands from the transmission controller 102. In a case where the signal duration SD of the shifting signal SS is longer than the determination interval T0, the transmission controller 102 outputs a plurality of shifting commands to each of the switching device 66 and the guide device 76 in accordance with the signal duration SD.

As seen in FIG. 21, for example, in a case where the signal duration SD of the shifting signal SS has a length more than three times longer than the determination interval T0, the transmission controller 102 controls the switching device 66 and the guide device 76 to continuously change the current speed stage by four stages based on the shifting signal SS and the signal duration SD.

More specifically, in a case where the switching device 66 and the guide device 76 upshift the current speed stage from low gear, the transmission controller 102 outputs an upshifting command to the switching device 66 and the guide device 76 when the shifting signal SS is inputted from the shifter 14 to the transmission controller 102. The switching device 66 and the guide device 76 changes the current speed stage from the low gear to a second gear in response to the upshifting command from the transmission controller 102.

As seen in FIG. 21, when the transmission controller 102 determines at the determination interval T0 that the shifting signal SS is continuous, the transmission controller 102 outputs an additional upshifting command to the switching device 66 and the guide device 76. The switching device 66 and the guide device 76 change the current speed stage from the second gear to a third gear in response to the additional upshifting command.

When the transmission controller 102 determines at the next determination interval T0 that the shifting signal SS is still continuous, the transmission controller 102 outputs an additional upshifting command to the switching device 66 and the guide device 76. The switching device 66 and the guide device 76 change the current speed stage from the third gear to a fourth gear in response to the additional upshifting command. The above operation is applied to the upshifting from the fourth gear to a fifth gear.

When the transmission controller 102 determines at the next determination interval T0 that the shifting signal SS is not continuous (that the shifting signal SS has been terminated), the transmission controller 102 does not output an additional upshifting command to the switching device 66 and the guide device 76.

As seen in FIG. 18, the bicycle transmission apparatus 12 further comprises a sensing device 118 configured to sense a pedaling state of the bicycle 10. The transmission controller 102 is configured to control the switching device 66 to change a timing at which the first transmission member 20 moves relative to the base member 18 based on the pedaling state sensed by the sensing device 118. The transmission controller 102 is configured to control the guide actuator 86 to change a timing at which the guide member 78 moves relative to the base member 18 based on the pedaling state sensed by the sensing device 118.

The transmission controller 102 is configured to change an operating speed of each of the switching actuator 68 and the guide actuator 86 based on input information. The sensing device 118 is configured to sense the pedaling state of the bicycle 10 as the input information. The transmission controller 102 is configured to change the operating speed of each of the switching actuator 68 and the guide actuator 86 based on the pedaling state sensed by the sensing device 118.

Namely, the transmission controller 102 includes a speed changing part configured to change the operating speed of each of the switching actuator 68 and the guide actuator 86 based on the input information.

As seen in FIG. 18, the sensing device 118 comprises a cadence sensor 120 configured to sense a cadence of the bicycle 10 as the pedaling state of the bicycle 10. The cadence sensor 120 is attached to the bicycle frame B3 (FIG. 1), for example. The cadence sensor 120 is configured to sense a rotational speed of the crank arm B71 of the bicycle crank B7 as the cadence. For example, the cadence sensor 120 is configured to detect a detected member such as a magnet attached to the crank arm B71.

The transmission controller 102 is configured to change one of the operating speed and the response speed based on the pedaling state sensed by the sensing device 118. In the illustrated embodiment, the transmission controller 102 is configured to change the operating speed of each of the switching actuator 68 and the guide actuator 86 based on the cadence Cs sensed by the cadence sensor 120.

The transmission controller 102 decreases the operating speed of each of the switching actuator 68 and the guide actuator 86 if the cadence Cs sensed by the cadence sensor 120 is lower than a cadence threshold. The transmission controller 102 increases the operating speed of each of the switching actuator 68 and the guide actuator 86 if the cadence Cs sensed by the cadence sensor 120 is equal to or higher than the cadence threshold.

As seen in FIG. 18, the transmission controller 102 configured to store the cadence threshold and a plurality of predetermined operating speeds in the memory 106. Namely, the transmission controller 102 includes a cadence-threshold memory configured to store the cadence threshold, and an operating-speed memory is configured to store the plurality of predetermined operating speeds.

The transmission controller 102 is configured to select, as the operating speed, one of the predetermined operating speeds in accordance with the cadence Cs sensed by the cadence sensor 120. Namely, the transmission controller 102 includes an operating-speed selector configured to select, as the operating speed, one of the predetermined operating speeds in accordance with the cadence Cs sensed by the cadence sensor 120. The transmission controller 102 is configured to control the switching actuator 68 and the guide actuator 86 to change the speed stage with the selected operating speed. More specifically, the transmission controller 102 is configured to output the selected operating speed as an operating speed command to each of the switching actuator 68 and the guide actuator 86. The first motor driver 108 is configured to control the switching actuator 68 to move the first transmission member 20 with the selected operating speed. The second motor driver 112 is configured to control the guide actuator 86 to move the guide member 78 with the selected operating speed.

In the illustrated embodiment, the transmission controller 102 is configured to select one of the predetermined operating speeds as the operating speed in accordance with the cadence Cs. However, the transmission controller 102 can be configured to continuously change the operating speed in accordance with the cadence Cs if needed and/or desired.

Figure 22:
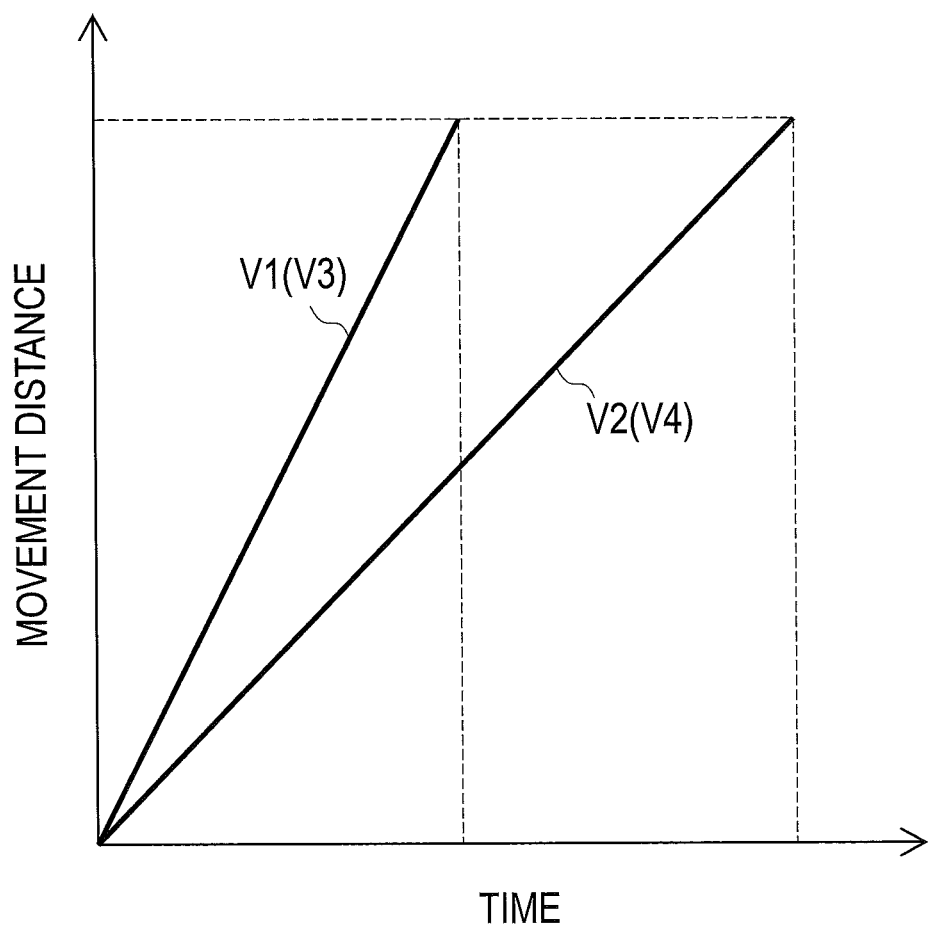
FIG. 22 is a graph showing operating speeds of a switching device and a guide device of the bicycle transmission apparatus illustrated in FIG. 1.

As seen in FIG. 22, for example, the transmission controller 102 is configured to store a first operating speed V1 and a second operating speed V2 different from the first operating speed V1 for the operating speed of the switching actuator 68. In the illustrated embodiment, the second operating speed V2 is lower than the first operating speed V1. For example, the first operating speed V1 is a normal operating speed of the switching actuator 68. The transmission controller 102 can be configured to store more than three operating speeds for the switching actuator 68 if needed and/or desired.

Similarly, the transmission controller 102 is configured to store a third operating speed V3 and a fourth operating speed V4 different from the third operating speed V3 for the operating speed of the guide actuator 86. In the illustrated embodiment, the fourth operating speed V4 is lower than the third operating speed V3. For example, the third operating speed V3 is a normal operating speed of the guide actuator 86. The transmission controller 102 can be configured to store more than three operating speeds for the guide actuator 86 if needed and/or desired.

Figure 23:
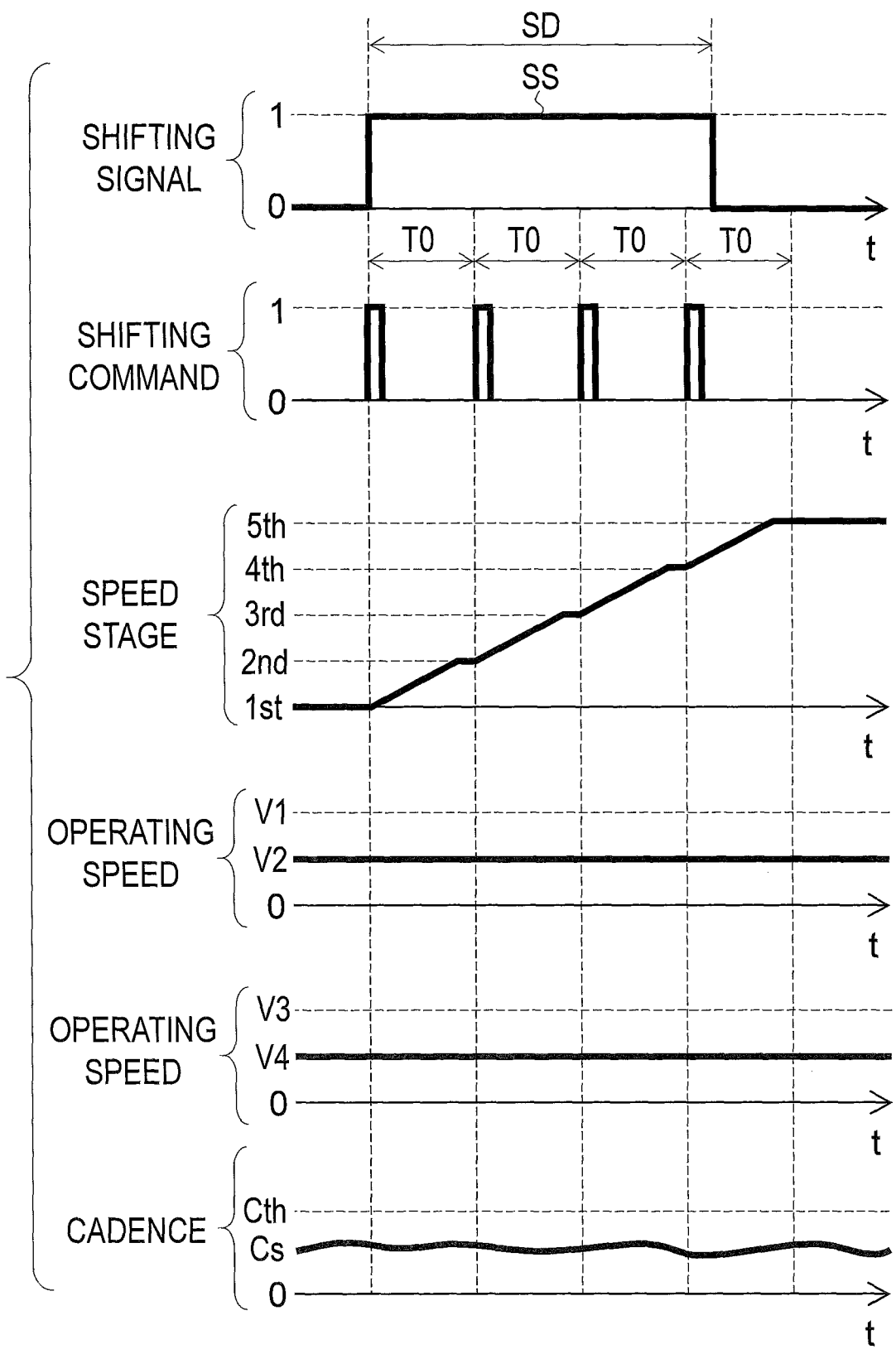
FIG. 23 is a timing chart showing the operation of the bicycle shifting control apparatus illustrated in FIG. 1.

As seen in FIG. 23, the transmission controller 102 is configured to select the first operating speed V1 as the operating speed from among the first operating speed V1 and the second operating speed V2 if the cadence Cs sensed by the cadence sensor 120 is equal to or higher than the cadence threshold Cth. Similarly, the transmission controller 102 is configured to select the third operating speed V3 as the operating speed from among the third operating speed V3 and the fourth operating speed V4 if the cadence Cs sensed by the cadence sensor 120 is equal to or higher than the cadence threshold Cth. The transmission controller 102 controls the switching actuator 68 and the guide actuator 86 to change a current speed stage with the first operating speed V1 and the third operating speed V3. More specifically, the first motor driver 108 controls the switching actuator 68 to move the first transmission member 20 with the first operating speed V1 inputted from the transmission controller 102. The second motor driver 112 controls the guide actuator 86 to move the guide member 78 with the third operating speed V3 inputted from the transmission controller 102.

As seen in FIG. 23, the transmission controller 102 is configured to select the second operating speed V2 as the operating speed from among the first operating speed V1 and the second operating speed V2 if the cadence Cs sensed by the cadence sensor 120 is lower than the cadence threshold Cth. The transmission controller 102 is configured to select the fourth operating speed V4 as the operating speed from among the third operating speed V3 and the fourth operating speed V4 if the cadence Cs sensed by the cadence sensor 120 is lower than the cadence threshold Cth. The transmission controller 102 controls the switching actuator 68 and the guide actuator 86 to change a current speed stage with the second operating speed V2 and the fourth operating speed V4. More specifically, the first motor driver 108 controls the switching actuator 68 to move the first transmission member 20 with the second operating speed V2 inputted from the transmission controller 102. The second motor driver 112 controls the guide actuator 86 to move the guide member 78 with the fourth operating speed V4 inputted from the transmission controller 102.

Instead of changing the operating speed, the transmission controller 102 can be configured to change the response speed of each of the switching device 66 and the guide device 76. Furthermore, the function for changing the operating speed can be omitted from the transmission controller 102 if needed and/or desired.

With the bicycle transmission apparatus 12, the first coupling member 24 is configured to couple the first transmission member 20 to the second transmission member 22 to transmit rotation of the first transmission member 20 to the second transmission member 22 at the variable speed stage. The first transmission member 20 is movable relative to the base member 18 in the axial direction D1. The variable speed stage is variable in accordance with at least one positional relationship among the first transmission member 20, the second transmission member 22, and the first coupling member 24 in the axial direction D1. Accordingly, it is possible to change a speed stage of the bicycle transmission apparatus 12 by moving the first transmission member 20 in the axial direction D1.

Furthermore, since the base member 18 is configured to be attached to the bicycle frame B3 as a separate member from the bicycle frame B3, it is possible to treat the bicycle transmission apparatus 12 as a single unit. This makes centering of the input shaft 28, the first transmission member 20, and the second transmission member 22 easier.

Second Embodiment

A bicycle transmission apparatus 212 in accordance with a second embodiment will be described below referring to FIG. 24. The bicycle transmission apparatus 212 has the same configuration as the bicycle transmission apparatus 12 except for the first angle AG11. Thus, elements having substantially the same function as those in the first embodiment will be numbered the same here, and will not be described and/or illustrated again in detail here for the sake of brevity.

Figure 24:
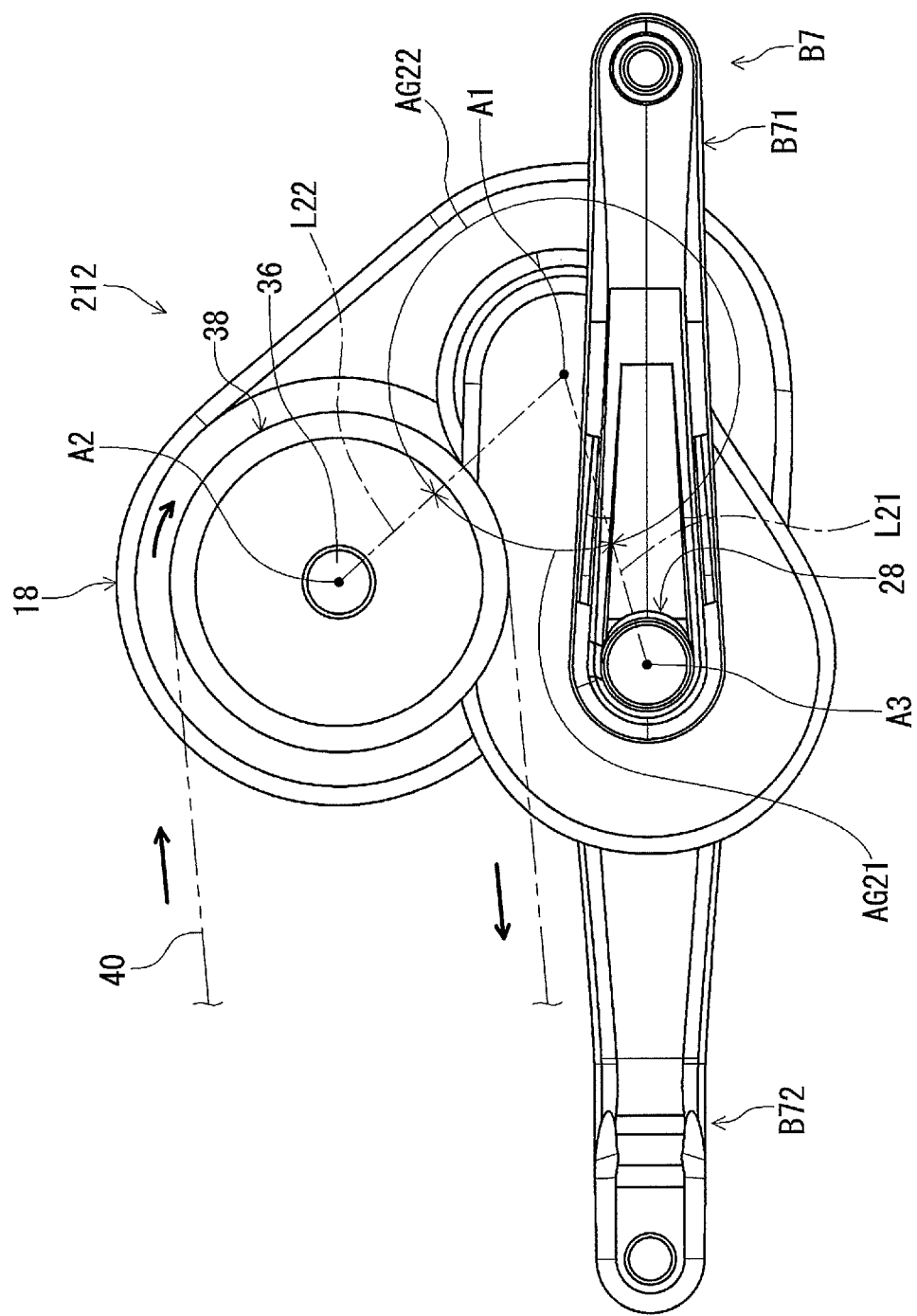
FIG. 24 is a side elevational view of a bicycle transmission apparatus in accordance with a second embodiment.

As seen in FIG. 24, in the bicycle transmission apparatus 212, a first angle AG21 is defined about the first rotational axis A1 between a first line segment L21 connecting the input rotational axis A3 and the first rotational axis A1 and a second line segment L22 connecting the first rotational axis A1 and the second rotational axis A2 when viewed from the axial direction D1. A second angle AG22 is defined about the first rotational axis A1 between the first line segment L21 and the second line segment L22 when viewed from the axial direction D1. The second angle AG22 is defined on an opposite side of the first angle AG21 relative to the first rotational axis A1 when viewed from the axial direction D1. The first angle AG21 is smaller than the second angle AG22 and is an acute angle. The first angle AG21 is smaller than 90 degrees and larger than 0 degree.

With the bicycle transmission apparatus 212, it is possible to obtain substantially the same advantageous effect as that of the bicycle transmission apparatus 12 in accordance with the first embodiment.

Third Embodiment

A bicycle 310 equipped with a bicycle transmission apparatus 312 in accordance with a third embodiment will be described below referring to FIGS. 25 and 26. The bicycle transmission apparatus 312 has the same configuration as the bicycle transmission apparatus 12 except for the output shaft 36. Thus, elements having substantially the same function as those in the above embodiments will be numbered the same here, and will not be described and/or illustrated again in detail here for the sake of brevity.

Figure 25:
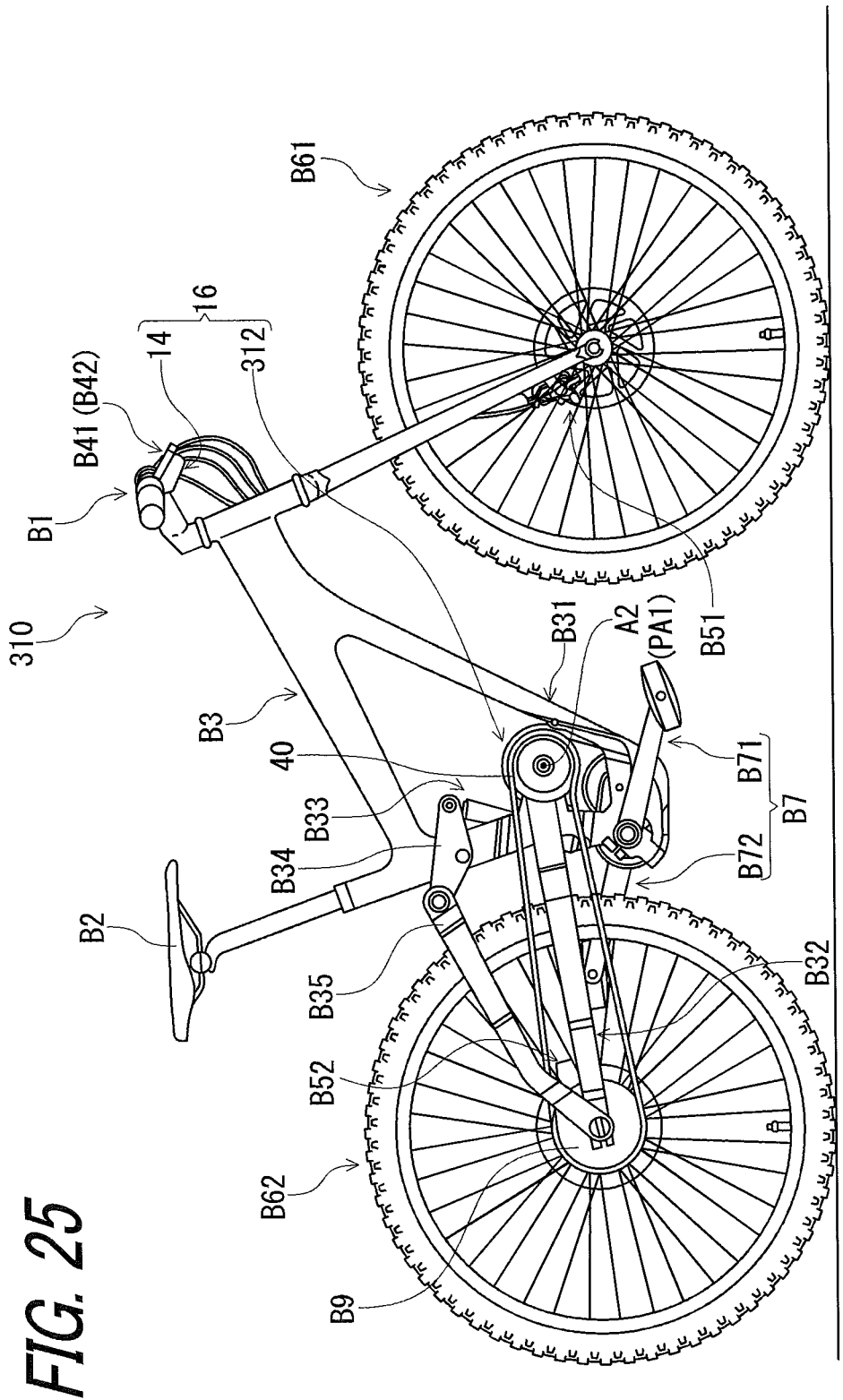
FIG. 25 is a side elevational view of a bicycle provided with a bicycle transmission apparatus in accordance with a third embodiment.

As seen in FIG. 25, in the bicycle transmission apparatus 312, the pivot axis PA1 coincides with the second rotational axis A2. Specifically, as seen in FIG. 26, the bicycle transmission apparatus 312 comprises an output shaft 336 rotatable relative to the base member 18 about the second rotational axis A2. The output shaft 336 is coupled to the second transmission member 22 to transmit rotation of the second transmission member 22 to a bicycle wheel (e.g., the rear wheel B62) rotatable relative to the second frame B32. The output shaft 336 is configured to extend through a pivot opening B36 of the bicycle frame B3 along the second rotational axis A2. In the illustrated embodiment, the first sub frame B311 of the first frame B31 includes the pivot opening B36.

Figure 26:
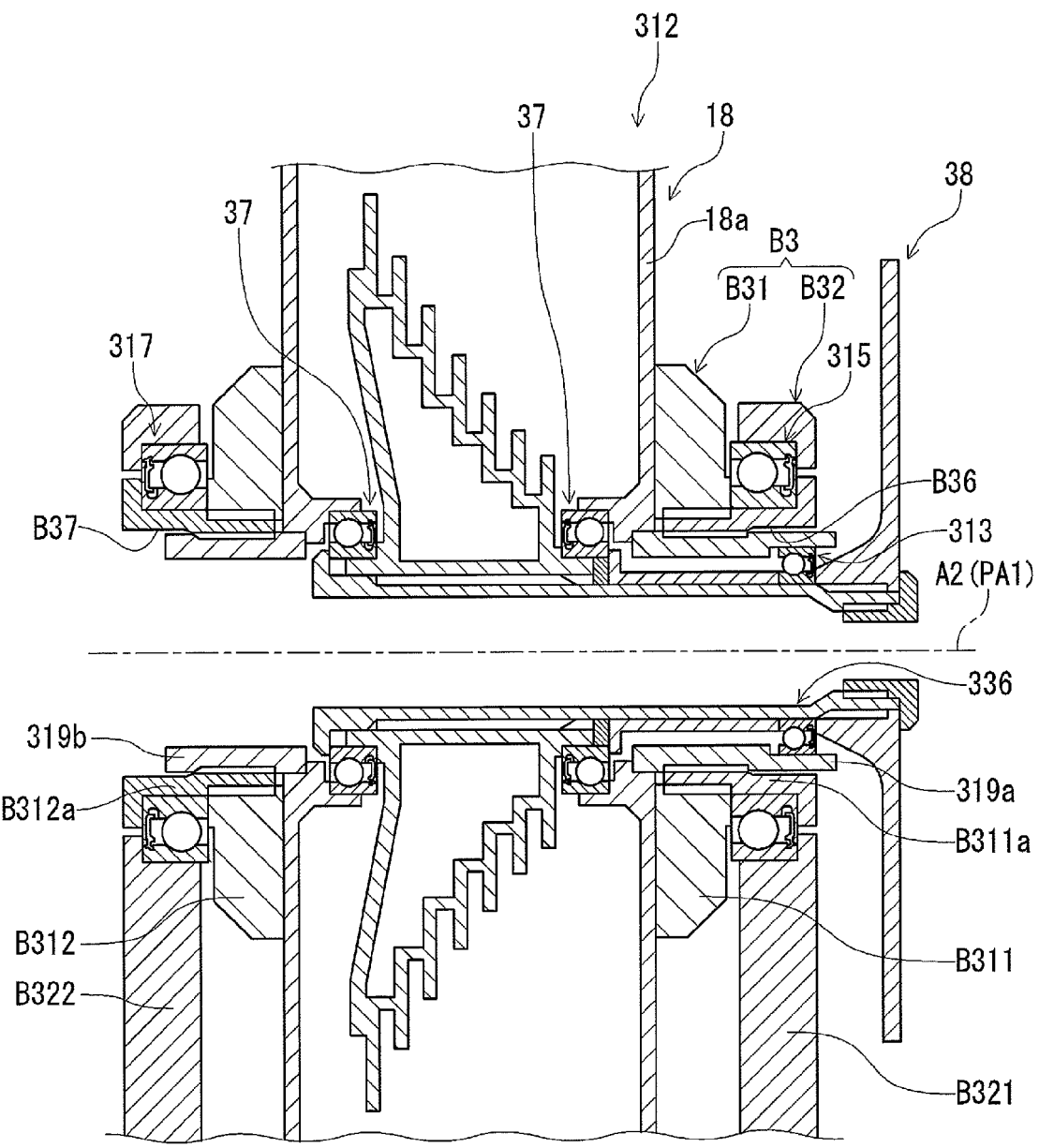
FIG. 26 is a cross-sectional view of the bicycle transmission apparatus illustrated in FIG. 25.

As seen in FIG. 26, the bicycle transmission apparatus 312 further comprises an inner bearing unit 313. The inner bearing unit 313 is configured to be provided in the pivot opening B36 of the bicycle frame B3. The inner bearing unit 313 is configured to rotatably couple the output shaft 336 to the bicycle frame B3 about the second rotational axis A2 via an outer bearing unit 315 provided radially outward of the inner bearing unit 313. The outer bearing unit 315 is configured to pivotably couple the second frame B32 to the first frame B31 about the second rotational axis A2.

The base member 18 includes a first tubular support 319a and a second tubular support 319b. The first tubular support 319a is secured to the base member body 18a and extends from the base member body 18a along the second rotational axis A2. The second tubular support 319b is secured to the base member body 18a and extends from the base member body 18a along the second rotational axis A2. The second tubular support 319b is provided on an opposite side of the first tubular support 319a relative to the base member body 18a. The output shaft 336 extends through a through-hole of the first tubular support 319a. The first tubular support 319a extends through the pivot opening B36. The second tubular support 319b extends through an additional pivot opening B37 of the bicycle frame B3. In the illustrated embodiment, the first sub frame B312 of the first frame B31 includes the additional pivot opening B37.

As seen in FIG. 26, the first sub frame B311 includes a third tubular support B311a, and the first sub frame B312 includes a fourth tubular support B312a. The third tubular support B311a is attached to an outer periphery of the first tubular support 319a and includes the pivot opening B36. The fourth tubular support B312a is attached to the second tubular support 319b and includes the additional pivot opening B37.

The base member body 18a is mounted to the first sub frames B311 and B312 of the first frame B31 via the first tubular support 319a and the second tubular support 319b. The third tubular support B311a is rotatably mounted to the second sub frame B321 via the outer bearing unit 315. The fourth tubular support B312a is rotatably mounted to the second sub frame B322 via an additional outer bearing unit 317. Namely, the second sub frames B321 and B322 are pivotably mounted to the first frame B31 via the outer bearing unit 315 and the additional outer bearing unit 317.

With the bicycle transmission apparatus 312, it is possible to constantly keep a distance between the output cogwheel 38 and the rear sprocket B9, preventing the output coupling member 40 from be loosen.

Fourth Embodiment

A bicycle 410 equipped with a bicycle transmission apparatus 412 in accordance with a fourth embodiment will be described below referring to FIGS. 27 and 28. The bicycle transmission apparatus 412 has the same configuration as the bicycle transmission apparatus 12 except for the electric-assisted configuration. Thus, elements having substantially the same function as those in the above embodiments will be numbered the same here, and will not be described and/or illustrated again in detail here for the sake of brevity.

Figure 27:
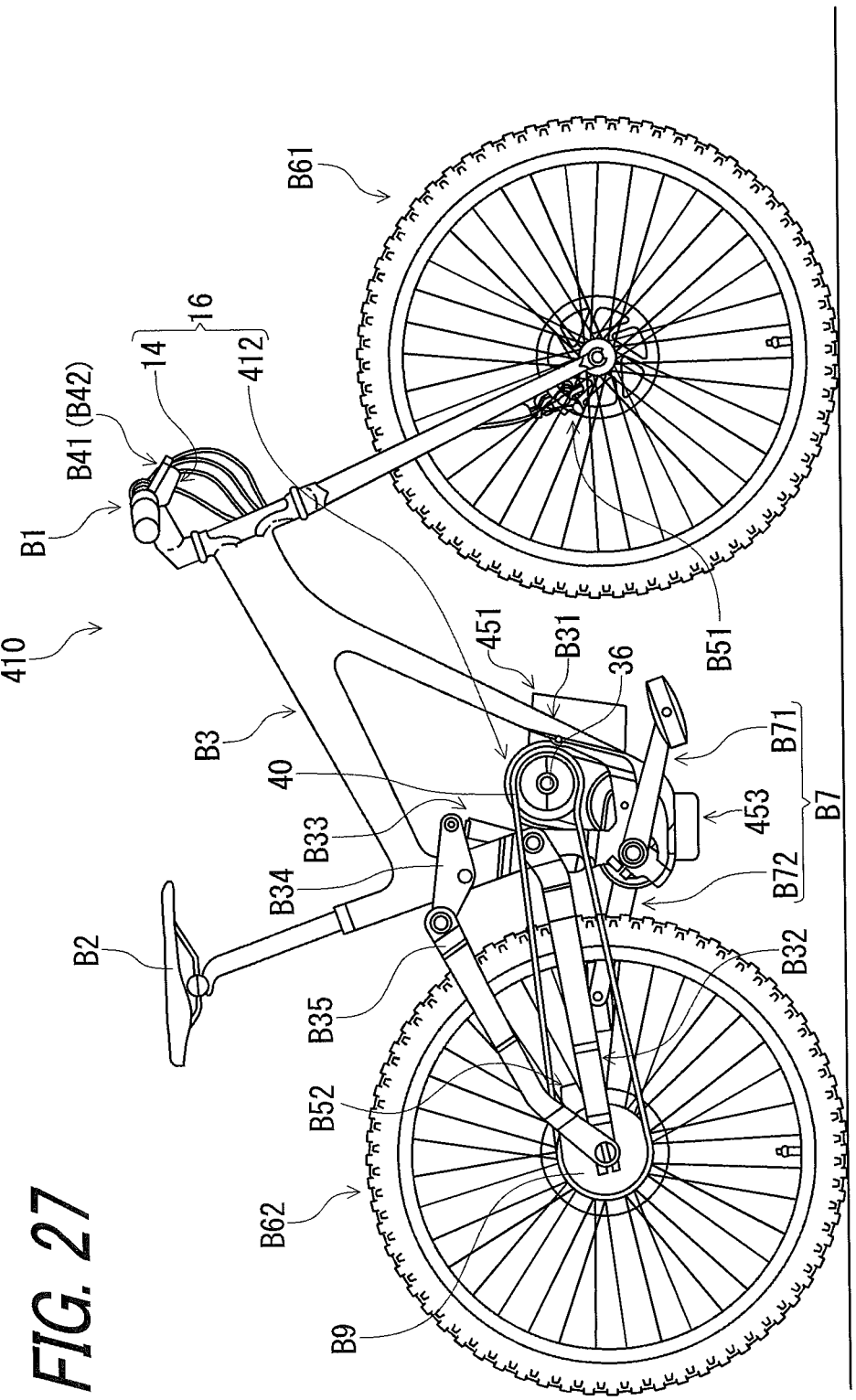
FIG. 27 is a side elevational view of a bicycle provided with a bicycle transmission apparatus in accordance with a fourth embodiment.

As seen in FIG. 27, the bicycle transmission apparatus 412 further comprises an assist device 451 configured to assist pedaling. The assist device 451 is configured to generate an assist torque inputted to the second transmission member 22 to assist pedaling. The assist device 451 is provided on a front side of the base member 18 in an attachment state where the bicycle transmission apparatus 412 is attached to the bicycle frame B3. In the illustrated embodiment, the assist device 451 comprises an assist motor such as a direct-current (DC) motor and a reduction gear unit.

The bicycle transmission apparatus 412 further comprises an electrical power source 453 configured to supply electrical power to the assist device 451. The electrical power source 453 is provided under the base member 18 in the attachment state of the bicycle transmission apparatus 412. In the illustrated embodiment, the electrical power source 453 comprises a rechargeable battery, for example.

Figure 28:
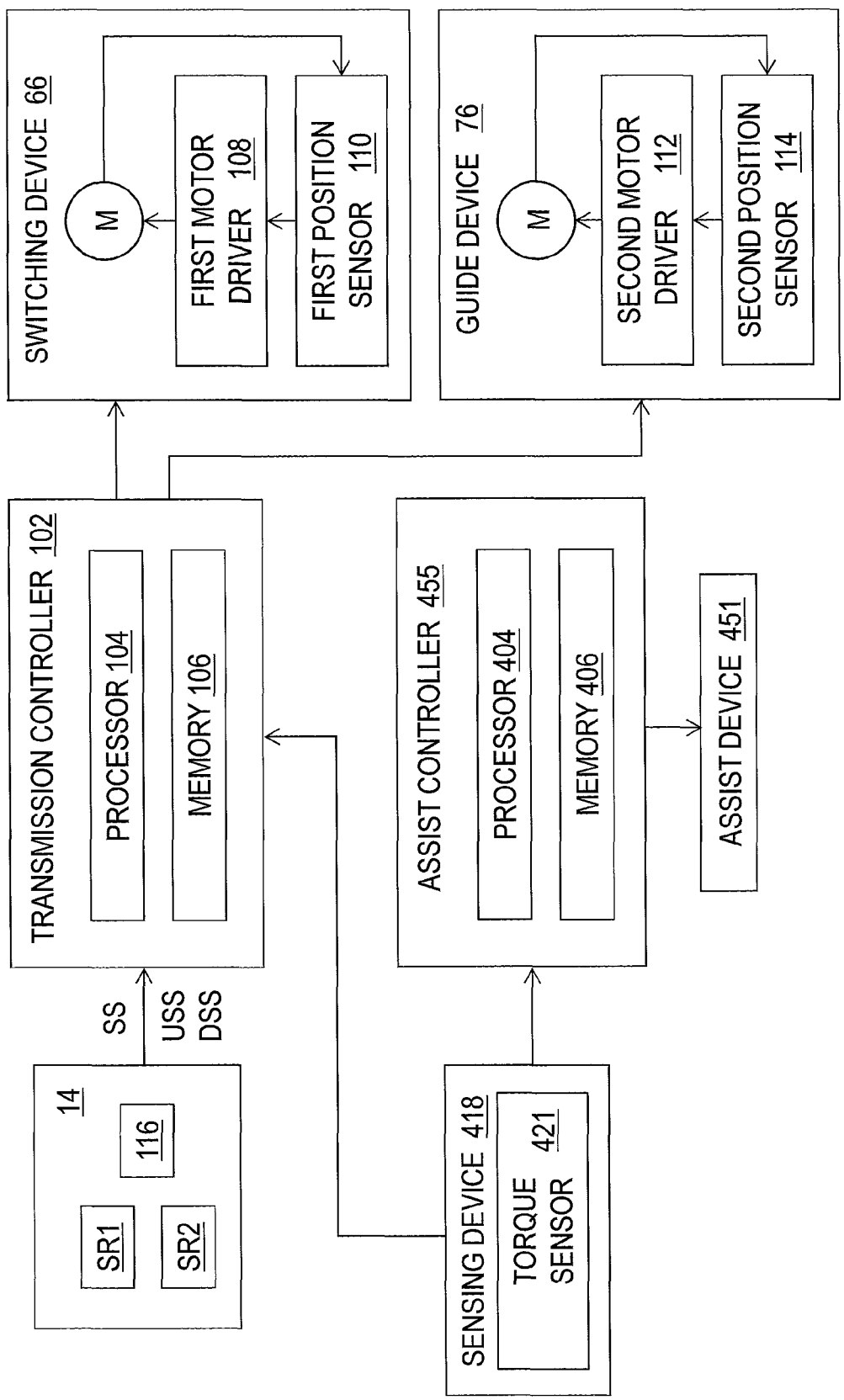
FIG. 28 is a block diagram of the bicycle transmission apparatus illustrated in FIG. 27.

As seen in FIG. 28, the bicycle transmission apparatus 412 further comprises a sensing device 418 and an assist controller 455. The sensing device 418 is configured to sense a pedaling state of the bicycle 10. In the illustrated embodiment, the sensing device 418 comprises a torque sensor 421 configured to sense a pedaling torque applied to the bicycle crank B7 (FIG. 27). The assist controller 455 is configured to control the assist device 451 to input the assist torque to the second transmission member 22 based on the pedaling state sensed by the sensing device 418. The assist controller 455 is configured to control the assist device 451 to input the assist torque to the second transmission member 22 based on the pedaling torque sensed by the sensing device 418.

In the illustrated embodiment, the assist controller 455 is constituted as a microcomputer and includes a processor 404 and a memory 406. The processor 404 includes a CPU. The memory 406 includes a ROM and a RAM. For example, a program stored in the memory 406 is read into the processor 404, and thereby several functions of the assist controller 455 are performed.

The pedaling torque is inputted from the sensing device 418 into the transmission controller 102 instead of the cadence sensed by the sensing device 118 in accordance with the first embodiment, for example. The pedaling torque sensed by the torque sensor 421 can be used for changing the operation speed of each of the switching device 66 and the guide device 76. The transmission controller 102 decreases the operating speed of each of the switching actuator 68 and the guide actuator 86 if the pedaling torque sensed by the torque sensor 421 is higher than a toque threshold. The transmission controller 102 increases the operating speed of each of the switching actuator 68 and the guide actuator 86 if the pedaling torque sensed by the torque sensor 421 is equal to or lower than the torque threshold.

While the assist device 451 is configured to transmit the assist torque to the output shaft 36 (FIG. 27) in the illustrated embodiment, the assist device 451 can be configured to transmit the assist torque members other than the output shaft 36.

As described above, it is possible to apply the assist device 451 to the bicycle transmission apparatus 12 in accordance with the first embodiment.

Fifth Embodiment

A bicycle transmission apparatus 512 in accordance with a fifth embodiment will be described below referring to FIGS. 29 to 31. The bicycle transmission apparatus 512 has the same configuration as the bicycle transmission apparatus 12 except for the operation of the first transmission member 20, the first coupling member 24, and the guide member 78. Thus, elements having substantially the same function as those in the above embodiments will be numbered the same here, and will not be described and/or illustrated again in detail here for the sake of brevity.

Figure 29:
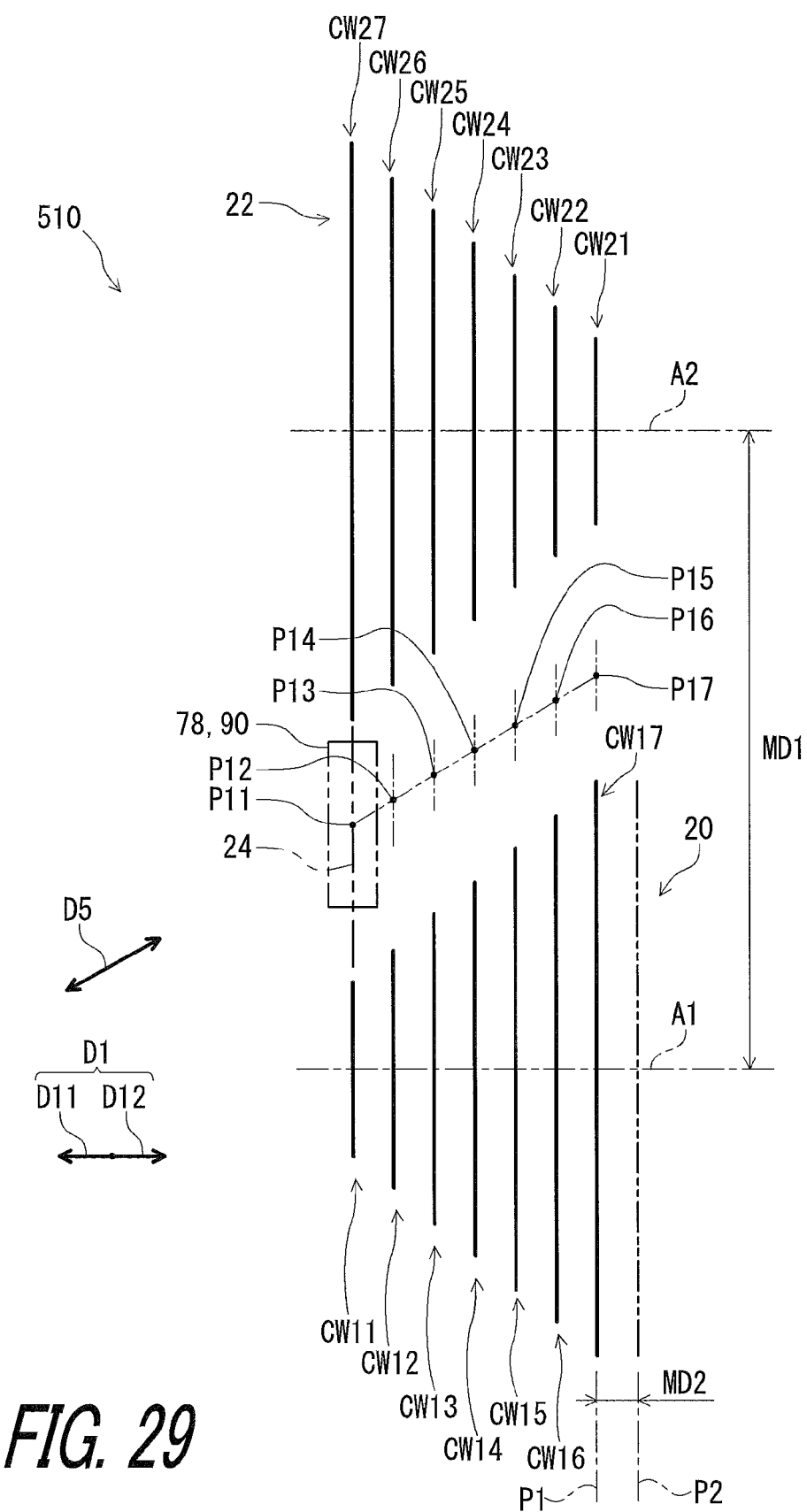
FIG. 29 is a schematic diagram showing an arrangement of a first transmission member, a second transmission member, and a guide device of a bicycle transmission apparatus in accordance with a fifth embodiment.
Figure 30:
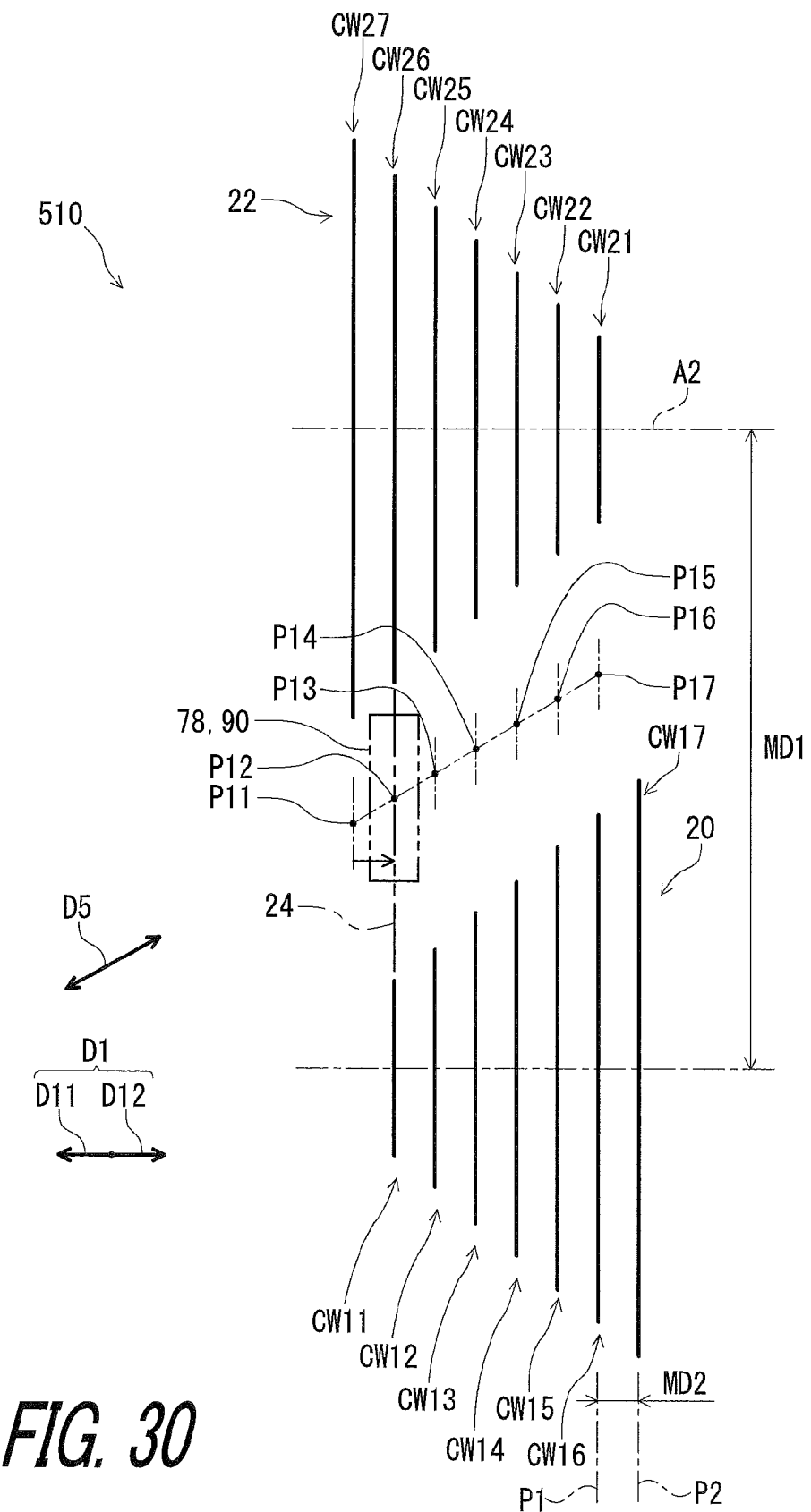
FIG. 30 is a schematic diagram showing an arrangement of the first transmission member, the second transmission member, and the guide device of the bicycle transmission apparatus illustrated in FIG. 29.

As seen in FIGS. 29 and 30, the first transmission member 20 is movable relative to the base member 18 in the axial direction D1 between the first axial position P1 and the second axial position P2. Unlike the first embodiment, however, the first cogwheels CW11 to CW17 are respectively aligned with the second cogwheels CW21 to CW27 at the first axial position P1. The first cogwheels CW11 to CW17 other than the first largest cogwheel CW17 are aligned with the second cogwheels CW21 to CW27 other than the second largest cogwheel CW27 at the second axial position P2.

As seen in FIGS. 29 and 30, the first transmission member 20 is movable together with the first coupling member 24 relative to the base member 18 in the second axial direction D12 so as to change the axial relative position between the first coupling member 24 and the second transmission member 22 during the one of upshifting and downshifting. The first transmission member 20 is movable together with the first coupling member 24 relative to the base member 18 in the second axial direction D12 without changing the axial relative position between the first coupling member 24 and the first transmission member 20 during the one of upshifting and downshifting.

In the illustrated embodiment, the first transmission member 20 is movable together with the first coupling member 24 relative to the base member 18 in the second axial direction D12 so as to change the axial relative position between the first coupling member 24 and the second transmission member 22 during upshifting (from FIG. 29 to FIG. 30). The first transmission member 20 is movable together with the first coupling member 24 relative to the base member 18 in the second axial direction D12 without changing the axial relative position between the first coupling member 24 and the first transmission member 20 during upshifting (from FIG. 29 to FIG. 30).

Figure 31:
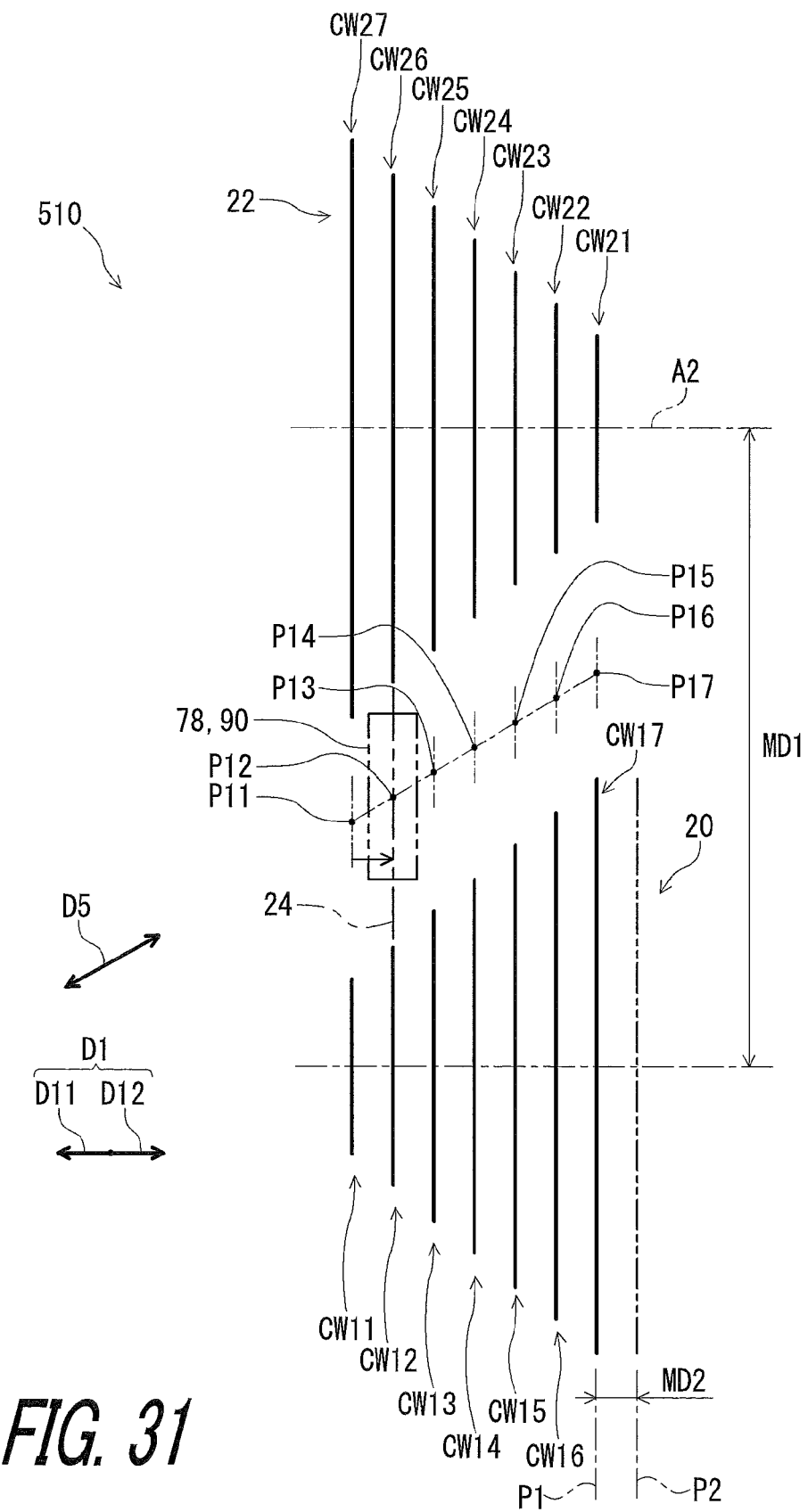
FIG. 31 is a schematic diagram showing an arrangement of the first transmission member, the second transmission member, and the guide device of the bicycle transmission apparatus illustrated in FIG. 30.

As seen in FIGS. 30 and 31, the first transmission member 20 is movable relative to the base member 18 and the first coupling member 24 in the first axial direction D11 without changing an axial relative position between the first coupling member 24 and the second transmission member 22 during one of upshifting and downshifting. The first transmission member 20 is movable relative to the base member 18 and the first coupling member 24 in the first axial direction D11 so as to change an axial relative position between the first coupling member 24 and the first transmission member 20 during the one of upshifting and downshifting.

In the illustrated embodiment, the first transmission member 20 is movable relative to the base member 18 and the first coupling member 24 in the first axial direction D11 without changing an axial relative position between the first coupling member 24 and the second transmission member 22 during upshifting (from FIG. 30 to FIG. 31). The first transmission member 20 is movable relative to the base member 18 and the first coupling member 24 in the first axial direction D11 so as to change an axial relative position between the first coupling member 24 and the first transmission member 20 during upshifting (from FIG. 30 to FIG. 31).

Furthermore, as seen in FIGS. 30 and 31, the first transmission member 20 is movable relative to the base member 18 and the first coupling member 24 in the second axial direction D12 without changing the axial relative position between the first coupling member 24 and the second transmission member 22 during another of upshifting and downshifting. The first transmission member 20 is movable relative to the base member 18 and the first coupling member 24 in the second axial direction D12 so as to change the axial relative position between the first coupling member 24 and the first transmission member 20 during said another of upshifting and downshifting.

In this embodiment, the first transmission member 20 is movable relative to the base member 18 and the first coupling member 24 in the second axial direction D12 without changing the axial relative position between the first coupling member 24 and the second transmission member 22 during downshifting (from FIG. 31 to FIG. 30). The first transmission member 20 is movable relative to the base member 18 and the first coupling member 24 in the second axial direction D12 so as to change the axial relative position between the first coupling member 24 and the first transmission member 20 during downshifting (from FIG. 31 to FIG. 30).

Furthermore, as seen in FIGS. 29 and 30, the first transmission member 20 is movable together with the first coupling member 24 relative to the base member 18 in the first axial direction D11 so as to change the axial relative position between the first coupling member 24 and the second transmission member 22 during said another of upshifting and downshifting. The first transmission member 20 is movable together with the first coupling member 24 relative to the base member 18 in the first axial direction D11 without changing the axial relative position between the first coupling member 24 and the first transmission member 20 during said another of upshifting and downshifting.

In this embodiment, the first transmission member 20 is movable together with the first coupling member 24 relative to the base member 18 in the first axial direction D11 so as to change the axial relative position between the first coupling member 24 and the second transmission member 22 during downshifting (from FIG. 30 to FIG. 29). The first transmission member 20 is movable together with the first coupling member 24 relative to the base member 18 in the first axial direction D11 without changing the axial relative position between the first coupling member 24 and the first transmission member 20 during downshifting (from FIG. 30 to FIG. 29).

As seen in FIGS. 29 and 30, the first transmission member 20 is movable together with the first coupling member 24 and the guide member 78 relative to the base member 18 in the second axial direction D12 so as to change the axial relative position between the first coupling member 24 and the second transmission member 22 during the one of upshifting and downshifting. In this embodiment, the first transmission member 20 is movable together with the first coupling member 24 and the guide member 78 relative to the base member 18 in the second axial direction D12 so as to change the axial relative position between the first coupling member 24 and the second transmission member 22 during upshifting (from FIG. 29 to FIG. 30). At this time, the first coupling member 24 moves relative to the first transmission member 20 without contacting the guide member 78 when the first transmission member 20 moves relative to the base member 18 in the second axial direction D12.

As seen in FIGS. 30 and 31, the first transmission member 20 is movable relative to the base member 18, the first coupling member 24, and the guide member 78 in the first axial direction D11 so as to change the axial relative position between the first coupling member 24 and the first transmission member 20 during the one of upshifting and downshifting. In this embodiment, the first transmission member 20 is movable relative to the base member 18, the first coupling member 24, and the guide member 78 in the first axial direction D11 so as to change the axial relative position between the first coupling member 24 and the first transmission member 20 during upshifting (from FIG. 30 to FIG. 31). The guide member 78 is positioned at the second guide position P12 to keep the axial position of the first coupling member 24 relative to the second transmission member 22 in the axial direction. The guide member 78 moves together with the first transmission member 20 without contacting the first coupling member 24 when the first transmission member 20 moves relative to the base member 18, the first coupling member 24, and the guide member 78 in the first axial direction D11.

As seen in FIGS. 30 and 31, the first transmission member 20 is movable relative to the base member 18, the first coupling member 24, and the guide member 78 in the second axial direction D12 so as to change the axial relative position between the first coupling member 24 and the first transmission member 20 during said another of upshifting and downshifting. In this embodiment, the first transmission member 20 is movable relative to the base member 18, the first coupling member 24, and the guide member 78 in the second axial direction D12 so as to change the axial relative position between the first coupling member 24 and the first transmission member 20 during downshifting (from FIG. 31 to FIG. 30). The guide member 78 is positioned at the second guide position P12 to keep the axial position of the first coupling member 24 relative to the second transmission member 22 in the axial direction. The guide member 78 moves together with the first transmission member 20 without contacting the first coupling member 24 when the first transmission member 20 moves relative to the base member 18, the first coupling member 24, and the guide member 78 in the second axial direction D12.

As seen in FIGS. 29 and 30, the first transmission member 20 is movable together with the first coupling member 24 and the guide member 78 relative to the base member 18 in the first axial direction D11 so as to change the axial relative position between the first coupling member 24 and the second transmission member 22 during said another of upshifting and downshifting. In this embodiment, the first transmission member 20 is movable together with the first coupling member 24 and the guide member 78 relative to the base member 18 in the first axial direction D11 so as to change the axial relative position between the first coupling member 24 and the second transmission member 22 during downshifting (from FIG. 17 to FIG. 16). At this time, the first coupling member 24 moves relative to the first transmission member 20 without contacting the guide member 78 when the first transmission member 20 moves relative to the base member 18 in the second axial direction D12. The guide member 78 can be omitted from the guide device 76 in a case where the guide member 78 does not contact the first coupling member 24.

The above operation of the first transmission member 20, the first coupling member 24, and the guide member 78 is applied to a case where the guide member 78 is positioned at each of the third to seventh guide positions P13 to P17. For example, the guide member 78 can be positioned at the third guide position P13 in FIGS. 30 and 31 in a case where the guide member 78 is positioned at the second guide position P12 in FIG. 29.

In this embodiment, the guide member 78 moves together with the first transmission member 20 without contacting the first coupling member 24 when the first transmission member 20 moves relative to the base member 18, the first coupling member 24, and the guide member 78 in the first axial direction D11. The guide member 78 moves together with the first transmission member 20 without contacting the first coupling member 24 when the first transmission member 20 moves relative to the base member 18, the first coupling member 24, and the guide member 78 in the second axial direction D12. The first coupling member 24 moves relative to the first transmission member 20 without contacting the guide member 78 when the first transmission member 20 moves relative to the base member 18 in the first axial direction D11. The first coupling member 24 moves relative to the first transmission member 20 without contacting the guide member 78 when the first transmission member 20 moves relative to the base member 18 in the second axial direction D12.

However, the guide member 78 can be configured to contact the first coupling member 24 when the first transmission member 20 moves relative to the base member 18, the first coupling member 24, and the guide member 78 in the first axial direction D11. The guide member 78 can be configured to contact the first coupling member 24 when the first transmission member 20 moves relative to the base member 18, the first coupling member 24, and the guide member 78 in the second axial direction D12. The first coupling member 24 can be configured to move relative to the first transmission member 20 with contacting the guide member 78 when the first transmission member 20 moves relative to the base member 18 in the first axial direction D11. The first coupling member 24 can be configured to move relative to the first transmission member 20 with contacting the guide member 78 when the first transmission member 20 moves relative to the base member 18 in the second axial direction D12.

The transmission controller 102 is configured to control the switching device 66 and the guide device 76 to move the first transmission member 20 and the guide member 78 relative to the base member 18 in accordance with the above operation of the first transmission member 20 and the guide member 78. Specifically, the transmission controller 102 is configured to control the switching actuator 68 and the guide actuator 86 to move the first transmission member 20 and the guide member 78 relative to the base member 18 in accordance with the above operation of the first transmission member 20 and the guide member 78.

It will be apparent to those skilled in the bicycle field from the present disclosure that the constructions of the above embodiments can be at least partially combined with each other.

The term "configured" as used herein to describe a component, section or part of a device includes hardware and/or software that is constructed and/or programmed to carry out the desired function. The desired function can be carried out by hardware, software, or a combination of hardware and software.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle transmission apparatus comprising:
   a base member;
   a first transmission member rotatable relative to the base member about a first rotational axis and movable relative to the base member in an axial direction parallel to the first rotational axis;
   a second transmission member rotatable relative to the base member about a second rotational axis and stationary relative to the base member in the axial direction; and
   a first coupling member configured to couple the first transmission member to the second transmission member to transmit rotation of the first transmission member to the second transmission member at a variable speed stage, the variable speed stage being variable in accordance with at least one positional relationship among the first transmission member, the second transmission member, and the first coupling member in the axial direction, wherein
   the first transmission member includes first cogwheels, and the second transmission member includes second cogwheels, and
   the first coupling member couples one of the first cogwheels to one of the second cogwheels.

2. A bicycle transmission apparatus comprising:
   a base member;
   a first transmission member rotatable relative to the base member about a first rotational axis and movable relative to the base member in an axial direction parallel to the first rotational axis;
   a second transmission member rotatable relative to the base member about a second rotational axis and stationary relative to the base member in the axial direction; and
   a first coupling member configured to couple the first transmission member to the second transmission member to transmit rotation of the first transmission member to the second transmission member at a variable speed stage, the variable speed stage being variable in accordance with at least one positional relationship among the first transmission member, the second transmission member, and the first coupling member in the axial direction, wherein
   the axial direction includes a first axial direction and a second axial direction opposite to the first axial direction,
   the first transmission member is movable relative to the base member and the first coupling member in the first axial direction without changing an axial relative position between the first coupling member and the second transmission member during one of upshifting and downshifting, and the first transmission member is movable together with the first coupling member relative to the base member in the second axial direction so as to change the axial relative position between the first coupling member and the second transmission member during the one of upshifting and downshifting.

3. The bicycle transmission apparatus according to claim 2, further comprising:

a positioning device configured to position the first transmission member relative to the base member in the axial direction at each of axial positions.

4. The bicycle transmission apparatus according to claim 3, wherein the positioning device is configured to position the first transmission member relative to the base member in the axial direction at each of a first axial position and a second axial position, the first transmission member is movable relative to the base member in the first axial direction from the first axial position to the second axial position, and the first transmission member is movable relative to the base member in the second axial direction from the second axial position to the first axial position.

5. The bicycle transmission apparatus according to claim 4, further comprising:

a switching device configured to switch a position of the first transmission member relative to the base member in the axial direction between the first axial position and the second axial position.

6. The bicycle transmission apparatus according to claim 3, further comprising:

a first shaft defining the first rotational axis; and
a bearing structure configured to rotatably couple the first transmission member to the first shaft about the first rotational axis, wherein the first transmission member has a first opening,
the first shaft extends through the first opening, and
the bearing structure is provided in the first opening.

7. The bicycle transmission apparatus according to claim 2, wherein the variable speed stage includes speed stages different from each other, the first transmission member includes first cogwheels arranged in the axial direction, and each of the first cogwheels is engageable with the first coupling member.

8. The bicycle transmission apparatus according to claim 7, wherein the second transmission member includes second cogwheels arranged in the axial direction, each of the second cogwheels is engageable with the first coupling member, and the second cogwheels respectively define the speed stages together with the first cogwheels.

9. The bicycle transmission apparatus according to claim 8, wherein a total number of the first cogwheels is equal to a total number of the second cogwheels.

10. The bicycle transmission apparatus according to claim 9, wherein each of the first cogwheels includes first teeth arranged in a circumferential direction of the first transmission member, each of the second cogwheels includes second teeth arranged in a circumferential direction of the second transmission member, the first cogwheels respectively have first pitch circles each defined by the first teeth, the second cogwheels respectively have second pitch circles each defined by the second teeth, and first diameters of the first pitch circles respectively are equal to second diameters of the second pitch circles.

11. The bicycle transmission apparatus according to claim 7, wherein the first cogwheels include a first largest cogwheel and a first smallest cogwheel, the first smallest cogwheel has an outer diameter smaller than an outer diameter of the first largest cogwheel, and the first smallest cogwheel is spaced apart from the first largest cogwheel in the first axial direction.

12. The bicycle transmission apparatus according to claim 1, further comprising:

a guide device configured to guide the first coupling member to change at least one of a first relative position between the first coupling member and the first transmission member, and a second relative position between the first coupling member and the second transmission member.

13. The bicycle transmission apparatus according to claim 12, wherein the guide device includes
a guide member contactable with the first coupling member, and a guide unit configured to guide the guide member in a first guide direction to change at least one of the first relative position and the second relative position.

14. The bicycle transmission apparatus according to claim 13, wherein the guide device includes a tensioner contactable with the first coupling member, the guide unit is configured to guide the tensioner in a second guide direction to adjust tension of the first coupling member, and the second guide direction is different from the first guide direction and the axial direction.

15. The bicycle transmission apparatus according to claim 14, wherein the guide device includes a guide actuator configured to move the guide member in the first guide direction.

16. The bicycle transmission apparatus according to claim 15, further comprising:

a sensing device configured to sense a pedaling state of a bicycle; and a transmission controller configured to control the guide actuator to change a timing at which the guide member moves relative to the base member based on the pedaling state sensed by the sensing device.

17. The bicycle transmission apparatus according to claim 16, further comprising:

a switching device configured to switch a position of the first transmission member relative to the base member in the axial direction between the first axial position and the second axial position, wherein the transmission controller is configured to control the switching device to change a timing at which the first transmission member moves relative to the base member based on the pedaling state sensed by the sensing device.

18. The bicycle transmission apparatus according to claim 1, wherein the base member includes an internal space in which the first transmission member and the second transmission member are provided, and the base member is configured to store lubricant in the internal space.

19. The bicycle transmission apparatus according to claim 18, wherein the base member includes a supply port through which the lubricant is to be supplied to the internal space.

20. The bicycle transmission apparatus according to claim 1, wherein the base member is configured to be attached to the bicycle frame as a separate member from the bicycle frame, and the base member is configured to be clamped by the bicycle frame.

21. The bicycle transmission apparatus according to claim 20, further comprising:

an input shaft mounted to the base member to receive an input torque and rotatable relative to the base member about an input rotational axis in response to the input torque, wherein the base member includes
  a base member body in which the first transmission member and the second transmission member are provided, and
  an input shaft support including a support opening in which the input shaft is rotatable relative to the base member about the input rotational axis, the input shaft support extending from the base member body along the input rotational axis, and the input shaft support is configured to be clamped by the bicycle frame.

22. The bicycle transmission apparatus according to claim 1, wherein the base member is configured to be mounted to a first frame of the bicycle frame and is pivotable relative to a second frame of the bicycle frame about the second rotational axis, the second frame being pivotably coupled to the first frame about the second rotational axis.

23. The bicycle transmission apparatus according to claim 22, further comprising:

an output shaft rotatable relative to the base member about the second rotational axis and coupled to the second transmission member to transmit rotation of the second transmission member to a bicycle wheel rotatable relative to the second frame, wherein the output shaft is configured to extend through a pivot opening of the bicycle frame along the second rotational axis.

24. The bicycle transmission apparatus according to claim 23, further comprising:

an inner bearing unit configured to be provided in the pivot opening of the bicycle frame and configured to rotatably couple the output shaft to the bicycle frame about the second rotational axis via an outer bearing unit provided radially outward of the inner bearing unit, the outer bearing unit being configured to pivotably couple the second frame to the first frame about the second rotational axis.

25. The bicycle transmission apparatus according to claim 1, further comprising:

an assist device configured to assist pedaling.

26. The bicycle transmission apparatus according to claim 25, wherein the assist device is configured to generate an assist torque inputted to the second transmission member to assist pedaling.

27. The bicycle transmission apparatus according to claim 25, wherein the assist device is provided on a front side of the base member in an attachment state where the bicycle transmission apparatus is attached to the bicycle frame.

28. The bicycle transmission apparatus according to claim 27, further comprising:

an electrical power source configured to supply electrical power to the assist device and provided under the base member in the attachment state of the bicycle transmission apparatus.

29. The bicycle transmission apparatus according to claim 25, further comprising:

a sensing device configured to sense a pedaling state of a bicycle; and an assist controller configured to control the assist device to input the assist torque to the second transmission member based on the pedaling state sensed by the sensing device.

30. The bicycle transmission apparatus according to claim 1, further comprising:

an input shaft mounted to the base member to receive an input torque and rotatable relative to the base member about an input rotational axis in response to the input torque; and an input coupling member configured to couple the input shaft to the first transmission member to transmit rotation of the input shaft to the first transmission member, wherein the first transmission member is configured to be coupled to the input shaft via the input coupling member to rotate with the input shaft relative to the base member.

31. The bicycle transmission apparatus according to claim 30, wherein the input shaft is configured to be coupled to a crank arm of a bicycle crank as a crank axle of the bicycle crank, the first transmission member includes a first shifting facilitation part configured to facilitate shifting the first coupling member relative to the first transmission member in the axial direction, and the first shifting facilitation part is disposed in a first shifting area of the first transmission member when the bicycle crank is disposed at or adjacent to a dead center.

32. The bicycle transmission apparatus according to claim 1, wherein the first coupling member comprises a bicycle chain configured to engage with the first transmission member and the second transmission member.

33. The bicycle transmission apparatus according to claim 32, wherein the bicycle chain has a chain pitch equal to or smaller than 12 mm.

34. The bicycle transmission apparatus according to claim 14 wherein the guide member and the tensioner are arranged in the second guide direction.

35. A bicycle transmission apparatus according comprising:

a base member;

a first transmission member rotatable relative to the base member about a first rotational axis and movable relative to the base member in an axial direction parallel to the first rotational axis;

a second transmission member rotatable relative to the base member about a second rotational axis and stationary relative to the base member in the axial direction;

a first coupling member configured to couple the first transmission member to the second transmission member to transmit rotation of the first transmission member to the second transmission member at a variable speed stage, the variable speed stage being variable in accordance with at least one positional relationship among the first transmission member, the second transmission member, and the first coupling member in the axial direction; and an input shaft mounted to the base member to receive an input torque and rotatable relative to the base member about an input rotational axis in response to the input torque, wherein the first rotational axis and the second rotational axis are parallel to the input rotational axis, and an angle defined between a first line perpendicular to the input rotational axis and the first rotational axis and a second line perpendicular to the input rotational axis and the second rotational axis is an obtuse angle when viewed from the axial direction.

36. The bicycle transmission apparatus according to claim 1, further comprising:

an input shaft mounted to the base member to receive an input torque and rotatable relative to the base member about an input rotational axis in response to the input torque, wherein the first rotational axis and the second rotational axis are parallel to the input rotational axis, and an angle is defined between a first line perpendicular to the input rotational axis and the first rotational axis and a second line perpendicular to the input rotational axis and the second rotational axis is an acute angle when viewed from the axial direction.

37. The bicycle transmission apparatus according to claim 2, wherein the first transmission member is movable relative to the base member and the first coupling member in the first axial direction so as to change an axial relative position between the first coupling member and the first transmission member during the one of upshifting and downshifting, and the first transmission member is movable together with the first coupling member relative to the base member in the second axial direction without changing the axial relative position between the first coupling member and the first transmission member during the one of upshifting and downshifting.

38. The bicycle transmission apparatus according to claim 37, further comprising:

a guide device configured to guide the first coupling member to change at least one of a first relative position between the first coupling member and the first transmission member, and a second relative position between the first coupling member and the second transmission member, wherein the guide device includes a guide member contactable with the first coupling member, the first transmission member is movable relative to the base member, the first coupling member, and the guide member in the first axial direction so as to change the axial relative position between the first coupling member and the first transmission member during the one of upshifting and downshifting, and the first transmission member is movable together with the first coupling member and the guide member relative to the base member in the second axial direction so as to change the axial relative position between the first coupling member and the second transmission member during the one of upshifting and downshifting.

39. The bicycle transmission apparatus according to claim 38, wherein the first coupling member moves relative to the first transmission member without contacting the guide member when the first transmission member moves relative to the base member in the second axial direction.

40. The bicycle transmission apparatus according to claim 2, wherein the first transmission member is movable relative to the base member and the first coupling member in the second axial direction without changing an axial relative position between the first coupling member and the second transmission member during another of upshifting and downshifting, and the first transmission member is movable together with the first coupling member relative to the base member in the first axial direction so as to change the axial relative position between the first coupling member and the second transmission member during said another of upshifting and downshifting.

41. The bicycle transmission apparatus according to claim 40, wherein the first transmission member is movable relative to the base member and the first coupling member in the second axial direction so as to change an axial relative position between the first coupling member and the first transmission member during said another of upshifting and downshifting, and the first transmission member is movable together with the first coupling member relative to the base member in the first axial direction without changing the axial relative position between the first coupling member and the first transmission member during said another of upshifting and downshifting.

42. The bicycle transmission apparatus according to claim 41, further comprising:

a guide device configured to guide the first coupling member to change at least one of a first relative position between the first coupling member and the first transmission member, and a second relative position between the first coupling member and the second transmission member, wherein the guide device includes a guide member contactable with the first coupling member, the first transmission member is movable relative to the base member, the first coupling member, and the guide member in the second axial direction so as to change the axial relative position between the first coupling member and the first transmission member during said another of upshifting and downshifting, and the first transmission member is movable together with the first coupling member and the guide member relative to the base member in the first axial direction so as to change the axial relative position between the first coupling member and the second transmission member during said another of upshifting and downshifting.

43. The bicycle transmission apparatus according to claim 42, wherein
the first coupling member moves relative to the first transmission member without contacting the guide member when the first transmission member moves relative to the base member in the second axial direction.

44. A bicycle transmission apparatus comprising:
a base member;
a first transmission member rotatable relative to the base member about a first rotational axis and movable relative to the base member in an axial direction parallel to the first rotational axis;
a second transmission member rotatable relative to the base member about a second rotational axis and stationary relative to the base member in the axial direction; and
a first coupling member configured to couple the first transmission member to the second transmission member to transmit rotation of the first transmission member to the second transmission member at a variable speed stage, the variable speed stage being variable in accordance with at least one positional relationship among the first transmission member, the second transmission member, and the first coupling member in the axial direction, wherein
the first transmission member and the second transmission member partially overlap with each other when viewed from the axial direction.

45. The bicycle transmission apparatus according to claim 44, wherein
the axial direction includes a first axial direction and a second axial direction opposite to the first axial direction,
the first transmission member includes first cogwheels arranged in the axial direction, the first cogwheels having different outer diameters and including a first largest cogwheel having a largest outer diameter among the first cogwheels, the first largest cogwheel being provided at an end of the first cogwheels in the first axial direction,
the second transmission member includes second cogwheels arranged in the axial direction, the second cogwheels having different outer diameters and including a second largest cogwheel having a largest outer diameter among the second cogwheels, the second largest cogwheel being provided at an end of the second cogwheels in the second axial direction,
the first axial direction is a direction in which the first largest cogwheel moves toward the second largest cogwheel, and
the second axial direction is a direction in which the first largest cogwheel moves away from the second largest cogwheel.

46. The bicycle transmission apparatus according to claim 45, wherein,
a total number of the first cogwheels is equal to a total number of the second cogwheels,
the first transmission member is movable relative to the base member in the axial direction between
a first axial position at which the first cogwheels are respectively aligned with the second cogwheels, and
a second axial position at which the first cogwheels other than the first largest cogwheel are aligned with the second cogwheels other than the second largest cogwheel.

47. The bicycle transmission apparatus according to claim 45, wherein,
a total number of the first cogwheels is equal to a total number of the second cogwheels,
the first cogwheels include a first smallest cogwheel having a smallest outer diameter among the first cogwheels, the first smallest cogwheel being provided at an end of the first cogwheels in the second axial direction,
the second cogwheels include a second smallest cogwheel having a smallest outer diameter among the second cogwheels, the second smallest cogwheel being provided at an end of the second cogwheels in the first axial direction,
the first transmission member is movable relative to the base member in the axial direction between
a first axial position at which the first cogwheels are respectively aligned with the second cogwheels, and
a second axial position at which the first cogwheels other than the first smallest cogwheel are aligned with the second cogwheels other than the second smallest cogwheel.

48. The bicycle transmission apparatus according to claim 1, wherein
a minimum distance is defined between the first rotational axis and the second rotational axis,
the first transmission member is movable relative to the base member in the axial direction by a travel distance, and
a value obtained by dividing the minimum distance by the travel distance is in a range of 10 to 40.

49. The bicycle transmission apparatus according to claim 48, wherein
the value obtained by dividing the minimum distance by the travel distance is in a range of 18.3 to 25.4.

* * * * *